United States Patent
Park et al.

(10) Patent No.: US 10,742,973 B2
(45) Date of Patent: Aug. 11, 2020

(54) IMAGE DECODING METHOD FOR PERFORMING INTRA PREDICTION AND DEVICE THEREOF, AND IMAGE ENCODING METHOD FOR PERFORMING INTRA PREDICTION AND DEVICE THEREOF

(71) Applicant: SAMSUNG ELECTRONICS CO., LTD., Suwon-si (KR)

(72) Inventors: Min-woo Park, Yongin-si (KR);
In-kwon Choi, Seongnam-si (KR);
Jin-young Lee, Suwon-si (KR);
Chan-yul Kim, Bucheon-si (KR);
Yin-ji Piao, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/572,608

(22) PCT Filed: May 10, 2016

(86) PCT No.: PCT/KR2016/004874
§ 371 (c)(1),
(2) Date: Nov. 8, 2017

(87) PCT Pub. No.: WO2016/182317
PCT Pub. Date: Nov. 17, 2016

(65) Prior Publication Data
US 2018/0139443 A1    May 17, 2018

Related U.S. Application Data

(60) Provisional application No. 62/160,160, filed on May 12, 2015.

(51) Int. Cl.
*H04N 19/11*  (2014.01)
*H04N 19/176*  (2014.01)
(Continued)

(52) U.S. Cl.
CPC .......... *H04N 19/11* (2014.11); *H04N 19/105* (2014.11); *H04N 19/119* (2014.11);
(Continued)

(58) Field of Classification Search
CPC .... H04N 19/105; H04N 19/11; H04N 19/119; H04N 19/122; H04N 19/132;
(Continued)

(56) References Cited

U.S. PATENT DOCUMENTS 9,014,260 B2    4/2015  Alshin et al.
9,609,343 B1 *  3/2017  Chen .................... H04N 19/107
(Continued)

FOREIGN PATENT DOCUMENTS

JP          2012-191295 A    10/2012
KR    10-2009-0074164 A     7/2009
(Continued)

OTHER PUBLICATIONS

Kondo et al., A Motion Compensation Technique Using Sliced Blocks in Hybrid Video Coding, Sep. 2005, IEEE International Conference on Image Processing 2005. (Year: 2005).*
(Continued)

*Primary Examiner* — Francis Geroleo
(74) *Attorney, Agent, or Firm* — Sughrue Mion, PLLC

(57) ABSTRACT

Provided is a video decoding method including: obtaining mode information of a contour for determining at least one segment from a current block; determining whether first coordinates and second coordinates of the contour are derivable from a neighboring block of the current block, based on the mode information of the contour; when the first and second coordinates of the contour are derivable from the neighboring block of the current block, determining the at least one segment from the current block based on the first and second coordinates of the contour derived from the neighboring block of the current block; and performing prediction with respect to the determined at least one segment.

20 Claims, 42 Drawing Sheets

(51) Int. Cl.
   *H04N 19/119* (2014.01)
   *H04N 19/105* (2014.01)
   *H04N 19/14* (2014.01)
   *H04N 19/17* (2014.01)
   *H04N 19/122* (2014.01)
   *H04N 19/132* (2014.01)
   *H04N 19/184* (2014.01)
   *H04N 19/593* (2014.01)
   *H04N 19/463* (2014.01)

(52) U.S. Cl.
   CPC ......... *H04N 19/122* (2014.11); *H04N 19/132* (2014.11); *H04N 19/14* (2014.11); *H04N 19/17* (2014.11); *H04N 19/176* (2014.11); *H04N 19/184* (2014.11); *H04N 19/463* (2014.11); *H04N 19/593* (2014.11)

(58) Field of Classification Search
   CPC ...... H04N 19/14; H04N 19/17; H04N 19/176; H04N 19/184; H04N 19/463; H04N 19/593
   See application file for complete search history.

(56) References Cited

U.S. PATENT DOCUMENTS

| | | | | |
|---|---|---|---|---|
| 9,749,622 | B2* | 8/2017 | Merkle | H04N 19/597 |
| 2009/0196342 | A1* | 8/2009 | Divorra Escoda | H04N 19/50 375/240.02 |
| 2009/0268810 | A1 | 10/2009 | Dai | |
| 2011/0200109 | A1* | 8/2011 | Joshi | H04N 19/52 375/240.16 |
| 2013/0129237 | A1* | 5/2013 | Yie | G06T 9/004 382/233 |
| 2014/0247867 | A1* | 9/2014 | Merkle | H04N 19/597 375/240.03 |

FOREIGN PATENT DOCUMENTS

| | | |
|---|---|---|
| KR | 10-2011-0032485 A | 3/2011 |
| KR | 10-2012-0129726 A | 11/2012 |
| KR | 10-2014-0077990 A | 6/2014 |
| WO | 2013-068564 A1 | 5/2013 |

OTHER PUBLICATIONS

Communication dated Mar. 2, 2018, issued by the European Patent Office in counterpart European application No. 16792963.7.

Xiaozhen Zheng, et al., "TE3: Huawei & Hisilicon report on flexible motion partitioning coding", Joint Collaborative Team on Video Coding (JCT-VC) of ITU-T SG16 and ISO/IEC JTC1/SC29/WG11; URL:http://wftp3.itu.int/av-arch/jctvc-site/, Document: JCTVC-B041, 2nd Meeting, Geneva, CH, Jul. 21-28, 2010, XP030007621, total 9 pages.

Karsten Müller, et al., "3D Video Coding with Depth Modeling Modes and View Synthesis Optimization", Signal&Information Processing Association Annual Summit and Conference (APSIPA ASC), 2012 Asia-Pacific, IEEE, Dec. 3, 2012, pp. 1-4, XP032309862, total 4 pages.

Xiaozhen Zheng, et al., "Flexible Macroblock Partition", JCTVC-A029, Dresden, DE, Apr. 15-23, 2018, Hisilicon Technologies Co., Ltd., XP030007520, total 10 pages.

Communication dated Jun. 19, 2018, issued by the European Patent Office in counterpart European Application No. 16792963.7.

Feng Zou et al., "Edge-Based Adaptive Directional Intra Prediction" 28th Picture Coding Symposium, PCS2010, Dec. 8-10, 2010, pp. 366-369, XP030082005, total 4 pages.

Communication dated Aug. 12, 2016, issued by the International Searching Authority in counterpart International Application No. PCT/KR2016/004874 (PCT/ISA/210 & PCT/ISA/237).

* cited by examiner num_point_minus2(1) -><br>
seg_start_x -> seg_start_y -><br>
seg_middle_x -> seg_middle_y -><br>
seg_end_x -> seg_end_y -><br>
mode[0] or DC[0] -><br>
mode[1] or DC[1] -><br>
residual coding num_point_minus2(2) -><br>
seg_start_x -> seg_start_y -><br>
seg_middle_x -> seg_middle_y -><br>
seg_end_x -> seg_end_y -><br>
mode[0] or DC[0] -><br>
mode[1] or DC[1] -><br>
residual coding FIG. 6
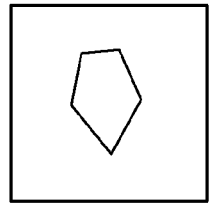
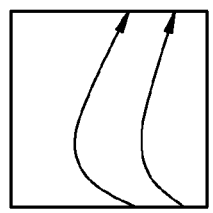
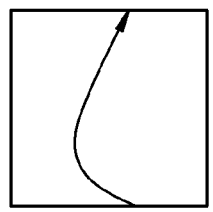
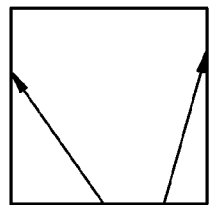
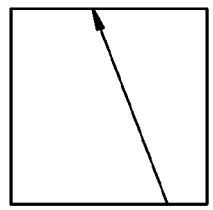

FIG. 31
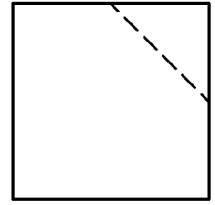
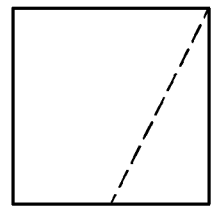
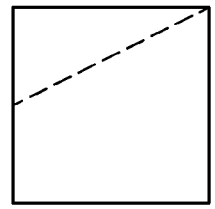
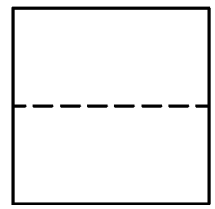
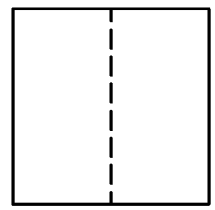

```
for(y = 0; y < H; y++) {
  for(x = 0; x < W; x++) {
    mask_l = x == 0 ? Mask[x][y] : Mask[x - 1][y];
    mask_r = x == W - 1 ? Mask[x][y] : Mask[x + 1][y];
    mask_t = y == 0 ? Mask[x][y] : Mask[x][y - 1];
    mask_b = y == H - 1 ? Mask[x][y] : Mask[x][y + 1];
    left = x == 0 ? P[x][y] : P[x - 1][y];
    right = x == W - 1 ? P[x][y] : P[x + 1][y];
    top = y == 0 ? P[x][y] : P[x][y - 1];
    bottom = y == H - 1 ? P[x][y] : P[x][y + 1];
    if(mask_l != mask_r) {
      tmp = (left + 2 * P[x][y] + right + 2) >> 2;
    }
    else {
      tmp = P[x][y];
    }
    if(mask_t != mask_b) {
      tmp = (top + 2 * tmp + bottom + 2) >> 2;
    }
    P_ftr[x][y] = tmp;
  }
}
```

FIG. 45

```
coding_unit(x0, y0, log2CbSize) {
...
        if(PartMode = PART_2Nx2N)
           intra_mode_flag
        if(intra_mode_flag = = 0) { // HEVC Intra Coding
        pbOffset = (PartMode = = PART_NxN) ? (nCbS / 2) : nCbS
        for(j = 0;j < nCbS;j = j + pbOffset)
           for(i = 0;i < nCbS;i = i + pbOffset)
              prev_intra_luma_pred_flag [ x0 + i ][ y0 + j ]
...
        }
        else { // Contour-based Intra Coding
           seg_num_minus1
           if(seg_num_minus1 = = 0) {
              1seg_mode
           }
           else if(seg_mum_minus1 = = 1) {
              line_orient
              if(line_orient = = 3 II line_orient = = 4 II line_orient = = 5)
                 line_pos1
              if(line_orient = = 0 II line_orient = = 1 II line_orient = = 3)
                 line_pos2
              if(line_orient = = 3)
                 seg1_dc
              else {
                 boundary_filling_flag
                 if(boundary_filling_flag)
                    boundary_filling_thickness
              }
              boundary_filtering_disable_flag
           }
        }
...
```

FIG. 47
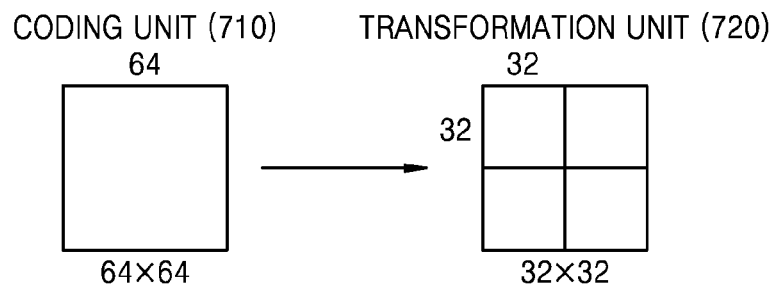
FIG. 48
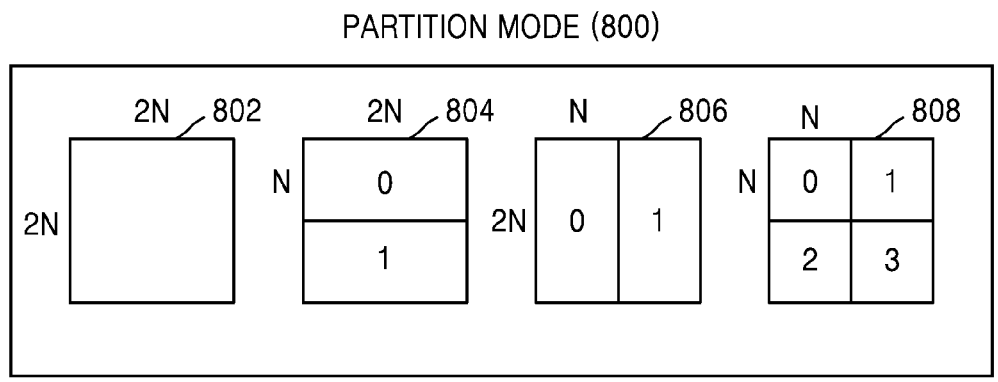
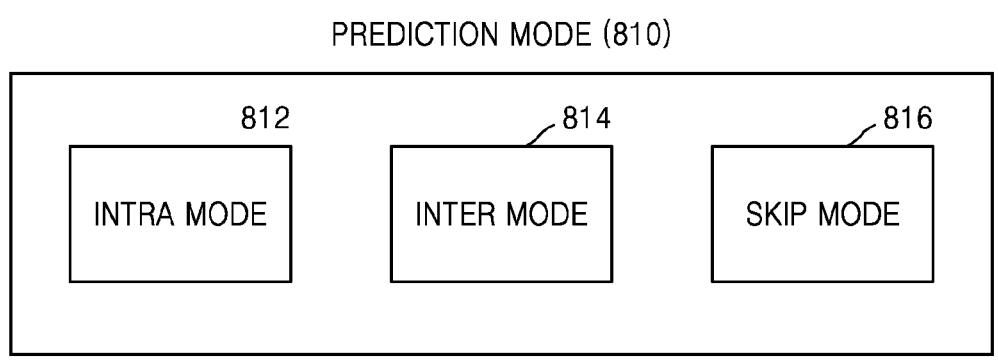
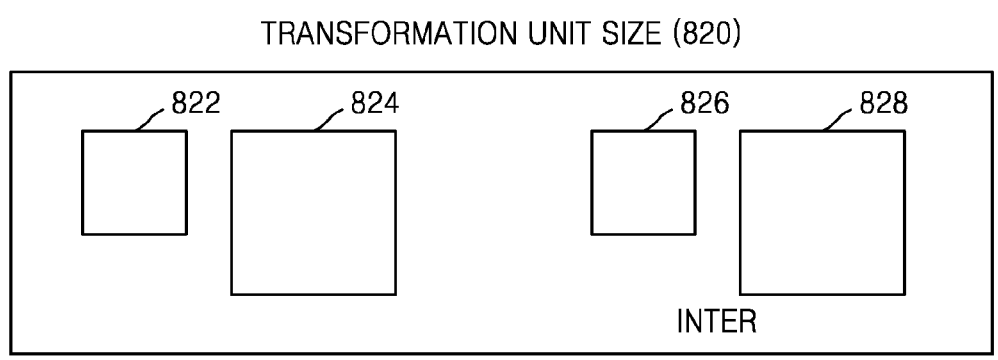

IMAGE DECODING METHOD FOR PERFORMING INTRA PREDICTION AND DEVICE THEREOF, AND IMAGE ENCODING METHOD FOR PERFORMING INTRA PREDICTION AND DEVICE THEREOF

TECHNICAL FIELD

The present disclosure relates to an image decoding method and apparatus for performing intra prediction, and an image encoding method and apparatus for performing intra prediction.

BACKGROUND ART

As hardware for reproducing and storing high resolution or high quality video content is being developed and supplied, a need for a video codec for effectively encoding or decoding the high resolution or high quality video content is increasing. According to a conventional video codec, a video is encoded according to a limited encoding method based on coding units having a tree structure.

Image data of a spatial region is transformed into coefficients of a frequency region via transformation. According to a video codec, an image is split into blocks having a predetermined size, discrete cosine transformation (DCT) is performed on each block, and frequency coefficients are encoded in block units, for rapid calculation of frequency transformation. Compared with image data of a spatial region, coefficients of a frequency region are easily compressed. In particular, since an image pixel value of a spatial region is expressed according to a prediction error via inter prediction or intra prediction of a video codec, when transformation is performed on the prediction error, a large amount of data may be transformed to 0. According to a video codec, an amount of data may be reduced by replacing data that is consecutively and repeatedly generated with small-sized data.

DETAILED DESCRIPTION OF THE INVENTION

Technical Problem

A more precise and simple prediction method is required to generate a prediction image during video encoding and decoding processes.

Technical Solution

According to an embodiment, a more precise and simple prediction method may be provided while intra prediction is performed to generate a prediction image, so as to increase encoding efficiency and also increase transmission efficiency.

Aspects of the present disclosure are not limited thereto, and additional aspects will be set forth in part in the description which follows and, in part, will be apparent from the description, or may be learned by practice of the presented embodiments.

According to an aspect of an embodiment, a video decoding method includes: obtaining mode information of a contour for determining at least one segment from a current block; determining whether first coordinates and second coordinates of the contour are derivable from a neighboring block of the current block, based on the mode information of the contour; when the first and second coordinates of the contour are derivable from the neighboring block of the current block, determining the at least one segment from the current block based on the first and second coordinates of the contour derived from the neighboring block of the current block; and performing prediction with respect to the determined at least one segment.

DESCRIPTION OF THE DRAWINGS

Hereinafter.

FIG. 6 illustrates a method of determining a segment for prediction encoding from a current block by using a contour according to a boundary of an object, according to various embodiments.

FIGS. 29 through 31 illustrate a method of obtaining a contour of a current block from a neighboring block of the current block, according to various embodiments.

FIG. 45 illustrates syntax elements for performing intra prediction, according to an embodiment.

FIG. 47 illustrates a relationship between a coding unit and transformation units, according to various embodiments.

FIG. 48 illustrates a plurality of pieces of encoding information according to various embodiments.

BEST MODE

Figure 1A:
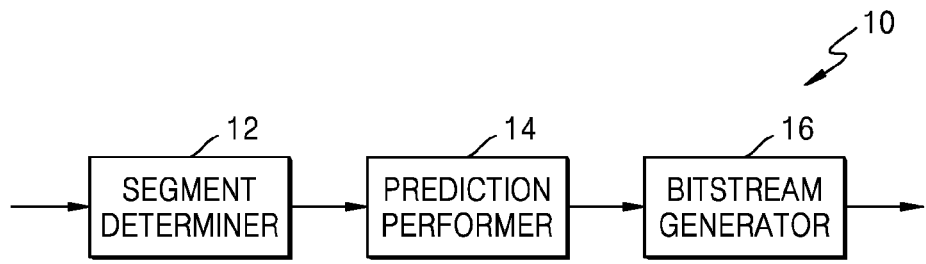
FIG. 1A is a block diagram of a video encoding apparatus performing contour-based intra prediction, according to an embodiment.

According to an aspect of an embodiment, a video decoding method includes: obtaining mode information of a contour for determining at least one segment from a current block; determining whether first coordinates and second coordinates of the contour are derivable from a neighboring block of the current block, based on the mode information of the contour; when the first and second coordinates of the contour are derivable from the neighboring block of the current block, determining the at least one segment from the current block based on the first and second coordinates of the contour derived from the neighboring block of the current block; and performing prediction with respect to the determined at least one segment.

In the determining of the at least one segment, when at least one of the first and second coordinates of the contour are not derivable from the neighboring block of the current block according to the mode information of the contour, obtaining at least one of the first and second coordinates of the contour from a bitstream.

The video decoding method may further include: obtaining the first coordinates from the bitstream when the first coordinates of the contour are located at a right side of the current block according to the obtained mode information of the contour; and obtaining the second coordinates from the bitstream when the second coordinates of the contour are located at a bottom of the current block according to the obtained mode information of the contour.

The video decoding method may further include: deriving the first coordinates of the contour from an upper block of the current block when the first coordinates of the contour are located at a top of the current block according to the obtained mode information of the contour; and deriving the second coordinates of the contour from a left block of the current block when the second coordinates of the contour are located at a left side of the current block according to the obtained mode information of the contour.

In the deriving of the first coordinates of the contour from the upper block of the current block, the first coordinates of the contour may be derived by using sample values of lowermost samples of the upper block of the current block, and in the deriving of the second coordinates of the contour from the left block of the current block, the second coordinates of the contour may be derived by using sample values of rightmost samples of the left block of the current block.

The mode information of the contour for determining at least one segment from the current block may include information indicating at least two sides from among top, left, bottom, and right sides of the current block.

The video decoding method may further include: obtaining information about the number of at least one segment determined from the current block; and when the information about the number of the at least one segment indicates that the current block is determined to be one segment, obtaining information indicating a prediction mode with respect to the one segment.

The performing of the prediction with respect to the at least one segment may include: generating a mask of the current block indicating a boundary of segments forming the current block; determining sample values of samples included in the at least one segment by using a neighboring sample of the current block; and determining a prediction value of the at least one segment based on the generated mask and the determined sample values.

In the generating of the mask of the current block, the mask of the current block may be generated by determining a mask value of a sample of the current block based on a location relationship between the sample of the current block and the contour for determining the at least one segment from the current block.

The determining of the sample values of the samples included in the at least one segment may include: determining a reference sample included in the neighboring block of the current block based on the obtained mode information of the contour; and determining sample values of the samples included in the at least one segment by using the determined reference sample.

According to another aspect of an embodiment, a video encoding method includes: determining a mode of a contour for determining at least one segment from a current block; determining whether first coordinates and second coordinates of the contour are derivable from a neighboring block of the current block, based on the mode of the contour; when the first coordinates and the second coordinates of the contour are derivable from the neighboring block of the current block, determining the at least one segment from the current block based on the first coordinates and the second coordinates of the contour derived from the neighboring block of the current block; performing prediction with respect to the current block by using the at least one segment; and encoding mode information of the contour indicating the mode of the contour.

In the determining of the at least one segment, when at least one of the first and second coordinates of the contour are not derivable from the neighboring block of the current block according to the mode information of the contour, determining the at least one segment from the current block based on the first and second coordinates of the contour determined by using samples located at an edge of the current block.

The video encoding method may further include: determining the first coordinates of the contour by using upper samples of the current block or right samples of the current block from among the samples located at the edge of the current block; and determining the second coordinates of the contour by using lower samples of the current block or left samples of the current block from among the samples located at the edge of the current block.

The video encoding method may further include: when the first coordinates of the contour are located at a right side of the current block according to the determined mode of the contour, determining the first coordinates of the contour determined by using right samples in the current block; and when the second coordinates of the contour are located at a bottom of the current block according to the determined mode of the contour, determining the second coordinates of the contour by using lower samples in the current block.

The video encoding method may further include: when the first coordinates of the contour are located at a top of the current block according to the determined mode of the contour, deriving the first coordinates of the contour from an upper block of the current block; and when the second coordinates of the contour are located at a left side of the current block according to the obtained mode information of the contour, deriving the second coordinates of the contour from a left block of the current block.

In the deriving of the first coordinates of the contour from the upper block of the current block, the first coordinates of the contour may be derived by using sample values of lowermost samples of the upper block of the current block, and in the deriving of the second coordinates of the contour from the left block of the current block, the second coordinates of the contour may be derived by using sample values of rightmost samples of the left block of the current block.

The video encoding method may further include: determining the number of at least one segment from the current block; and when the number of the at least one segment is determined to be one segment, encoding information about the number of the at least one segment and information indicating a prediction mode with respect to the one segment.

The video encoding method may further include: generating a mask of the current block indicating a boundary of segments forming the current block; determining sample values of samples included in the at least one segment by using a neighboring sample of the current block; and determining a prediction value of the at least one segment based on the generated mask and the determined sample values.

In the generating of the mask of the current block, the mask of the current block may be generated by determining a mask value of a sample of the current block based on a location relationship between the sample of the current block and the contour for determining the at least one segment from the current block.

According to another aspect of an embodiment, a video decoding apparatus includes: a segment determiner configured to obtain mode information of a contour for determining at least one segment from a current block, determine whether first coordinates and second coordinates of the contour are derivable from a neighboring block of the current block, based on the mode information of the contour, and when the first and second coordinates of the contour are derivable from the neighboring block of the current block, determine the at least one segment from the current block based on the first and second coordinates of the contour derived from the neighboring block of the current block; and a prediction performer configured to perform prediction with respect to the determined at least one segment.

MODE OF THE INVENTION

Hereinafter, a contour-based intra prediction coding method and a contour-based intra decoding method according to embodiments are suggested with reference to FIGS. 1A through 45. Also, a video encoding method and video decoding method based on coding units of a hierarchical structure, according to embodiments, which are used when the contour-based intra prediction video coding method suggested above is not used, are described with reference to FIGS. 46 through 48.

Hereinafter, an 'image' may indicate a still image of a video or a moving picture, i.e., the video itself.

Hereinafter, a 'sample' denotes data that is assigned to a sampling location of an image and is to be processed. For example, pixel values or residual of a block in an image of a spatial domain may be samples.

Hereinafter, a 'current block' may denote a block of an image to be encoded or decoded.

Hereinafter, a 'neighboring block' denotes at least one encoded or decoded block adjacent to the current block. For example, a neighboring block may be located at the top, upper right, left, or upper left of a current block. Also, a neighboring block may be a spatially-neighboring block or a temporally-neighboring block. For example, a temporally-neighboring block may include a block of a reference picture, which is co-located as a current block, or a neighboring block of the co-located block.

First, video decoding and video encoding apparatuses 10 and video decoding and encoding methods for performing contour-based intra prediction according to an embodiment will be described with reference to FIGS. 1A through 45.

Figure 1B:
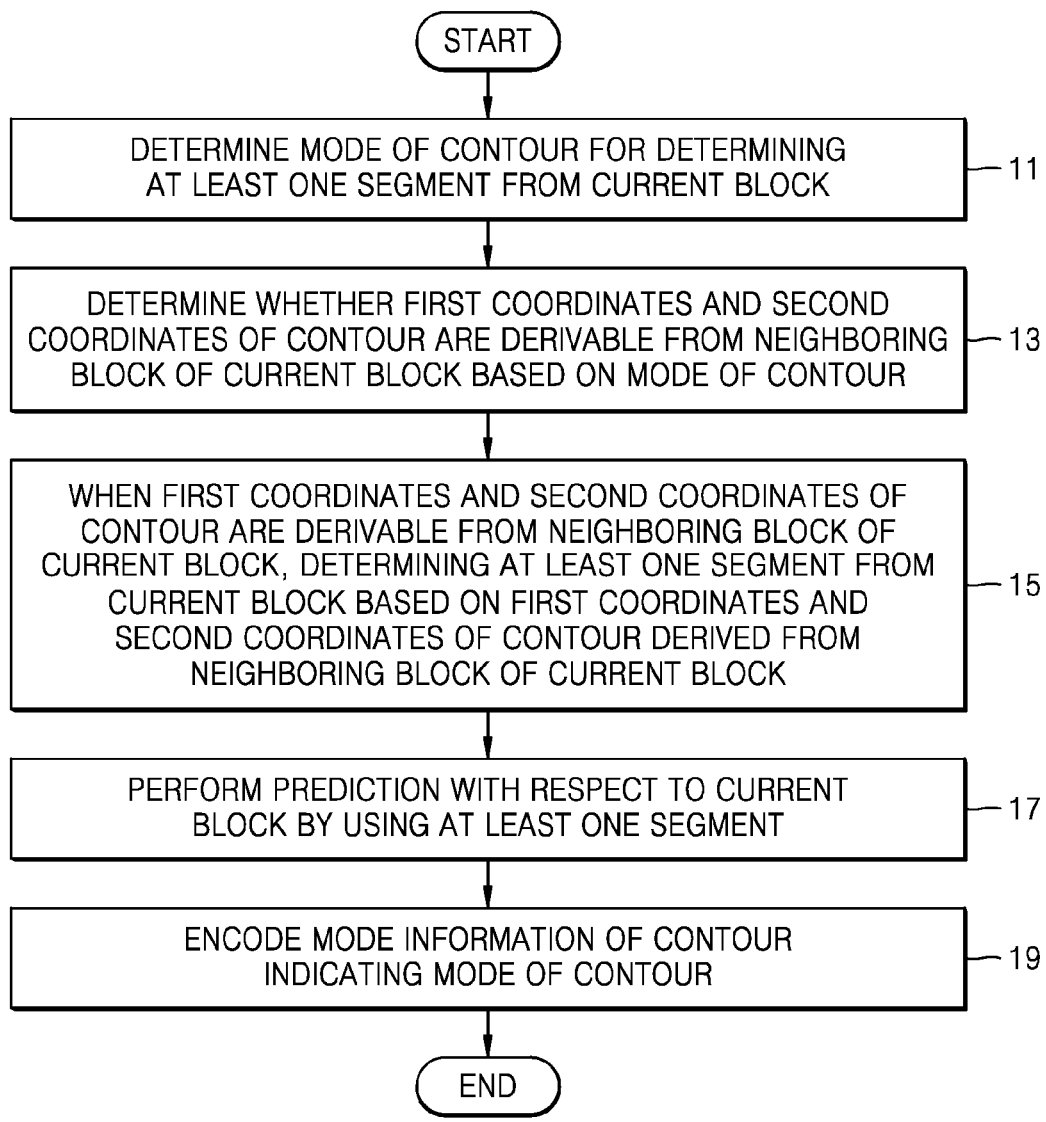
FIG. 1B is a flowchart of a video encoding method performing contour-based intra prediction, according to an embodiment.

FIG. 1A is a block diagram of a video encoding apparatus 10 performing contour-based intra prediction, according to an embodiment. FIG. 1B is a flowchart of a video encoding method performing contour-based intra prediction, according to an embodiment.

Referring to FIG. 1A, the video encoding apparatus 10 according to an embodiment may include a segment determiner 12, a prediction performer 14, and a bitstream generator 16.

Current pictures included in a video according to an embodiment may be split based on a largest coding unit that is a coding unit having a largest size. For example, if the current picture is larger than the largest coding unit, image data of the current picture may be split into the at least one largest coding unit. The largest coding unit according to an embodiment may be a data unit having a size of 16×16, 32×32, 64×64, 128×128, 256×256, etc., wherein a shape of the data unit is a square having a width and length in squares of 2 higher than 8. The largest coding unit according to another embodiment may be a data unit of an M×N size. Here, M and N may each be squares of 2 higher than 2.

A coding unit according to an embodiment may be determined by a largest size and a depth. The depth denotes the number of times the coding unit is spatially split from the largest coding unit, and as the depth deepens, deeper coding units according to depths may be split from the largest coding unit to a smallest coding unit. A depth of the largest coding unit is an uppermost depth and a depth of the smallest coding unit is a lowermost depth. Since a size of a coding unit corresponding to each depth decreases as the depth of the largest coding unit deepens, a coding unit corresponding to an upper depth may include a plurality of coding units corresponding to lower depths.

As described above, the image data of the current picture is split into the largest coding units according to a maximum size of the coding unit, and each of the largest coding units may include deeper coding units that are split according to depths. Since the largest coding unit according to an embodiment is split according to depths, the image data of a spatial domain included in the largest coding unit may be hierarchically classified according to depths.

A maximum depth and a maximum size of a coding unit, which limit the total number of times a height and a width of the largest coding unit are hierarchically split, may be predetermined.

The image data in the largest coding unit according to an embodiment is encoded based on the deeper coding units corresponding to at least one depth equal to or below the maximum depth, and results of encoding the image data are compared based on each of the deeper coding units. A depth having the least encoding error may be selected after comparing encoding errors of the deeper coding units. At least one coded depth may be selected for each largest coding unit.

The size of the largest coding unit according to an embodiment is split as a coding unit is hierarchically split according to depths, and as the number of coding units increases. Also, even if coding units correspond to the same depth in one largest coding unit, it is determined whether to split each of the coding units corresponding to the same depth to a lower depth by measuring an encoding error of the image data of the each coding unit, separately. Accordingly, even when image data is included in one largest coding unit, the encoding errors may differ according to regions in the one largest coding unit, and thus the coded depths may differ according to regions in the image data. Thus, one or more coded depths may be determined in one largest coding unit, and the image data of the largest coding unit may be divided according to coding units of at least one coded depth.

Accordingly, coding units having a tree structure included in the largest coding unit, according to an embodiment, may be determined. The 'coding units having a tree structure' according to an embodiment include coding units corresponding to a depth determined to be the coded depth, from among all deeper coding units included in the largest coding unit. A coding unit of a coded depth may be hierarchically determined according to depths in the same region of the largest coding unit, and may be independently determined in different regions. Similarly, a coded depth in a current region may be independently determined from a coded depth in another region.

A maximum depth according to an embodiment is an index related to the number of splitting times from a largest coding unit to a smallest coding unit. A first maximum depth according to an embodiment may denote the total number of splitting times from the largest coding unit to the smallest coding unit. A second maximum depth according to an embodiment may denote the total number of depth levels from the largest coding unit to the smallest coding unit. For example, when a depth of the largest coding unit is 0, a depth of a coding unit, in which the largest coding unit is split once, may be set to 1, and a depth of a coding unit, in which the largest coding unit is split twice, may be set to 2. Here, if the smallest coding unit is a coding unit in which the largest coding unit is split four times, 5 depth levels of depths 0, 1, 2, 3, and 4 exist, and thus the first maximum depth may be set to 4, and the second maximum depth may be set to 5.

Also, prediction encoding and transformation may be performed according to the largest coding unit. The prediction encoding and the transformation are also performed based on the deeper coding units according to a depth equal to or depths less than the maximum depth, according to the largest coding unit.

Since the number of deeper coding units increases whenever the largest coding unit is split according to depths, encoding, including the prediction encoding and the transformation, is performed on all of the deeper coding units generated as the depth deepens. For convenience of description, the prediction encoding and the transformation with respect to a coding unit of a current depth from among at least one largest coding unit will now be described.

The video encoding apparatus 10 according to an embodiment may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 10 may select not only a coding unit for encoding the image data, but also a data unit different from the coding unit so as to perform the prediction encoding on the image data in the coding unit.

In order to perform prediction encoding in the largest coding unit, the prediction encoding may be performed based on a coding unit corresponding to a coded depth, i.e., based on a coding unit that is no longer split to coding units corresponding to a lower depth. Hereinafter, the coding unit that is no longer split and becomes a basis unit for prediction encoding will now be referred to as a 'prediction unit'.

An original image according to an embodiment may include a boundary of an object indicated in a straight line or the line, and a current block of an image may determine a contour of the current block according to the boundary of the object. For example, the contour of the current block may be a straight line, a curve, a bent line, etc. according to the boundary of the object represented by values of samples of the current block. The current block may be split into segments, i.e., prediction units of the current block, by using the determined contour of the current block.

A prediction mode of the prediction unit may be at least one selected from an intra mode, a inter mode, and a skip mode. The encoding is independently performed on one prediction unit in a coding unit, thereby selecting a prediction mode having a least encoding error.

In detail, the segment determiner 12 according to an embodiment may determine whether to perform contour-based prediction with respect to the current block. In other words, the segment determiner 12 according to an embodiment may determine whether to determine a prediction unit for performing prediction of the current block based on the contour of the boundary of the object included in the current block.

For example, when it is determined to perform the contour-based prediction, the segment determiner 12 according to an embodiment may split the current block into a plurality of segments having various shapes based on the contour according to sample values of the current block. Also, when it is determined not to perform the contour-based prediction, the segment determiner 12 according to an embodiment may split the current block into one partition type from among predetermined partition types of the current block.

When the contour-based prediction is performed, the segment determiner 12 according to an embodiment may determine segments split from the current block based on the contour of the current block, so as to perform prediction with respect to the current block. The contour of the current block according to an embodiment may be determined correspondingly to the boundary of the object included in the current block. For example, the contour of the current block according to an embodiment may be determined based on the values of the samples of the current block or by using a neighboring block of the current block.

The segment determiner 12 according to an embodiment may determine a mode of the contour of the current block according to the contour of the current block. For example, the mode of the contour of the current block may indicate a direction of the contour in the current block.

When the contour for determining the segments for prediction from the current block is a linear contour, a mode of a contour indicating a side where a contour passes from among sides of the current block may be determined. For example, when the current block has a top side, a right side, a bottom side, and a left side, the mode of the contour of the current block may indicate at least two sides contacting the contour from among the top, right, bottom, and left sides of the current block.

The mode of the contour for determining at least one segment from the current block, according to an embodiment, may be determined to be one of first through sixth modes. For example, the video encoding apparatus 10 may select a mode having an optimum RD cost from among the first through sixth modes by performing encoding and decoding on the current block according to the first through sixth modes by using a rate-distortion optimization (RDO) method.

Also, the segment determiner 12 according to an embodiment may determine mode information of the contour according to the determined mode of the contour of the current block. For example, the segment determiner 12 may assign a number to each side of the current block, and determine a combination of numbers corresponding to sides indicated by the mode of the contour of the current block as mode information of the contour of the current block. Detailed methods of determining the contour of the current block and the mode information of the contour, according to various embodiments, will be described below with reference to FIGS. 6 through 9.

The segment determiner 12 according to an embodiment may determine whether to derive information about coordinates of the contour of the current block from the neighboring block of the current block. The information about the coordinates of the contour is information for specifying a location of the contour, and may indicate x- and y-axis coordinates of the contour. For example, when the contour of the current block according to an embodiment is a single linear contour, the information about the coordinates of the contour of the current block may be information indicating first coordinates indicating a starting point of the single linear contour and second coordinates indicating an ending point of the contour.

In detail, the segment determiner 12 according to an embodiment may obtain the information about the coordinates of the contour of the current block from the neighboring block when it is determined that the information about the coordinates of the contour of the current block is derivable from the neighboring block of the current block. Alternatively, the segment determiner 12 according to an embodiment may determine the information about the coordinates of the contour by using samples inside the current block when it is determined that the information about the coordinates of the contour of the current block is not derivable from the neighboring block of the current block.

For example, when it is determined that a neighboring sample adjacent to the outside of a side of the current block, the side indicated by the mode of the contour of the current block, is usable, the segment determiner 12 according to an embodiment may derive the coordinates of the contour located at the side of the current block from the neighboring sample. For example, a sample usable from among neighboring samples adjacent to the outside of the current block may be a top or left sample of the current block.

Also, when it is determined that the neighboring sample adjacent to the outside of the side of the current block, the side indicated by the mode of the contour of the current block, is not usable, the segment determiner 12 may determine the coordinates of the contour located at the side of the current block from a sample inside the current block. For example, a sample that is not usable from among the neighboring samples adjacent to the outside of the current block may be a bottom or right sample of the current block. When the neighboring sample adjacent to the outside of the side of the current block, the side indicated by the mode of the contour of the current block, is not usable, the used samples inside the current block may be samples adjacent to the inside of the side of the current block, and the determined coordinates of the contour may be transmitted to a video decoding apparatus 20 since the determined coordinates are not derivable from the neighboring block.

Detailed methods of determining the coordinates of the contour of the current block, according to various embodiments, will be described below with reference to FIGS. 10 through 16B.

The segment determiner 12 according to an embodiment may determine at least one segment for prediction from the current block based on the information about the determined coordinates of the contour of the current block.

When at least one segment for prediction of the current block according to an embodiment is determined, the mask of the current block, which indicates the boundary between the segments, may be generated.

The mask of the current block according to an embodiment is data for determining a region of the at least one segment split from the current block and a boundary between the segments, and may have an arrangement of mask values respectively corresponding to the samples of the current block. The value of the mask of the current block according to an embodiment may be generated based on a location relationship between the contour of the current block and each sample value of the current block.

Detailed methods of determining the mask of the current block, according to various embodiments, will be described below with reference to FIGS. 17 through 21.

The prediction performer 14 according to an embodiment may perform contour-based intra prediction on the segments of the current block.

For example, the prediction performer 14 according to an embodiment may perform prediction on the current block by using the neighboring sample of the current block and the generated mask of the current block.

In detail, the prediction performer 14 according to an embodiment may generate a prediction value of the sample value of the segment of the current block by using the neighboring sample of the current block. Here, the sample value of the segment may be a sample value of each of samples included in the segment region. For example, an intra prediction method, such as a DC mode or the like, may be used. A location of a reference sample of the current block, which is to be referred to, may be determined based on the mode of the contour of the current block.

The prediction performer 14 according to an embodiment may generate the prediction value of the segment of the current block by applying the mask of the current block to the generated sample value of the segment of the current block. Here, the prediction value of the segment may be a prediction value of each of the samples included in the segment region, and may be generated by using a weighted sum of the sample value of the segment of the current block and a mask value of the current block.

Detailed methods of performing prediction with respect to the current block, according to various embodiments, will be described below with reference to FIGS. 22 through 26.

Also, filtering may be performed on the current block on which the prediction is performed, according to an embodiment. For example, filtering may be performed on the prediction values of the samples located at the boundary between the segments of the current block.

Detailed methods of performing filtering on the current block on which prediction is performed according to various embodiments will be described below with reference to FIG. 37.

The video encoding apparatus 100 according to an embodiment may perform transformation on image data in a coding unit based not only on a coding unit for encoding the image data, but also based on a data unit that is different from the coding unit.

In order to perform the transformation in the coding unit, the transformation may be performed based on a data unit having a size smaller than or equal to the coding unit. For example, the transformation unit may include a data unit for an intra mode and a transformation unit for an inter mode.

Hereinafter, a data unit that is a basis of transformation may be referred to as a 'transformation unit'. A transformation unit in the coding unit may be recursively split into smaller sized regions in the similar manner as the coding unit according to the tree structure, thus, residual data of the coding unit may be divided according to the transformation unit having the tree structure according to a transformation depth.

A transformation depth indicating the number of splitting times to reach the transformation unit by splitting the height and width of the coding unit may also be set in the transformation unit according to an embodiment. For example, in a current coding unit of 2N×2N, a transformation depth may be 0 when the size of a transformation unit is 2N×2N, may be 1 when the size of the transformation unit is N×N, and may be 2 when the size of the transformation unit is N/2×N/2. That is, with respect to the transformation unit, the transformation unit having the tree structure may be set according to the transformation depths.

Encoding information according to coded depths requires not only information about a coded depth but also requires information related to prediction and transformation. Accordingly, not only a coded depth having a least encoding error may be determined, but also a partition type in which a prediction unit is split to partitions, a prediction mode according to prediction units, and a size of a transformation unit for transformation may be determined.

An encoding error of deeper coding units according to depths may be measured by using Rate-Distortion Optimization based on Lagrangian multipliers.

The bitstream generator 16 according to an embodiment may generate a bitstream including information required to encode and decode the determined current block. For example, the bitstream generator 16 may generate a bitstream including information indicating whether to perform contour-based prediction on the current block.

Also, the bitstream generator 16 according to an embodiment may generate a bitstream including the mode information of the contour, which indicates the mode of the contour of the current block.

Also, the bitstream generator 16 according to an embodiment may generate the bitstream including the information about the coordinates of the contour of the current block according to the mode information of the contour of the current block. For example, when the mode information of the contour of the current block indicates that the coordinates of the contour of the current block are derivable from the neighboring block of the current block, the information about the coordinates of the contour of the current block may not be included in the bitstream. Also, when the mode information of the contour of the current block does not indicate that the coordinates of the contour of the current block are not derivable from the neighboring block of the current block, the information about the coordinates of the contour of the current block may be included in the bitstream.

Also, information indicating whether to perform prediction on the current block in the direction of the boundary, information about the thickness of the boundary region of the current block, information indicating whether to perform filtering on the prediction value of the current block, or the like according to an embodiment may be further included in the bitstream.

Also, information about a coded depth, information about an encoding mode according to depths, partition type information of a prediction unit, prediction mode information, size information of a transformation unit, or the like according to an embodiment may be further included in the bitstream.

As described above, the video encoding apparatus 10 may increase the quality of a reconstructed image by performing contour-based intra prediction, and at the same time, increase transmission efficiency and encoding efficiency by reducing the amount of information required to predict an image.

Hereinafter, operations of the video encoding apparatus 10 performing contour-based intra prediction will be described with reference to FIG. 1B.

FIG. 1B is a flowchart of a video encoding method performing contour-based intra prediction, according to an embodiment.

In operation 11, the video encoding apparatus 10 according to an embodiment may determine the mode of the contour for determining at least one segment from the current block.

For example, the video encoding apparatus 10 may determine the contour of the current block based on the sample values of the samples of the current block. Alternatively, the video encoding apparatus 10 may determine the contour of the current block by using the neighboring block of the current block. The video encoding apparatus 10 according to an embodiment may select a mode having an optimum RD cost from among a plurality of modes.

In operation 13, the video encoding apparatus 10 according to an embodiment may determine whether the coordinates of the contour are derivable from the neighboring block of the current block based on the mode of the current block.

For example, when a side of the current block indicated by the mode of the contour of the current block is the top or left side of the current block, the video encoding apparatus 10 may determine that the coordinates of the contour of the current block are derivable from the neighboring block of the current block.

Also, when the side of the current block indicated by the mode of the contour of the current block is the bottom or right side of the current block, the video encoding apparatus 10 may determine that the coordinates of the contour of the current block are not derivable from the neighboring block of the current block.

Whether the coordinates of the contour of the current block according to an embodiment are derivable from the neighboring block of the current block may be determined with respect to each of a plurality of coordinates of the contour.

In operation 15, when the coordinates of the contour of the current block are derivable from the neighboring block of the current block, the video encoding apparatus 10 according to an embodiment may derive the coordinates of the contour from the neighboring block of the current block.

The video encoding apparatus 10 according to an embodiment may determine coordinates of the contour, which are not derivable from the neighboring block, by using the samples in the current block. The used samples in the current block may be samples adjacent to the side indicated by the contour of the current block and located inside the current block.

In detail, the video encoding apparatus 10 according to an embodiment may determine the coordinates of the contour of the current block based on a gradient of sample values of samples of the neighboring block or a gradient of sample values of the samples in the current block.

Also, the video encoding apparatus 10 according to an embodiment may determine the at least one segment from the current block for performing prediction, based on the coordinates of the contour. For example, the video encoding apparatus 10 according to an embodiment may determine two segments when the current block is split based on a single linear contour.

In operation 17, the video encoding apparatus 10 according to an embodiment may perform prediction with respect to the current block by using the determined at least one segment.

In operation 19, the video encoding apparatus 10 according to an embodiment may encode the mode information of the contour of the current block.

Also, the video encoding apparatus 10 according to an embodiment may encode information about the coordinates of the contour of the current block according to the mode information of the contour of the current block.

For example, when the mode information of the contour of the current block indicates that the coordinates of the contour of the current block are derivable from the neighboring block of the current block, the video encoding apparatus 10 according to an embodiment may not encode the information about the coordinates of the contour of the current block. Also, when the mode information of the contour of the current block indicates that the coordinates of the contour of the current block are not derivable from the neighboring block of the current block, the video encoding apparatus 10 according to an embodiment may encode the information about the coordinates of the contour of the current block.

The video encoding apparatus 10 according to an embodiment may include a central processor (not shown) generally controlling the segment determiner 12, the prediction performer 14, and the bitstream generator 16. Alternatively, the segment determiner 12, the prediction performer 14, and the bitstream generator 16 may each be operated by a self-processor (not shown), and the video encoding apparatus 10 may be operated as the self-processors mutually operate. Alternatively, the segment determiner 12, the prediction performer 14, and the bitstream generator 16 may be controlled according to control of an external processor (not shown) of the video encoding apparatus 10.

The video encoding apparatus 10 according to an embodiment may include one or more data storage units (not shown) in which input and output data of the segment determiner 12, the prediction performer 14, and the bitstream generator 16 is stored. Also, the video encoding apparatus 10 according to an embodiment may include a memory controller (not shown) managing data input and output of the data storage unit (not shown).

In order to output a video encoding result, the video encoding apparatus 10 according to an embodiment may operate in connection with an internal video encoding processor included therein or with an external video encoding processor to perform video encoding operations including transformation. The internal video encoding processor of the video encoding apparatus 10 may perform video encoding operations as an individual processor. Also, the video encoding apparatus 10, a central operating apparatus, or a graphic operating apparatus may include a video encoding processing module to perform basic video encoding operations.

Figure 2A:
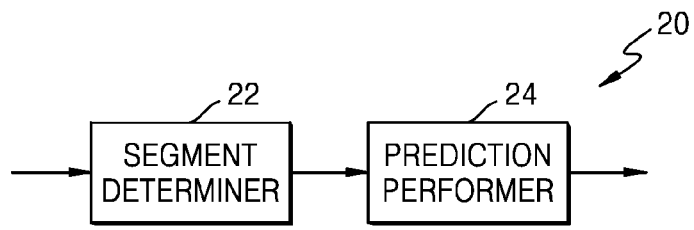
FIG. 2A is a block diagram of a video decoding apparatus performing contour-based intra prediction, according to an embodiment.
Figure 2B:
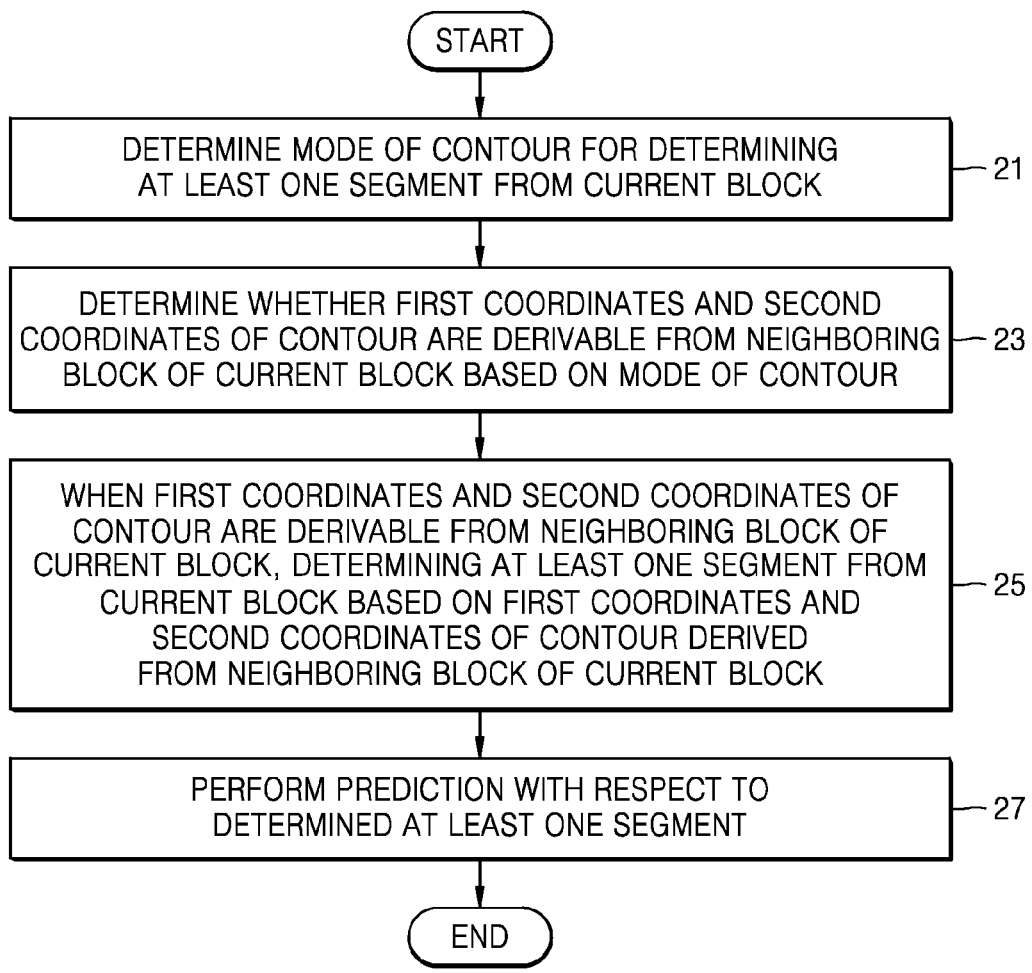
FIG. 2B is a flowchart of a video decoding method performing contour-based intra prediction, according to an embodiment.

FIG. 2A is a block diagram of the video decoding apparatus 20 performing contour-based intra prediction, according to an embodiment. FIG. 2B is a flowchart of a video decoding method performing contour-based intra prediction, according to an embodiment.

Referring to FIG. 2A, the video decoding apparatus 20 may include a segment determiner 22 and a prediction performer 24.

Also, the video decoding apparatus 20 may further include a receiver (not shown) configured to receive and parse a bitstream about an encoded video. For example, the video decoding apparatus 20 according to an embodiment may parse image data encoded according to coding units and information required for encoding and decoding a coding unit.

The video decoding apparatus 20 according to an embodiment reconstructs a current picture by decoding image data in each largest coding unit based on information about a coded depth and encoding mode according to each of the largest coding units of a video. That is, the video decoding apparatus 20 may decode encoded image data based on information about a determined prediction unit, prediction mode, transformation unit, or the like for each coding unit from among coding units included in each largest coding unit. A decoding process may include a prediction process including intra prediction and motion compensation, and an inverse transformation process.

In detail, the segment determiner 22 according to an embodiment may determine whether to perform contour-based prediction on a current block corresponding to a coding unit of a coded depth. In other words, the segment determiner 22 according to an embodiment may determine whether to determine segments that are prediction units for determining prediction of the current block, based on a contour of a boundary of an object included in the current block.

The segment determiner 22 according to an embodiment may determine whether to perform contour-based prediction on the current block by using information indicating a prediction mode, which is received from the video encoding apparatus 10. For example, the information indicating the prediction mode of the current block may include information indicating whether to use a general intra mode using a square or rectangular prediction unit of the current block or whether to use a contour-based intra prediction mode using a segment, i.e., a prediction unit split by using the contour according to the boundary of the object included in the current block.

When it is determined to perform contour-based prediction, the segment determiner 22 according to an embodiment may split the current block into a plurality of segments having various shapes, based on the contour of the current block. Also, when it is determined not to perform contour-based prediction, the segment determiner 22 according to an embodiment may split the current block into one of predetermined partition types of the current block.

When contour-based prediction is performed, the segment determiner 22 according to an embodiment may determine the number of segments of the current block based on information about the number of segments of the current block, the information obtained from a bitstream. For example, when the information about the number of segments of the current block indicates that the number of segments split from the current block is 1, the current block may not be split.

Also, the segment determiner 22 according to an embodiment may determine at least one segment from the current block by using the information about the contour of the current block, the information obtained from the bitstream. For example, the information about the contour of the current block may include mode information of the contour and information about coordinates of the contour.

In detail, the segment determiner 22 according to an embodiment may determine a mode of the contour of the current block based on the mode information of the contour of the current block, and determine whether to parse the information about the coordinates of the contour of the current block from the bitstream. For example, the information about the coordinates of the contour of the current block may include first coordinates information and second coordinates information of the contour of the current block.

When the mode information of the contour of the current block indicates a mode of the contour in which the coordinates of the contour of the current block are derivable from a neighboring block of the current block, the segment determiner 22 according to an embodiment may not parse the information about the coordinates of the contour of the current block. For example, when first coordinates or second coordinates of the contour according to the mode of the contour of the current block are located at a top side or a left side of the current block, the segment determiner 22 may not parse the first coordinates or the second coordinates of the contour of the current block.

Also, when the mode information of the contour of the current block indicates a mode of the contour in which the coordinates of the contour of the current block are not derivable from the neighboring block of the current block, the segment determiner 22 according to an embodiment may determine the coordinates of the contour by using samples inside the current block. For example, when the first coordinates or the second coordinates of the contour according to the mode of the contour of the current block are located at a bottom side or a right side of the current block, the segment determiner 22 may parse the first coordinates or the second coordinates of the contour of the current block from the bitstream.

For example, when the first coordinates of the contour are derived from a neighboring block adjacent to the outside of the top of the current block, the segment determiner 22 according to an embodiment may derive the first coordinates of the contour by using sample values of a series of samples at the lowermost end of an upper neighboring block adjacent to the current block. Also, when the second coordinates of the contour are derived from a neighboring block located at the left of the current block, the segment determiner 22 according to an embodiment may derive the second coordinates of the contour by using sample values of a series of samples at the rightmost side of a left block adjacent to the current block. For example, the coordinates of the contour of the current block may be determined based on a gradient of sample values of a series of samples of a neighboring block.

Also, when the coordinates of the contour of the current block are not derived from the neighboring block of the current block, the segment determiner 22 according to an embodiment may determine the coordinates of the contour of the current block based on coordinates information of the contour obtained from the bitstream.

Detailed methods of determining the coordinates of the contour of the current block, according to various embodiments, will be described below with reference to FIGS. 10 through 16B.

The segment determiner 22 according to an embodiment may determine at least one segment for prediction from the current block based on the determined contour of the current block.

When the at least one segment for prediction of the current block according to an embodiment is determined, a mask of the current block for determining a boundary between the segments may be generated.

In detail, the prediction performer 24 according to an embodiment may determine a mask value of each of the samples of the current block based on a location relationship between the contour of the current block and each of the samples of the current block. The mask of the current block according to an embodiment may indicate regions of the segments of the current block and the boundary between the segments.

Detailed methods of determining the mask of the current block, according to various embodiments, will be described below with reference to FIGS. 17 through 21.

The prediction performer 24 according to an embodiment may perform prediction on the current block by using the neighboring sample of the current block or the generated mask of the current block.

In detail, the prediction performer 24 according to an embodiment may generate a prediction value of the sample value of the segment of the current block by using the neighboring sample of the current block. Here, the sample value of the segment may be a sample value of each of samples included in the segment region. For example, an intra prediction method, such as a DC mode or the like, may be used. A location of the neighboring sample of the current block to be referred to may be determined based on the mode of the contour of the current block.

Also, the prediction performer 24 according to an embodiment may generate the prediction value of the segment of the current block by applying the mask indicating the regions and boundaries of the segments of the current block to the generated sample values of the samples included in the segment region. Here, the prediction value of the segment may be the prediction value of each of the samples included in the segment region.

Detailed methods of generating the prediction value of the current block, according to various embodiments, will be described with reference to FIGS. 22 through 26.

Also, the prediction performer 24 according to an embodiment may perform filtering on the current block on which prediction is performed. For example, filtering may be performed on the prediction values of the samples located at the boundary between the segments of the current block.

The prediction performer 24 according to an embodiment may determine whether to perform filtering on the prediction value of the current block by using information indicating whether to perform filtering, the information parsed from the bitstream. Alternatively, whether to perform filtering may be determined by using the neighboring block of the current block. Alternatively, the filtering may be always performed.

Detailed methods of performing filtering on the current block on which the prediction is performed, according to various embodiments, will be described with reference to FIG. 37.

When a prediction block is generated by performing prediction on the current block according to an embodiment, the video decoding apparatus 20 may reconstruct a video by performing motion compensation by using predicted data. Motion compensation may denote an operation of reconstructing a reconstructed image by combining prediction data and residual data.

Hereinafter, operations of the video decoding apparatus 20 performing contour-based intra prediction will be described with reference to FIG. 2B.

FIG. 2B is a flowchart of a video decoding method performing contour-based intra prediction, according to an embodiment.

In operation 21, the video decoding apparatus 20 according to an embodiment may obtain, from the bitstream, the mode information of the contour for determining at least one segment from the current block.

For example, the video decoding apparatus 20 according to an embodiment may determine whether to perform contour-based prediction on the current block by using information indicating a prediction mode of the current block, the information obtained from the bitstream. For example, the information indicating the prediction mode of the current block may include information indicating whether to use a general intra mode using a square or rectangular prediction unit of the current block or whether to use a contour-based intra prediction mode using a segment, i.e., a prediction unit split by using the contour according to the boundary of the object included in the current block.

When it is determined to perform contour-based prediction on the current block, the video decoding apparatus 20 according to an embodiment may obtain the mode information of the contour of the current block from the bitstream.

In operation 23, the video decoding apparatus 20 according to an embodiment may determine whether the first coordinates and the second coordinates of the contour are derivable from the neighboring block of the current block based on the obtained mode information of the contour of the current block.

For example, when the mode information of the contour of the current block indicates a mode in which the coordinates of the contour of the current block are located at the top side or left side of the current block, the video decoding apparatus 20 according to an embodiment may determine that the coordinates of the contour of the current block are derivable from the neighboring block of the current block. Also, when the mode information of the contour of the current block indicates a mode in which the coordinates of the contour of the current block are located at the bottom side or right side of the current block, the video decoding apparatus 20 according to an embodiment may determine that the coordinates of the contour of the current block are not derivable from the neighboring block of the current block.

In operation S25, when the first coordinates and the second coordinates of the contour are derivable from the neighboring block of the current block, the video decoding apparatus 20 according to an embodiment may determine the at least one segment from the current block based on the first coordinates and the second coordinates of the contour derived from the neighboring block of the current block.

The neighboring block of the current block according to an embodiment may include a block adjacent to the top or left of the current block.

When a side of the current block indicated by the mode of the contour of the current block is the top side or left side of the current block, the video decoding apparatus 20 according to an embodiment may determine that the coordinates of the contour of the current block are derivable from the neighboring block of the current block.

When the first coordinates or the second coordinates of the contour are not derivable from the neighboring block of the current block, the video decoding apparatus 20 according to an embodiment may obtain, from the bitstream, information about the coordinates of the contour, which are not derivable.

The video decoding apparatus 20 according to an embodiment may determine the at least one segment from the current block by using the information about the coordinates of the contour of the current block and the mode information of the contour, which are obtained from the bitstream.

In operation S27, the video decoding apparatus 20 according to an embodiment may perform prediction with respect to the determined at least one segment.

When at least one segment for predicting the current block is determined, the video decoding apparatus 20 according to an embodiment may generate the mask of the current block indicating the boundary between the segments. The video decoding apparatus 20 according to an embodiment may determine the mask value of the sample of the current block based on the location relationship between the sample of the current block and the contour determining the at least one segment from the current block.

Also, the video decoding apparatus 20 according to an embodiment may perform prediction on the current block by using the neighboring sample of the current block and the generated mask of the current block.

The video decoding apparatus 20 according to an embodiment may generate the sample values of the samples included in the segment region of the current block by using the neighboring sample of the current block. For example, an intra prediction method, such as a DC mode or the like, may be used.

Also, the video decoding apparatus 20 according to an embodiment may generate the prediction value of the segment of the current block by applying the mask indicating the regions and boundary of the segments of the current block to the generated sample values of the samples included in the segment region.

The video decoding apparatus 20 according to an embodiment may perform filtering on the current block on which prediction is performed. For example, filtering may be performed on the prediction values of the samples located at the boundary between the segments of the current block. The video decoding apparatus 20 according to an embodiment may use the information indicating whether to perform filtering, the information obtained from the bitstream.

The video decoding apparatus 20 according to various embodiments may include a central processor (not shown) generally controlling the segment determiner 22 and the prediction performer 24. Alternatively, the segment determiner 22 and the prediction performer 24 may each be operated by a self-processor (not shown), and the video decoding apparatus 20 may be operated as the self-processors mutually operate. Alternatively, the segment determiner 22 and the prediction performer 24 may be controlled according to control of an external processor (not shown) of the video decoding apparatus 20.

The video decoding apparatus 20 according to various embodiments may include one or more data storage units (not shown) in which input and output data of the segment determiner 22 and the prediction performer 24 is stored. Also, the video decoding apparatus 20 according to an embodiment may include a memory controller (not shown) managing data input and output of the data storage unit (not shown).

In order to reconstruct a video through video decoding, the video decoding apparatus 20 according to various embodiments may operate in connection with an internal video decoding processor included therein or with an external video decoding processor to perform video decoding operations including inverse transformation. The internal video decoding processor of the video decoding apparatus 20 may perform video decoding operations as an individual processor. Also, the video decoding apparatus 20, a central operating apparatus, or a graphic operating apparatus may include a video decoding processing module to perform basic video decoding operations.

Figure 3:
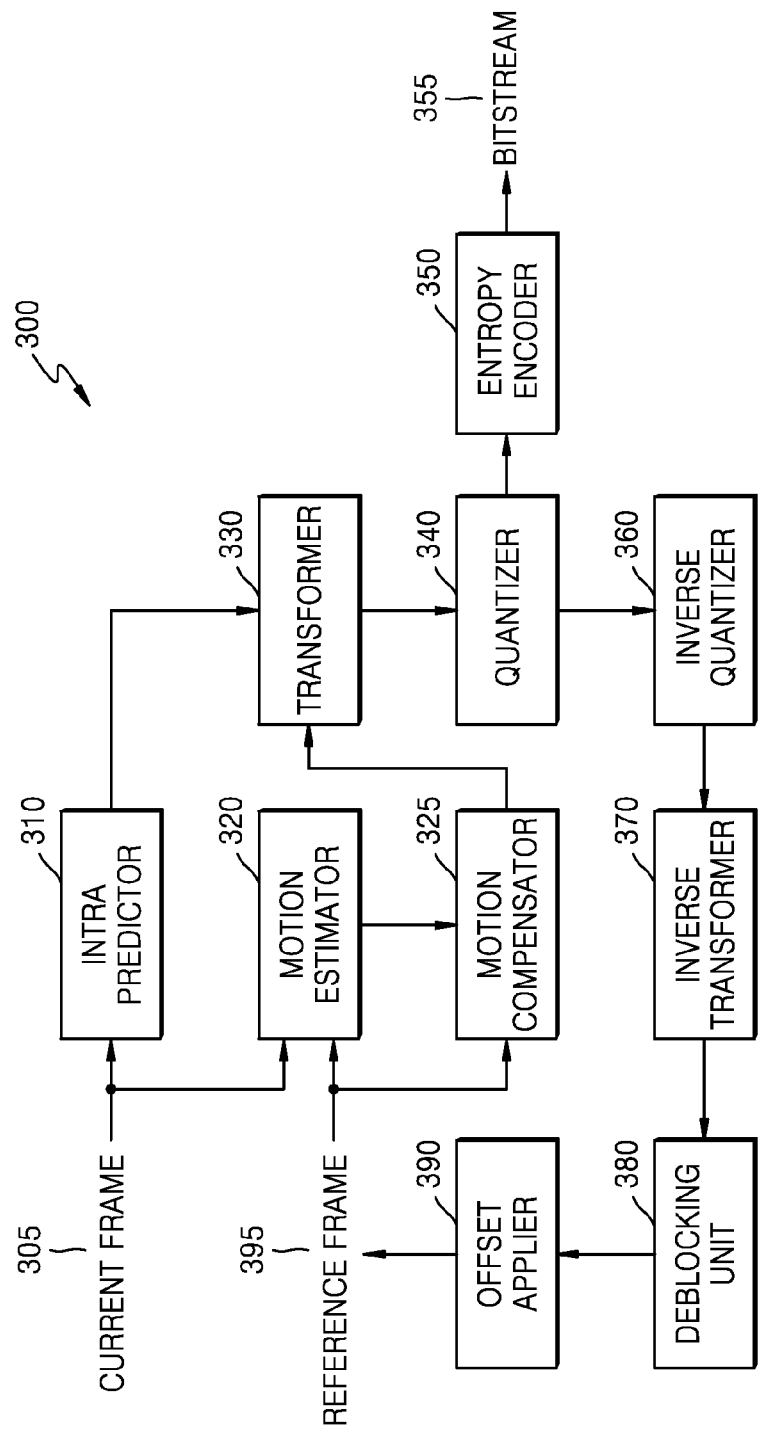
FIG. 3 is a block diagram of a video encoder based on coding units, according to an embodiment.

FIG. 3 is a block diagram of a video encoder 300 based on coding units, according to an embodiment.

The image encoder 300 according to an embodiment performs operations of a segment determiner 12 of the video encoding apparatus 10 to encode image data. In other words, an intra predictor 310 performs intra prediction on coding units in an intra mode, from among a current frame 305, and a motion estimator 320 and a motion compensator 325 respectively perform inter estimation and motion compensation by using the current frame 305, and a reference frame 395 in an inter mode.

Data output from the intra predictor 310, the motion estimator 320, and the motion compensator 325 is output as a quantized transformation coefficient through a transformer 330 and a quantizer 340. The quantized transformation coefficient is reconstructed as data in a spatial domain through an inverse quantizer 360 and an inverse transformer 370, and the reconstructed data in the spatial domain is output as the reference frame 395 after being post-processed through a deblocking unit 380 and an offset applier 390. The quantized transformation coefficient may be output as a bitstream 355 through an entropy encoder 350.

In order for the image encoder 300 to be applied in the video encoding apparatus 10 or 100 according to an embodiment, all elements of the image encoder 300, i.e., the intra predictor 310, the motion estimator 320, the motion compensator 325, the transformer 330, the quantizer 340, the entropy encoder 350, the inverse quantizer 360, the inverse transformer 370, the deblocking unit 380, and the offset applier 390 perform operations based on each coding unit among coding units having a tree structure while considering the maximum depth of each largest coding unit.

Specifically, the intra predictor 310, the motion estimator 320, and the motion compensator 325 determine prediction units and a prediction mode of each coding unit from among the coding units having a tree structure while considering the maximum size and the maximum depth of a current largest coding unit, and the transformer 330 determines the size of the transformation unit in each coding unit from among the coding units having a tree structure. For example, the intra predictor 310 may perform the same operations as the segment determiner 12 of FIG. 1A.

Figure 4:
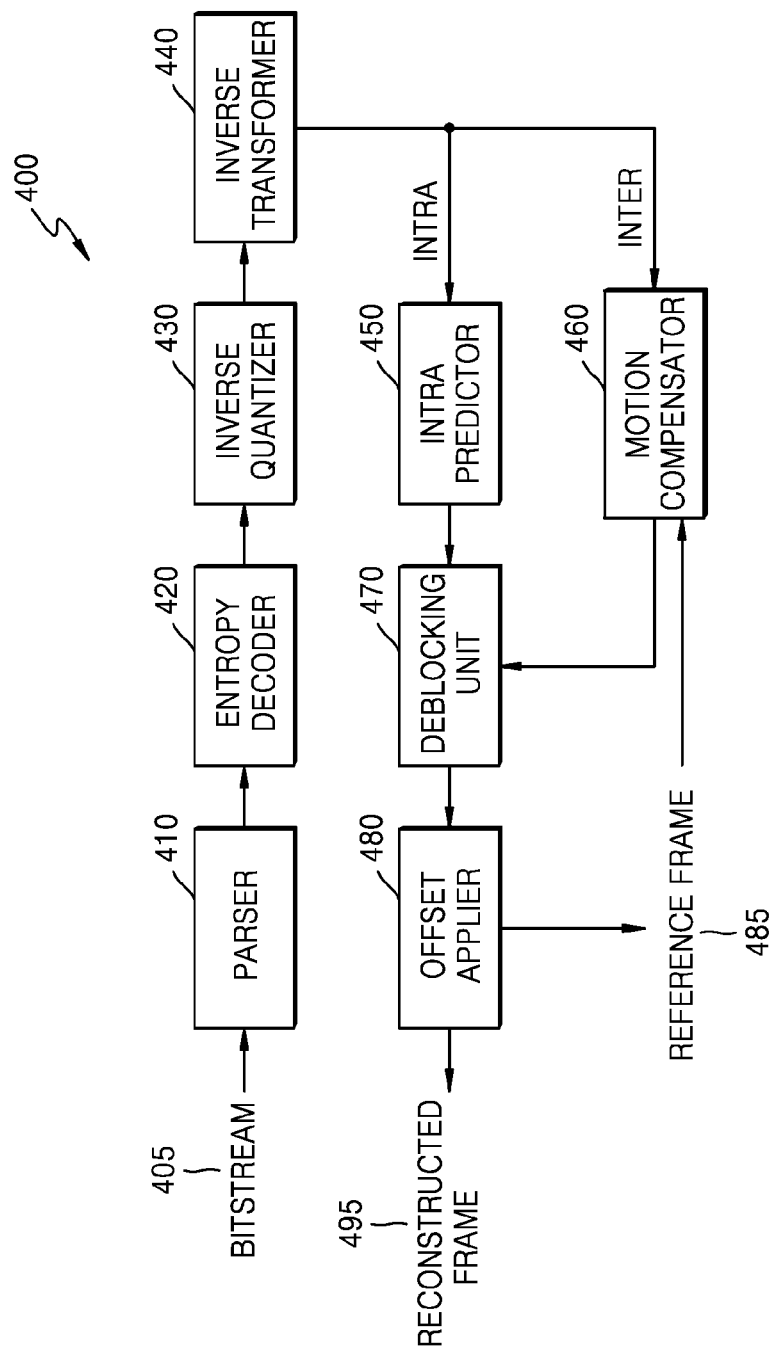
FIG. 4 is a block diagram of a video decoder based on coding units, according to an embodiment.

FIG. 4 is a block diagram of a video decoder 400 based on coding units, according to an embodiment.

Referring to FIG. 4, a parser 410 parses encoded image data to be decoded and information about encoding required for decoding from a bitstream 405. The encoded image data is output as inverse quantized data through an entropy decoder 420 and an inverse quantizer 430, and the inverse quantized data is reconstructed to image data in a spatial domain through an inverse transformer 440.

An intra predictor 450 performs intra prediction on coding units in an intra mode with respect to the image data in the spatial domain, and a motion compensator 460 performs motion compensation on coding units in an inter mode by using a reference frame 485. For example, the intra predictor 450 may perform the same operations as the segment determiner 22 and the prediction performer 24 of FIG. 2A.

The image data in the spatial domain, which passed through the intra predictor 450 and the motion compensator 460, may be output as a reconstructed frame 495 after being post-processed through a deblocking unit 470 and an offset applier 480. Also, the image data that is post-processed through the deblocking unit 470 and the offset applier 480 may be output as the reference frame 485.

In order to decode the image data in the video decoding apparatus 20, the image decoder 400 according to an embodiment may perform operations that are performed after the parser 410.

In order for the image decoder 400 to be applied in the video decoding apparatus 20 according to an embodiment, all elements of the image decoder 400, i.e., the parser 410, the entropy decoder 420, the inverse quantizer 430, the inverse transformer 440, the intra predictor 450, the motion compensator 460, the deblocking unit 470, and the offset adjustor 480 perform operations based on coding units having a tree structure for each largest coding unit.

Specifically, the intra prediction 450 and the motion compensator 460 determine prediction units and a prediction mode for each of the coding units having a tree structure, and the inverse transformer 540 determines a size of a transformation unit for each coding unit.

Figure 5A:
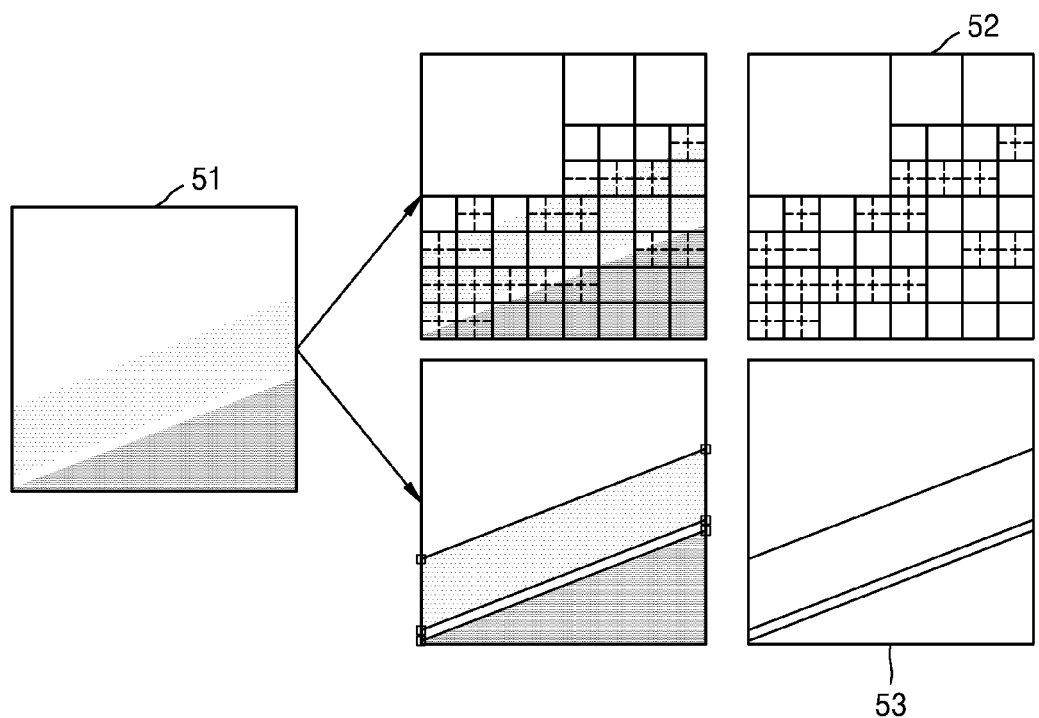
FIGS. 5A through 5C illustrate a method of determining a segment, i.e., a prediction unit for prediction encoding, from a current block, according to various embodiments.
Figure 5B:
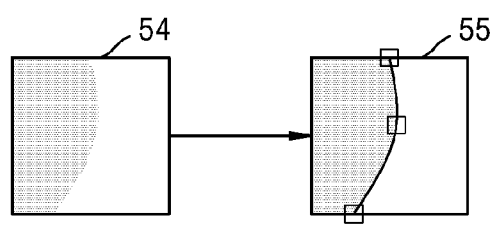
Figure 5C:
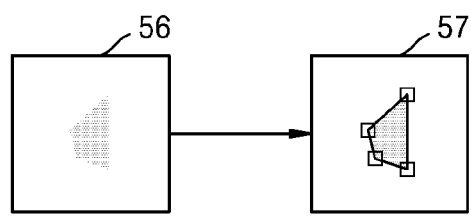

Hereinafter, FIGS. 5A through 5C illustrate a method of determining a segment, i.e., a prediction unit for prediction encoding, from a current block, according to various embodiments.

FIG. 5A is a diagram for comparing a method of determining at least one segment forming a current block from the current block with a method of determining a prediction block from the current block in high efficiency video coding (HEVC).

An original image according to an embodiment may include a boundary of an object indicated in a straight line or the like therein, and may include a current block 51 including the boundary of the object as shown in FIG. 5A.

In order to encode and decode the current block 51 including the boundary of the object therein, for example, a prediction image may be generated by performing intra prediction by using prediction units having a predetermined size, which are obtained by hierarchically splitting the current block 51, in HEVC. In other words, in HEVC, the current block 51 is hierarchically split into square or rectangular prediction units to predict the current block 51, and thus in order to increase precision of prediction, the current block 51 may be split into very small prediction units near the boundary of the object and prediction may be performed on a plurality of prediction units.

When small prediction units are used as such, split information indicating whether a block is split, partition type information indicating a split shape of a block in a split smallest unit, and information generated by splitting a block, such as a prediction mode of the block, are additionally required.

For example, referring to FIG. 5A, in HEVC, a plurality of prediction units may be determined by splitting the current block 51 like a block 52 so as to perform prediction on the current block 51 including the boundary of the object. Here, split information indicating whether the current block 51 is split, the split information indicating whether the block split from the current block 51 is split, and partition type information indicating a split shape of prediction units forming blocks in a split smallest unit may be used. For example, in inter prediction, split information and partition type information about one block may each be information corresponding to one bin or one bit. Here, in order for the current block 51 to be split like the block 52, a plurality of pieces of information of 57 bins may be required according to 17 pieces of split information and 40 pieces of partition type information.

On the other hand, according to a contour-based intra prediction coding method in which a segment, i.e., a prediction unit of a current block, is determined from the current block by using a contour of a boundary of an object included in the current block according to an embodiment, the current block 51 may be split like a block 53 according to the boundary of the object included in the current block 51. Here, information about splitting of a block required to split the current block 51 like the block 53 is information corresponding to nine bins, and may be very small compared to when a split method according to HEVC is used.

For example, according to a method of determining a segment from the current block 51 according to an embodiment, the current block 51 may be split into four segments of the block 53 according to the contour corresponding to the boundary of the object included in the current block 51. The current block 51 may be split by using three straight lines according to the boundary of the object.

In detail, at least one segment may be determined from the current block 51 by using information about the number of segments determined from the current block 51, mode information of the contour for determining at least one segment from the current block 51, and information about coordinates of the contour.

The information about the number of segments determined from the current block 51 according to an embodiment is information for indicating the total number of segments forming the current block 51, and for example, the information about the number of segments split from the current block 51 may be 'the number of segments—1'. When the current block 51 is not split, the segment is one, and thus the information about the number of segments split from the current block 51 may be 0.

The mode information of the contour for determining the segments from the current block 51 according to an embodiment may be information indicating a direction of the contour according to the boundary of the object in the current block 51.

The information about the coordinates of the contour for determining the segments from the current block 51 according to an embodiment is information for specifying a location of the contour, and for example, when the contour is a straight line, may include first coordinates indicating a starting point of the contour and second coordinates indicating an ending point of the contour. Here, each coordinates information may be expressed in an x-coordinate and a y-coordinate regarding each of the coordinates. The coordinates information may be encoded and decoded to be transmitted or received, and may be derived from the current block 51 or neighboring blocks of the current block 51.

According to the method of determining the segments forming the current block 51 from the current block 51, according to an embodiment, an amount of data exchanged between the video encoding apparatus 10 and the video decoding apparatus 20 may be reduced by splitting the current block 51 according to the contour such that transmission efficiency is increased, and also encoding efficiency may be increased. Also, by using the contour corresponding to the boundary of the object included in the current block 51, more accurate prediction is possible, and thus an error of a reconstructed image may be reduced.

Detailed methods of determining the segment for contour-based prediction from the current block 51, according to an embodiment, will be described below with reference to FIGS. 6 through 14.

FIG. 5B illustrates an example of a method of determining at least one segment forming a current block 54 from the current block 54, according to another embodiment.

Referring to FIG. 5B, the current block 54 according to an embodiment may be split like a block 55 according to a boundary of an object included in the current block 54. The boundary of the object included in the current block 54 may be a curve, and the current block 54 may be split like the block 55 according to the contour of the curve or a bent straight line corresponding to the boundary. For example, the contour corresponding to the boundary may be one curve, and two segments forming the current block 54 may be determined.

The current block 54 according to an embodiment may be split into at least one segment by using the information about the coordinates of the contour of the current block 54. The information about the coordinates of the contour according to an embodiment is information for specifying a location of the contour, and for example, may include information about the number of points required to specify the contour and coordinates information indicating a location of each point in the current block 54.

For example, referring to FIG. 5B, the current block 54 may be split like the block 55 by the contour specified by three points. Here, the contour specified by the three points may be a bent straight line or a curve.

Here, various algorithms may be used to specify a contour by using points. For example, a piece wise linear curve, a conic section, or a Bezier curve may be used.

The information (num_point_minus2) about the number of points required to specify the contour, according to an embodiment, may be 'number of points—2', and the information about the number of points required in the block 55 may be 1. Also, the coordinates information of the three points may include first coordinates (seg_start) indicating a starting point of the contour, second coordinates (seg_middle) indicating a bending point of the contour, and third coordinates (seg_end) indicating an ending point of the contour. Here, the coordinates information may be encoded and decoded to be transmitted or received, and may be derived from the current block 54 or neighboring blocks of the current block 54.

The current block 54 according to an embodiment may be split according to the contour such that an amount of data exchanged between the video encoding apparatus 10 and the video decoding apparatus 20 is reduced, and thus transmission efficiency may be increased and encoding efficiency may also be increased. Also, by using the contour, such as a curve, corresponding to the boundary of the object included in the current block 54, more accurate prediction is possible, and thus an error of a reconstructed image may be reduced.

FIG. 5C illustrates an example of a method of determining at least one segment forming a current block 56, according to another embodiment.

Referring to FIG. 5C, the current block 56 according to an embodiment may be split like a block 57 according to a boundary of an object included in the current block 56. The boundary of the object included in the current block 56 may form one closed figure, and may be split like the block 57 according to a contour of the figure corresponding to the boundary. For example, the contour for determining a segment from the current block 56 may be one closed figure, and the segments determined from the current block 56 may be two segments inside and outside of the closed figure.

The current block 56 according to an embodiment may be split into at least one segment by using information about coordinates of the contour for determining a segment from the current block 56. The information about the coordinates of the contour for determining the segment from the current block 56, according to an embodiment, is information for specifying a location of the contour, and for example, may include information about the number of points required to specify the contour and coordinates information indicating a location of each point in the current block 56.

For example, referring to FIG. 5C, the current block 56 may be split like the block 57 according to the contour specified by four points. Here, the contour specified by the four points may be a closed quadrangular figure.

The information (num_point_minus2) about the number of points required to specify the contour, according to an embodiment, may be 'number of points—2', and the information about the number of points required in the block 57 may be 2. Also, the coordinates information of the four points may include first coordinates (seg_start), second coordinates (seg_middle), third coordinates (seg_middle), and fourth coordinates (seg_end) of the closed figure. Here, the coordinates information may be encoded and decoded to be transmitted or received, and may be derived from the current block 56 or neighboring blocks of the current block 56.

The current block 56 according to an embodiment may be split according to the contour such that an amount of data exchanged between the video encoding apparatus 10 and the video decoding apparatus 20 is reduced, and thus transmission efficiency may be increased and encoding efficiency may also be increased. Also, by using the contour, such as a closed figure, corresponding to the boundary of the object included in the current block 56, an error of a reconstructed image may be reduced.

FIG. 6 illustrates a method of determining a segment for prediction encoding from a current block by using a contour according to a boundary of an object, according to various embodiments.

Referring to FIG. 6, in the method of determining the segment for prediction encoding from the current block according to various embodiments, a single straight line, a plurality of straight lines, a bent straight line, a single curve, a plurality of curves, or a closed figure may be used.

Also, the segment for prediction encoding may be determined from the current block by using a combination of the above methods, such as simultaneously using a single straight line and a single curve.

Hereinafter, detailed processes of a method of determining at least one segment for prediction encoding from a current block by using a contour of a single straight line will be described.

Figure 7A:
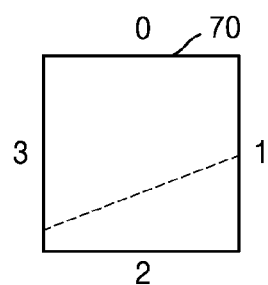
FIGS. 7A and 7B are diagrams for describing a mode of a contour for determining at least one segment from a current block, according to various embodiments.
Figure 7B:
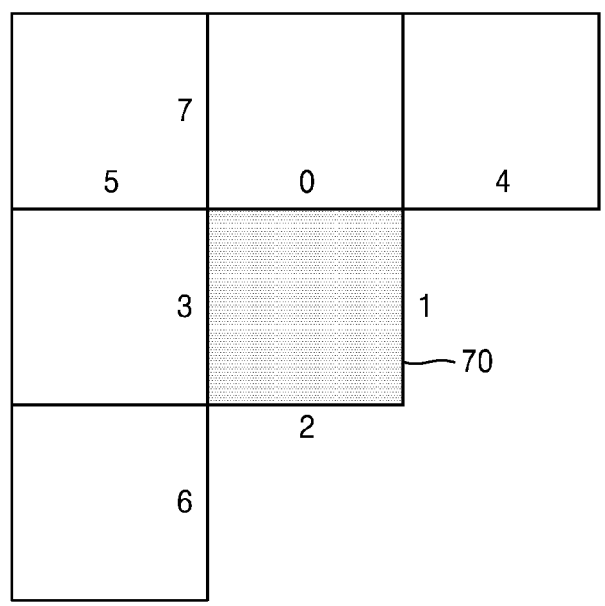

FIGS. 7A and 7B are diagrams for describing a mode of a contour for determining at least one segment from a current block 70, according to various embodiments.

In the current block 70 according to an embodiment, a single linear contour in the current block 70 may be determined, and two segments forming the current block 70 may be determined according to the determined single linear contour.

Here, a mode of the contour for determining the segments split from the current block 70 according to an embodiment may be determined according to a boundary of an object included in the current block 70, and may indicate a direction of the contour.

Referring to FIG. 7A, when the contour used to determine the segments from the current block 70 according to an embodiment is a straight line, the direction of the contour may be specified by specifying a side where the contour passes from among four sides of the current block 70. For example, mode information of the contour may be information indicating at least two sides contacting the contour from among top, right, bottom, and left sides of the current block 70.

A number may be assigned to each of the four sides of the current block 70 according to an embodiment, and all directions of the contour possible through combinations of the assigned numbers may be indicated.

For example, referring to FIG. 7A, 0, 1, 2, and 3 may be respectively assigned to the top, right, bottom, and left sides of the current block 70. Numbers may be assigned to the sides of the current block 70 in an ascending order or descending order in a clockwise direction. For example, when the current block 70 is split into two segments by using the linear contour passing the right and left sides of the current block 70, the mode information of the contour may indicate a '1-3 direction' according to 1 indicating the right side and 3 indicating the left side.

When the numbers are assigned to the four sides of the current block 70 as shown in FIG. 7A, the directions of the linear contour splitting the current block 70 may be a 0-1 direction, a 0-2 direction, a 0-3 direction, a 1-2 direction, a 1-3 direction, and a 2-3 direction. Here, a 1-0 direction is the same direction as the 0-1 direction, and thus may be omitted. Accordingly, the mode information of the contour may be information indicating one of the six directions of the linear contour usable in the current block 70.

Referring to FIG. 7B, the direction of the contour of the current block 70 may be specified by using not only the four sides forming the current block 70, but also sides forming neighboring blocks of the current block 70.

For example, referring to FIG. 7B, 0, 1, 2, and 3 are assigned respectively to the top, right, bottom, and left sides of the current block 70, and 4, 5, 6, and 7 may be assigned respectively to a top side of a right block of the current block 70, a top side of a left block of the current block 70, a right side of a lower left block of the current block 70, and a left side of an upper block of the current block.

By using not only the four sides forming the current block 70, but also the sides forming the neighboring blocks of the current block 70, the directions of the contour of the current block 70 may be more diversified. Here, the mode information of the contour indicating the direction of the contour may indicate one of more than six directions.

In addition to the method of FIGS. 7A and 7B, a direction of a contour may be specified by assigning numbers to sides forming the current block 70 or neighboring sides of the current block 70 via various manners so as to determine the direction of the contour.

Figure 8:
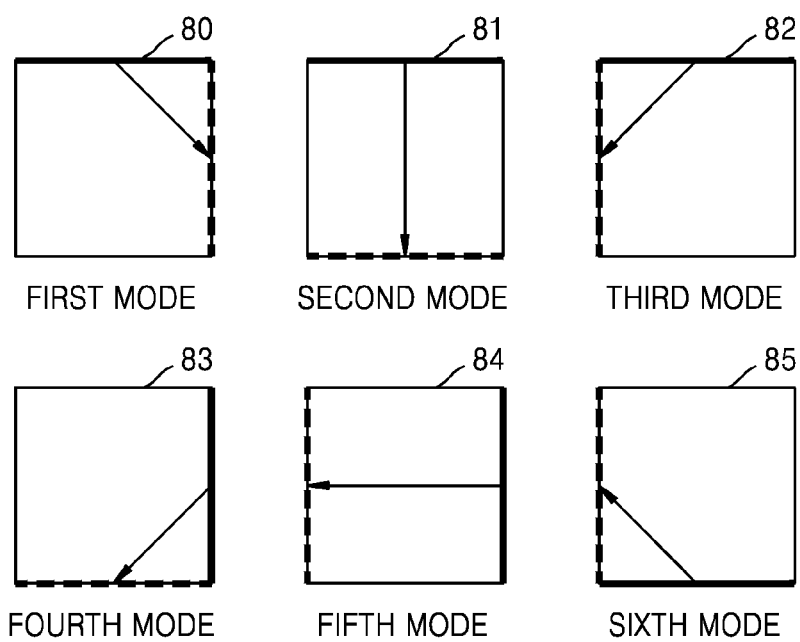
FIG. 8 illustrates examples of the mode of the contour for determining at least one segment from the current block of FIG. 7A.

FIG. 8 illustrates examples of the mode of the contour for determining at least one segment from the current block 70 of FIG. 7A.

When the current block 70 of FIG. 7A according to an embodiment is split based on the contour of the single straight line, the current block 70 may be split like one of blocks 80 through 85 of FIG. 8 in the direction of the contour.

In other words, when the numbers are assigned to the four sides of the current block 70 as shown in FIG. 7A, the mode of the contour indicating the direction of the contour splitting the current block 70 may be one of a first mode (0-1 direction), a second mode (0-2 direction), a third mode (0-3 direction), a fourth mode (1-2 direction), a fifth mode (1-3 direction), and a sixth mode (2-3 direction). In FIG. 8, the modes of the contours of the blocks 80 through 85 are respectively first through sixth modes.

For example, referring to the block 80, the mode of the contour may be the first mode when a starting point, i.e., one end, of the contour splitting the block 80 is located at a top side of the block 80 and an ending point, i.e., the other end, is located at a right side of the block 80. Here, the mode of the contour is the first mode regardless of where the starting point of the contour is located at the top side of the block 80 and where the ending point is located at the right side of the block 80.

Also, referring to the block 81, the mode of the contour may be the second mode when the starting point of the contour splitting the block 81 is located at a top side of the block 81 and the ending point is located at a bottom side of the block 81. Also, referring to the block 82, the mode of the contour may be the third mode when the starting point of the contour splitting the block 82 is located at a top side of the block 82 and the ending point is located at a left side of the block 82.

Also, referring to the block 83, the mode of the contour may be the fourth mode when the starting point of the contour splitting the block 82 is located at a right side of the block 83 and the ending point is located at a bottom side of the block 83. Also, referring to the block 84, the mode of the contour may be the fifth mode when the starting point of the contour splitting the block 84 is located at a right side of the block 84 and the ending point is located at a left side of the block 84. Also, referring to the block 85, the mode of the contour may be the sixth mode when the starting point of the contour splitting the block 85 is located at a bottom side of the block 85 and the ending point is located at a left side of the block 85.

The mode of the contour for determining at least one segment from the block 70 according to an embodiment may be determined to be one of the first through sixth modes. For example, the video encoding apparatus 10 may select a mode having the optimum RD cost by performing encoding and decoding of the current block 70 according to all of the first through sixth modes by using a rate-distortion optimization (RDO) method.

Alternatively, in order to reduce complexity, the video encoding apparatus 10 may calculate a cost with respect to each side of the current block 70, and determine the mode of the contour of the current block 70 based on the calculated cost with respect to each side. The cost with respect to each side of the current block 70 may be calculated by using samples corresponding to each side. For example, the cost with respect to the top side of the current block 70 may be calculated by using samples located in the current block 70 and contacting the top side. Similarly, the costs with respect to the right, bottom, and left sides of the current block 70 may be calculated by respectively using right side adjacent samples, bottom side adjacent samples, and left side adjacent samples in the current block 70.

For example, the cost with respect to each side according to an embodiment may be a variance of the samples of each side. The video encoding apparatus 10 may select two sides having the highest variance of samples corresponding to the sides from among the sides of the current block 70, and determine the mode of the contour indicating the selected two sides.

Here, the variance with respect to each side of the current block 70 may be obtained only with respect to a luma block, or by using both the luma block and a chroma block. Alternatively, a variance using both the luman block and the chroma block may be obtained by assigning different weights to a variance with respect to the luma block and a variance with respect to the chroma block.

Alternatively, the cost with respect to each side of the current block 70 according to another embodiment may be a total sum of difference values between adjacent samples with respect to samples of each side. Also, the cost with respect to each side according to another embodiment may be a total sum of absolute values of result values obtained by applying a 1-dimensional (1D) Sobel operator to the samples of each side.

Alternatively, the cost with respect to each side of the current block 70 according to an embodiment may be calculated by considering availability of each side of the current block 70. For example, the availability of each side of the current block 70 may indicate availability of a neighboring block adjacent to the outside of each side of the current block 70.

The video encoding apparatus 10 according to an embodiment may determine the mode of the contour from among the modes except a mode that includes an unavailable side, while considering the availability with respect to each side. For example, when the current block 70 is a block located at an edge of an image, some sides of the sides of the current block 70 may not be available.

Alternatively, the mode of the contour for determining at least one segment from the current block 70 according to an embodiment may be determined by combining the above methods. For example, some of the six modes are selected by using the cost with respect to each side of the current block 70, and the current block 70 is encoded or decoded with respect to the selected some modes to determine one mode having the optimum RD cost as the final mode of the contour.

Figure 9:
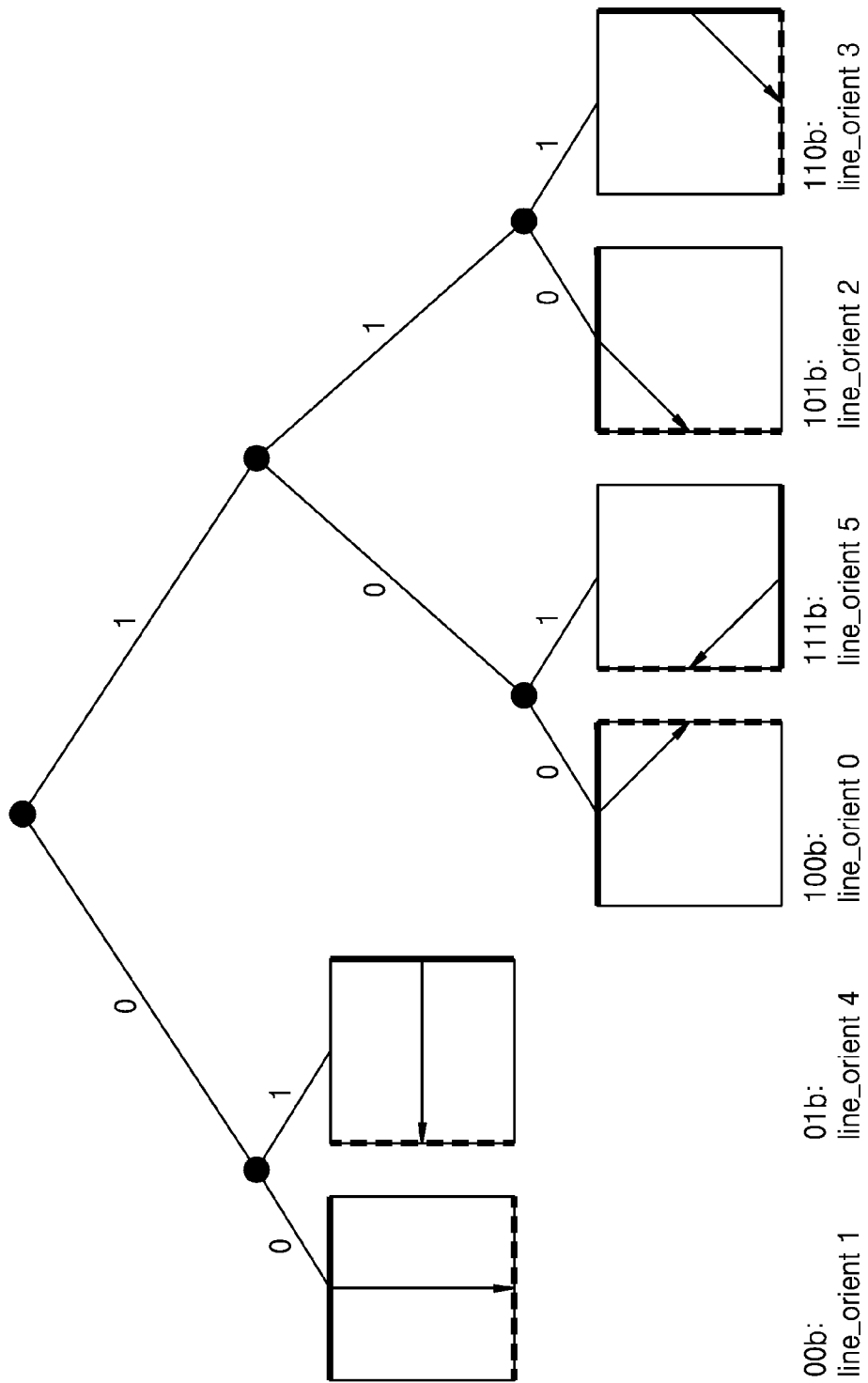
FIG. 9 illustrates examples of mode information of a contour, which indicates the mode of the contour of FIG. 8.

FIG. 9 illustrates examples of mode information of a contour, which indicates the mode of the contour of FIG. 8.

As described above with reference to FIG. 8, when a current block is split based on a contour of a single straight line, a mode of the contour indicating a direction of the contour may include six modes. Here, mode information of the contour indicating the mode of the contour may be encoded and decoded by using various encoding methods, such as fixed length coding (FLC), variable length coding (VLC), and arithmetic coding.

For example, referring to FIG. 8, when a VLC method is used, information indicating a second mode and a fifth mode may be binarized to 2 bits, and information indicating first, third, fourth, and sixth modes may be binarized to 3 bits.

Referring to FIG. 9, when the mode of the contour is the first mode (line_orient 0), the mode information of the contour may be expressed in a binary number 100. Also, when the mode of the contour is the second mode (line_orient 1), the mode information of the contour may be expressed in a binary number 00. When the mode of the contour is the third mode (line_orient 2), the mode information of the contour may be expressed in a binary number 101. When the mode of the contour is the fourth mode (line_orient 3), the mode information of the contour may be expressed in a binary number 110. When the mode of the contour is the fifth mode (line_orient 4), the mode information of the contour may be expressed in a binary number 01. When the mode of the contour is the sixth mode (line_orient 5), the mode information of the contour may be expressed in a binary number 111.

However, an embodiment is not limited thereto, and the mode information of the contour may be expressed in various manners.

In a video encoding apparatus, the binarized mode information of the contour may be included in a bitstream via arithmetic coding, and transmitted to the video decoding apparatus 20. The video decoding apparatus 20 may perform arithmetic decoding and inverse binarization on the received bitstream to obtain the mode information of the contour of the current block.

Hereinafter, a method of determining coordinates of a contour for determining at least one segment from a current block, according to various embodiments, will be described with reference to FIGS. 10 through 16B.

Figure 10:
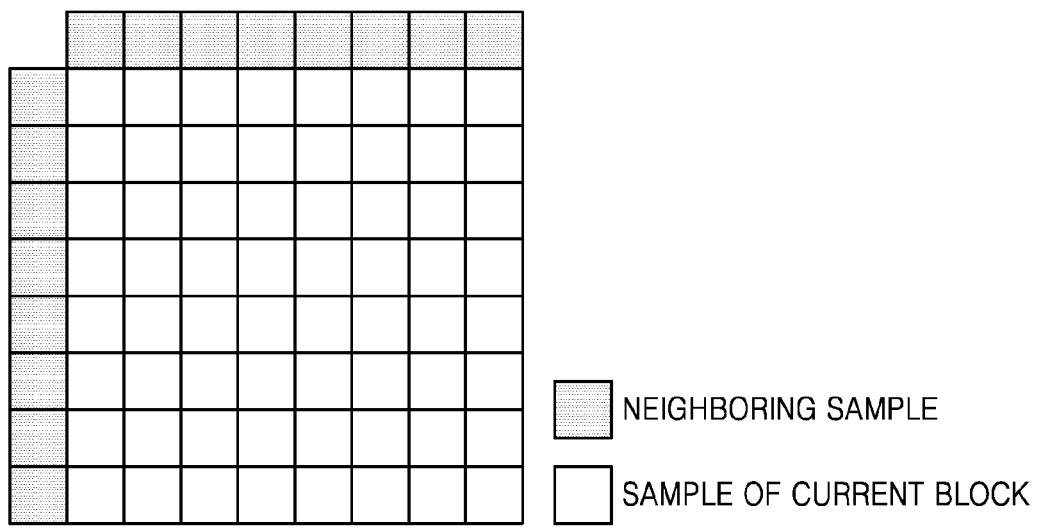
FIG. 10 illustrates a current block according to an embodiment.

FIG. 10 illustrates a current block according to an embodiment.

Referring to FIG. 10, the current block may be a block having a size of 8×8. The size of the current block is expressed in width×height, and may alternatively be 64×64, 32×32, or 16×16. Also, the current block may have various sizes, such as M×N. Here, M and N may be different integers.

In FIG. 10, samples in the current block are white and neighboring samples of the current block are gray.

Coordinates of a contour of the current block according to an embodiment may be determined by using the samples in the current block. In detail, when the contour is a single linear contour, two ends (a starting point and an ending point) of the contour are located at sides indicated by a mode of the contour according to the mode of the contour, and thus the coordinates of the contour may be determined by using the samples in the current block which correspond to sides indicated by the mode of the contour. For example, the coordinates of the contour may be determined based on a gradient of sample values between the samples in the current block.

In detail, when the mode of the contour is the first mode indicating a top side and a right side of the current block, first coordinates of the contour may be determined by using samples in the current block corresponding to the top side of the current block, and second coordinates of the contour may be determined by using samples in the current block corresponding to the right side of the current block. In other words, the first coordinates of the contour may be a location of one of the samples adjacent inside to the top side, and the second coordinates of the contour may be a location of one of the samples adjacent inside to the right side. Here, the location of the sample may be an integer pixel unit or a sub-pixel unit.

In other words, the samples in the current block corresponding to the side indicated by the mode of the contour according to an embodiment may be samples adjacent inside to each side of the current block. For example, the samples corresponding to the top side of the current block may be samples located uppermost end in the current block. Also, the samples corresponding to the right, bottom, and left sides of the current block may be respectively rightmost side samples, lowermost end samples, and leftmost side samples in the current block. Referring to FIG. 10, the uppermost end samples, the rightmost side samples, the lowermost end samples, and the leftmost samples in the current block may respectively be 8 white samples.

Also, the coordinates of the contour for determining at least one segment from the current block according to an embodiment may be derived from a neighboring block of the current block. In detail, the coordinates of the contour may be determined by using neighboring blocks adjacent outside to the side indicated by the mode of the contour. For example, the coordinates of the contour may be determined based on a gradient of sample values between samples in the neighboring block of the current block. Here, the samples in the neighboring block may be reconstructed samples.

For example, when the mode of the contour is a third mode indicating the top side and the left side of the current block, the first coordinates of the contour may be derived by using samples of a neighboring block adjacent to an upper outside of the current block. The first coordinates of the contour may be determined by using lowermost end samples of an upper neighboring block of the current block. Also, the second coordinates of the contour may be derived by using samples of a neighboring block adjacent a left outside of the current block. The second coordinates of the contour may be determined by using rightmost end samples of a left neighboring block of the current block.

In FIG. 10, the samples in the neighboring block adjacent to the side indicated by the mode of the contour according to an embodiment are samples adjacent to the top or left side of the current block, and may include eight samples (shaded) adjacent to the top side and eight gray samples (shaded) adjacent to the left side.

When the coordinates of the contour for determining at least one segment from the current block are derived from the neighboring block of the current block, the derived coordinates of the contour may be refined, and the current block may be encoded and decoded by using the refined coordinates of the contour.

The video encoding apparatus 10 according to an embodiment may encode and transmit, to the video decoding apparatus 20, the coordinates of the contour of the current block. Alternatively, the video encoding apparatus 10 according to an embodiment may not transmit the coordinates of the contour when the coordinates of the contour of the current block are derivable from the neighboring block of the current block.

When the coordinates of the contour for determining at least one segment from the current block are derived from the neighboring block of the current block, the video encoding apparatus 10 may encode and transmit, to the video decoding apparatus 20, a differential value of a value of coordinates of the contour derived from the neighboring block and a value of coordinates of the contour determined by using the samples in the current block. The video decoding apparatus 20 may determine the coordinates of the contour of the current block based on the value of the coordinates of the contour derived from the neighboring block of the current block and the received differential value.

Figure 11:
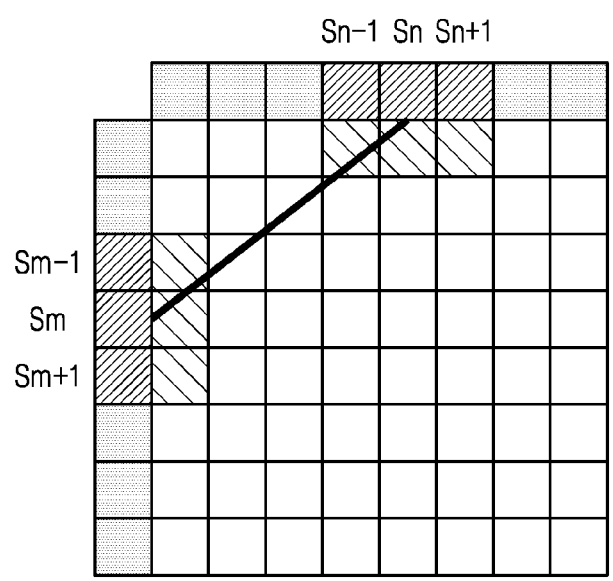
FIG. 11 illustrates a method of determining coordinates of a contour for determining at least one segment from a current block, according to an embodiment.

FIG. 11 illustrates a method of determining coordinates of a contour for determining at least one segment from a current block, according to an embodiment.

Referring to FIG. 11, samples in the current block and neighboring samples of the current block are illustrated.

When the coordinates of the contour for determining at least one segment from the current block are determined, the coordinates of the contour of the current block may be determined by using the samples in the current block or neighboring samples adjacent to the current block as described with reference to FIG. 10. In detail, a location of a sample having the maximum gradient of sample values between samples from among the samples in the current block and the neighboring samples adjacent to the current block may be determined as a location of the coordinates of the contour.

For example, the coordinates of the contour may be determined by applying a 1D sobel operator having a filter value, such as [−1, 0, 1], to the samples in the current block or the neighboring samples adjacent to the current block. In detail, a location of a sample having the maximum absolute value of a result obtained by applying a 1D Sobel operator may be determined as the coordinates of the contour. For example, first coordinates and second coordinates of the contour may be determined based on equations below.

$$\text{line\_pos1\_}n = \arg\max_n(|S_{n-1} - S_{n+1}|)$$

$$\text{line\_pos2\_}m = \arg\max_n(|S_{m-1} - S_{m+1}|)$$

Here, $S_n$, $S_{n-1}$, and $S_{n+1}$ are respectively a sample value of a sample at an n location, a sample value of a sample at an n−1 location, and a sample value of a sample at an n+1 location, and $S_m$, $S_{m-1}$, and $S_{m+1}$ are respectively a sample value of a sample at an m location, a sample value of a sample at an m−1 location, and a sample value of a sample at an m+1 location. n may be an x-coordinate of a sample and m may be a y-coordinate of a sample. line_pos1_n may be a coordinate of the first coordinates of the contour, and line_pos2_m may be a y-coordinate of the second coordinates of the contour. For example, when the first coordinates of the contour according to a mode of the contour are located at a top side of the current block, n may be an x-coordinate of uppermost end samples of the current block or upper samples adjacent to the current block, and the first coordinates of the contour may be (line_pos1_n, 0).

Also, when the first coordinates of the contour according to the mode of the contour are located at a right side of the current block, n may be a y-coordinate of rightmost side samples of the current block, and the first coordinates of the contour may be (nCbS-1, line_pos1_n). nCbS may be a size of the current block in a horizontal direction or vertical direction.

Also, when the second coordinates of the contour according to the mode of the contour are located at a bottom side of the current block, m may be an x-coordinate of lowermost end samples of the current block, and the second coordinates of the contour may be (line_pos2_m, nCbS-1). Also, when the second coordinates of the contour according to the mode of the contour are located at a left side of the current block, m may be a y-coordinate of leftmost side samples of the current block or left samples adjacent to the current block, and the second coordinates of the contour may be (0, line_pos2_m).

Here, values of the first and second coordinates of the contour may be determined in integer pixel units or sub-pixel units.

For example, referring to FIG. 11, when a mode of the contour of the current block is a third mode, the first coordinates of the contour may be determined to be (line_pos1_n, 0) by using samples adjacent to the outside of the top side of the current block or samples adjacent to the inside of the top side, and the second coordinates of the contour may be determined to be (0, line_pos2_m) by using samples adjacent to the outside of the left side of the current block or samples adjacent to the inside of the left side.

Also, the coordinates of the contour of the current block according to another embodiment may be determined by prioritively determining the first coordinates of the contour and determining the second coordinates of the contour by using the determined first coordinates. In detail, first, the first coordinates may be determined by using the method described above with respect to one side of the current block indicated by the mode of the contour. For example, the first coordinates of the contour may be determined based on an equation below.

$$\text{line\_pos1\_}n = \arg\max_n(|S_{n-1} - S_{n+1}|)$$

Also, the second coordinates of the contour may be determined by using samples corresponding to the other side of the current block indicated by the mode of the contour and neighboring samples of the determined first coordinates. The second coordinates of the contour may be determined by using a correlation between neighboring samples of the first coordinates and neighboring samples of the second coordinates. For example, the second coordinates of the contour may be determined based on an equation below.

$$\text{line\_pos2\_}m = \arg\max_m(4*|S_{m-1} - S_{m+1}| - |S_{n-1} - S_{n+1}| - |S_{n-1} - S_{m+1}|)$$

Here, when the second coordinates (0, line_pos2_m) of the contour are calculated, $S_{n-1}$ and $S_{n+1}$, which are sample values of the neighboring samples of the pre-determined first coordinates of the contour, may be used.

In addition, the coordinates of the contour of the current block may be determined by using various types of operators used to detect a boundary.

Also, when the coordinates of the contour of the current block are determined by using the samples in the current block or the neighboring samples adjacent to the current block, sample values of the samples in the current block or the neighboring samples adjacent to the current block may be used as they are, or the sample values filtered by applying a filter to the sample values to remove noise or the like may be used. For example, the filter applied to the sample values may be a low-pass filter or a 1D Gaussian filter having a filter value, such as [1, 2, 1].

Also, according to another embodiment, the first coordinates or the second coordinates of the contour may be determined to be one of a plurality of candidate coordinates. For example, N candidate coordinates having the optimum cost may be determined by using the samples in the current block or the neighboring samples adjacent to the current block. For example, the costs of the candidate coordinates may be determined according to equations described above. One of the determined N candidate coordinates may be determined as the first coordinates or the second coordinates of the contour. For example, index information indicating one of the candidate coordinates may be exchanged between the video encoding apparatus 10 and the video decoding apparatus 20.

Figure 12:
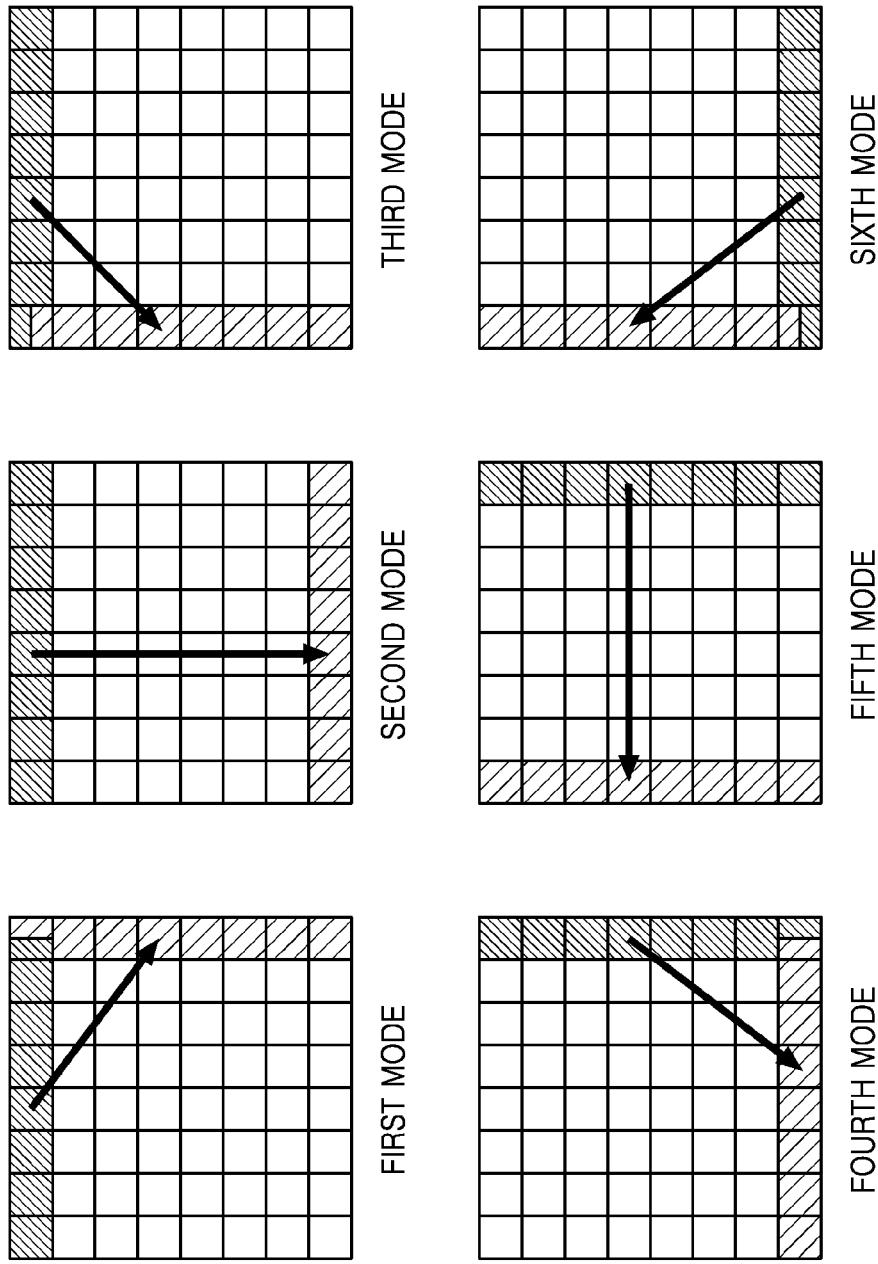
FIGS. 12 through 14 illustrate a method of determining coordinates of a contour for determining at least one segment from a current block, according to various embodiments.
Figure 13:
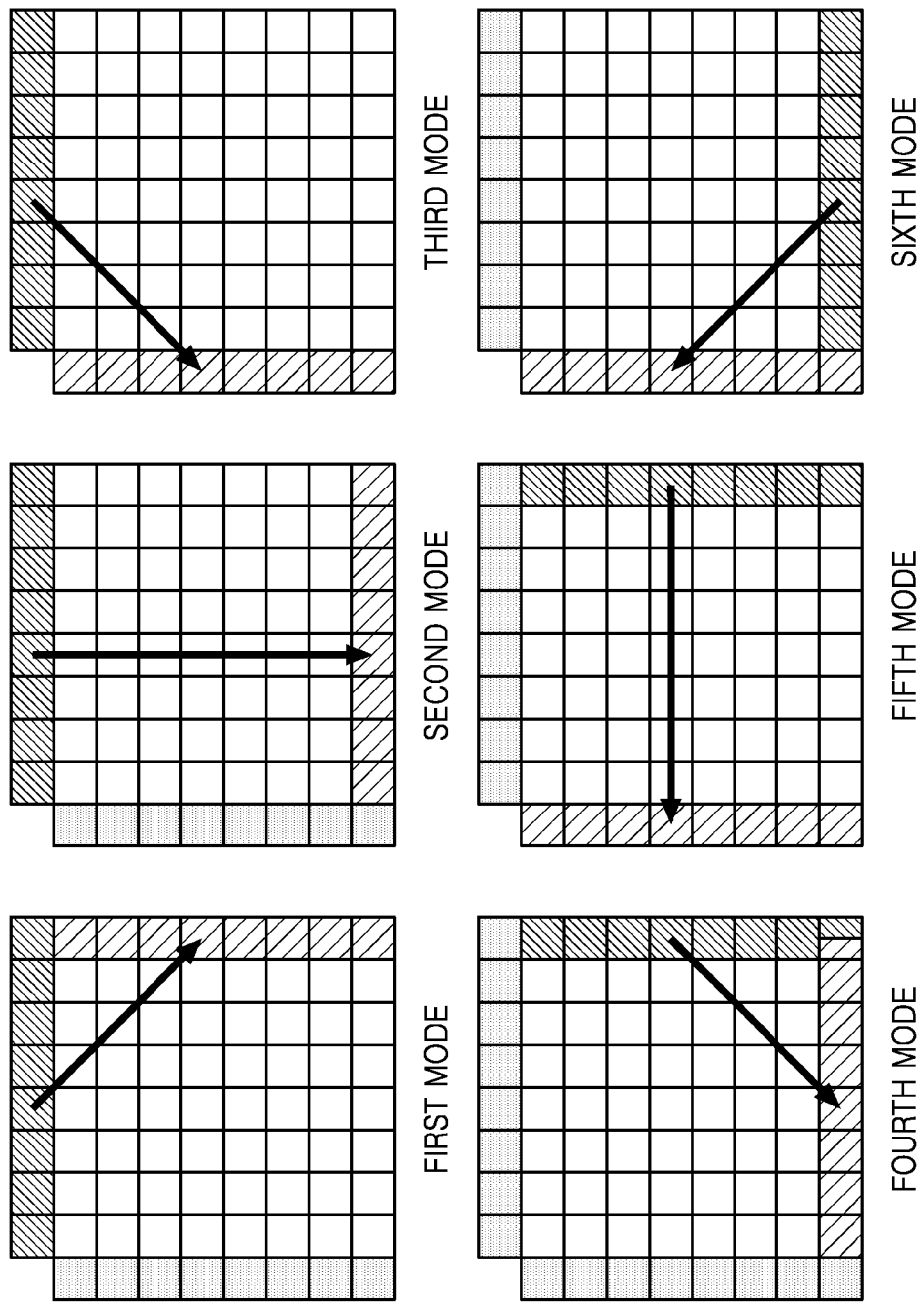
Figure 14:
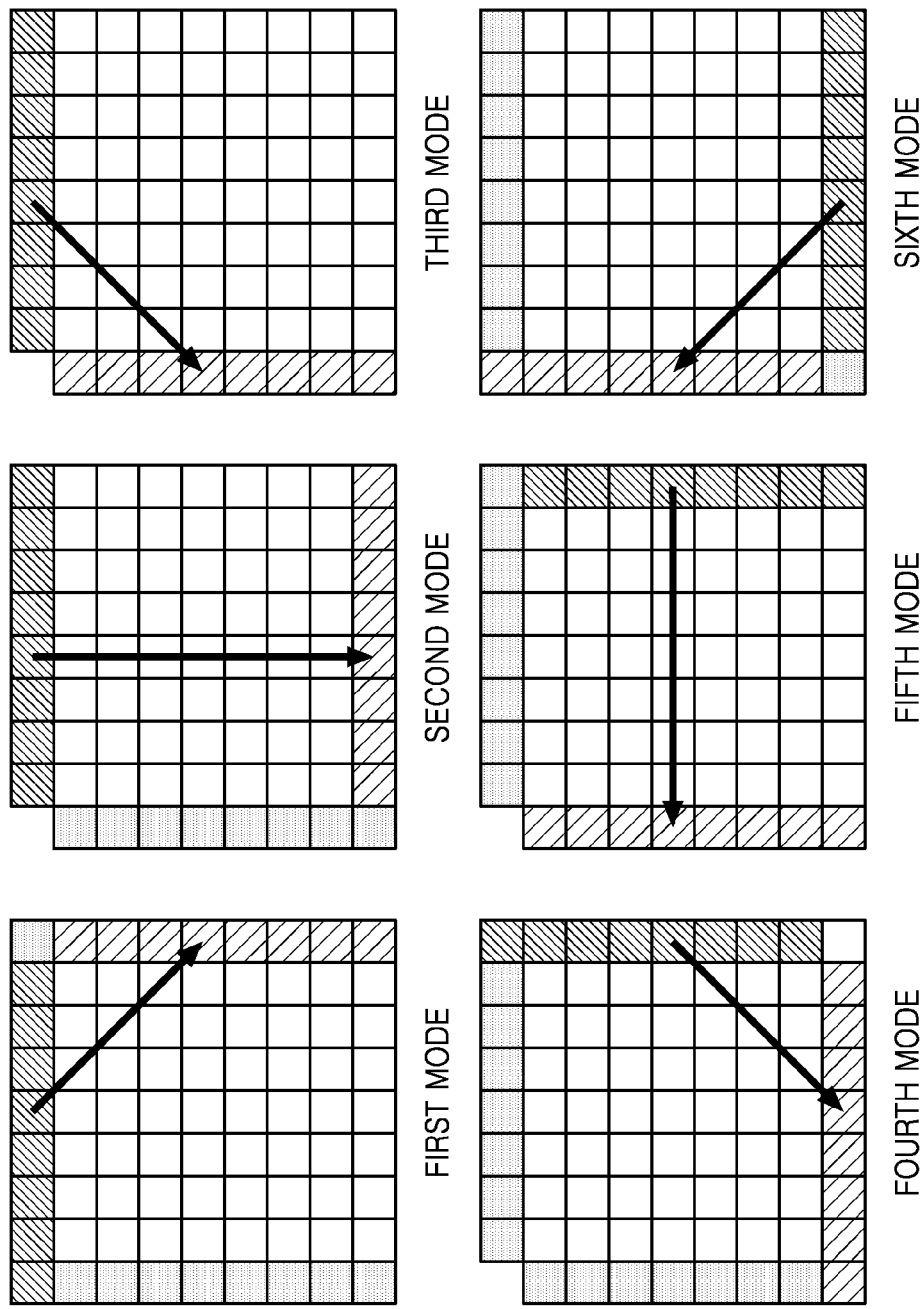

FIGS. 12 through 14 illustrate a method of determining coordinates of a contour for determining at least one segment from a current block, according to various embodiments.

In FIGS. 12 through 14, the current block may be a block having a size of 8×8. The size of the current block is expressed in width×height, and may alternatively have a size of 64×64, 32×32, or 16×16. Alternatively, the current block may have various sizes, such as M×N. Here, M and N may be integers having different sizes.

Referring to FIG. 12, the current block may determine the coordinates of the contour for determining a segment by using samples in the current block. For example, the coordinates of the contour may be determined by using sample values of samples adjacent to a side of the current block and located inside the current block.

For example, in FIG. 12, when the mode of the contour is a first mode, first coordinates of the contour may be determined by using eight samples adjacent to a top side in the current block, and second coordinates of the contour may be determined by using eight samples adjacent to a right side in the current block. Here, an upper right sample of the current block is an overlapping sample and may be used to determine the first coordinates and also the second coordinates.

Also, when the mode of the contour is a second mode, the first coordinates of the contour may be determined by using eight samples adjacent to the top side in the current block, and the second coordinates of the contour may be determined by using eight samples adjacent to a bottom side in the current block.

Also, when the mode of the contour is a third mode, the first coordinates of the contour may be determined by using eight samples adjacent to the top side in the current block, and second coordinates of the contour may be determined by using eight samples adjacent to a left side in the current block. Here, an upper left sample of the current block is an overlapping sample and may be used to determine the first coordinates and also the second coordinates.

Also, when the mode of the contour is a fourth mode, first coordinates of the contour may be determined by using eight samples adjacent to the right side in the current block, and second coordinates of the contour may be determined by using eight samples adjacent to the bottom side in the current block. A lower right sample of the current block is an overlapping sample and may be used to determine the first coordinates and also the second coordinates.

Also, when the mode of the contour is a fifth mode, the first coordinates of the contour may be determined by using eight samples adjacent to the right side in the current block, and second coordinates of the contour may be determined by using eight samples adjacent to the left side in the current block.

Also, when the mode of the contour is a sixth mode, the first coordinates of the contour may be determined by using eight samples adjacent to the bottom side in the current block, and second coordinates of the contour may be determined by using eight samples adjacent to the left side in the current block. A lower left sample of the current block is an overlapping sample and may be used to determine the first coordinates and also the second coordinates.

Referring to FIG. 13, coordinates of a contour for determining a segment may be determined by using not only samples in a current block, but also neighboring samples of the current block. When the neighboring samples adjacent to the outside of the current block are available, the coordinates of the contour may be determined by using sample values of the neighboring samples adjacent to the outside of the current block. For example, in FIG. 13, the available neighboring samples adjacent to the outside of the current block may include eight samples adjacent to a top side of the current block or eight samples adjacent to a left side of the current block.

For example, in FIG. 13, when a mode of the contour is a first mode, first coordinates of the contour may be determined by using eight neighboring samples adjacent to the outside of the top side of the current block, and second coordinates of the contour may be determined by using eight samples adjacent to a right side in the current block.

Also, when the mode of the contour is a second mode, the first coordinates of the contour may be determined by using eight neighboring samples adjacent to the outside of the top side of the current block, and the second coordinates of the contour may be determined by using eight samples adjacent to a bottom side in the current block.

Also, when the mode of the contour is a third mode, the first coordinates of the contour may be determined by using eight neighboring samples adjacent to the outside of the top side of the current block, and the second coordinates of the contour may be determined by using eight samples adjacent to a left side in the current block.

Also, when the mode of the contour is a fourth mode, the first coordinates of the contour may be determined by using eight neighboring samples adjacent to the right side of the current block, and the second coordinates of the contour may be determined by using eight samples adjacent to a bottom side in the current block. A lower right sample of the current block is an overlapping sample, and may be used to determine the first coordinates and also the second coordinates.

Also, when the mode of the contour is a fifth mode, the first coordinates of the contour may be determined by using eight neighboring samples adjacent to the right of the top side of the current block, and the second coordinates of the contour may be determined by using eight samples adjacent to the outside of the left side of the current block.

Also, when the mode of the contour is a sixth mode, the first coordinates of the contour may be determined by using eight neighboring samples adjacent to the bottom side of the current block, and the second coordinates of the contour may be determined by using eight samples adjacent to the inside of the left side in the current block.

Alternatively, when neighboring samples adjacent to the outside of the right side of the current block or neighboring samples adjacent to the outside of the bottom side are available, the coordinates of the contour may be determined by using the neighboring samples adjacent to the outside of the right side or the neighboring samples adjacent to the outside of the bottom side.

When the coordinates of the contour according to an embodiment are derivable by using the neighboring sample of the current block, the video encoding apparatus 10 may not transmit the derivable coordinates of the contour to the video decoding apparatus 20, and may transmit only information about coordinates of the contour that is not derivable.

Alternatively, when the coordinates of the contour are derivable, the video encoding apparatus 10 may encode and transmit, to the video decoding apparatus 20, a differential value of values of the coordinates of the contour derived from the neighboring block and values of the coordinates of the contour determined by using the samples in the current block. The video decoding apparatus 20 may determine the coordinates of the contour of the current block by adding the values of the coordinates of the contour derived from the neighboring block to the differential value received from a bitstream.

Referring to FIG. 14, a current block may determine coordinates of a contour for determining a segment by using not only samples in the current block, but also neighboring samples of the current block. Here, the coordinates of the contour according to an embodiment may be determined by using samples at locations obtained by shifting the samples of FIG. 13. In other words, samples obtained by extending the samples in the current block and the neighboring samples of the current block in upper, lower, left, or right direction may be used.

For example, in FIG. 14, when a mode of the contour is a first mode, first coordinates of the contour may be determined by using eight samples at locations obtained by moving eight samples adjacent to the outside of a top side of the current block to left by 1, and second coordinates of the contour may be determined by using eight samples adjacent to a right side in the current block.

Also, when the mode of the contour is a fourth mode, the first coordinates of the contour may be determined by using eight samples at locations obtained by moving eight samples adjacent to the right side in the current block to above by 1, and the second coordinates of the contour may be determined by using eight samples adjacent to a bottom side in the current block. A lower right sample of the current block is an overlapping sample and may be used to determine the first coordinates and also the second coordinates.

Also, when the mode of the contour is a sixth mode, the first coordinates of the contour may be determined by using eight samples adjacent to the bottom side in the current block and the second coordinates of the contour may be determined by using eight samples at locations obtained by moving eight samples adjacent to the outside of the left side in the current block to above by 1.

By determining the coordinates of the contour according to an embodiment by using samples at shifted locations, the coordinates of the contour in more various combinations may be determined because two sides indicating a direction of the contour do not have overlapping coordinates.

Figure 15:
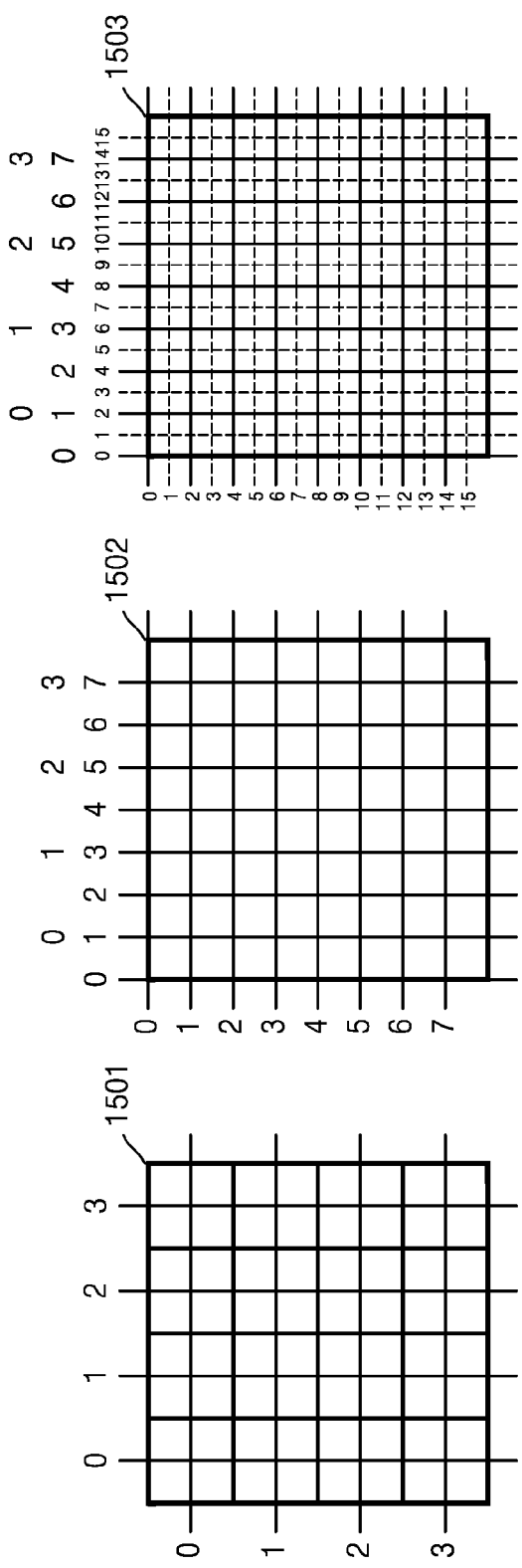
FIGS. 15 through 16B illustrate a method of determining coordinates of a contour according to precision of a sample, according to various embodiments.
Figure 16A:
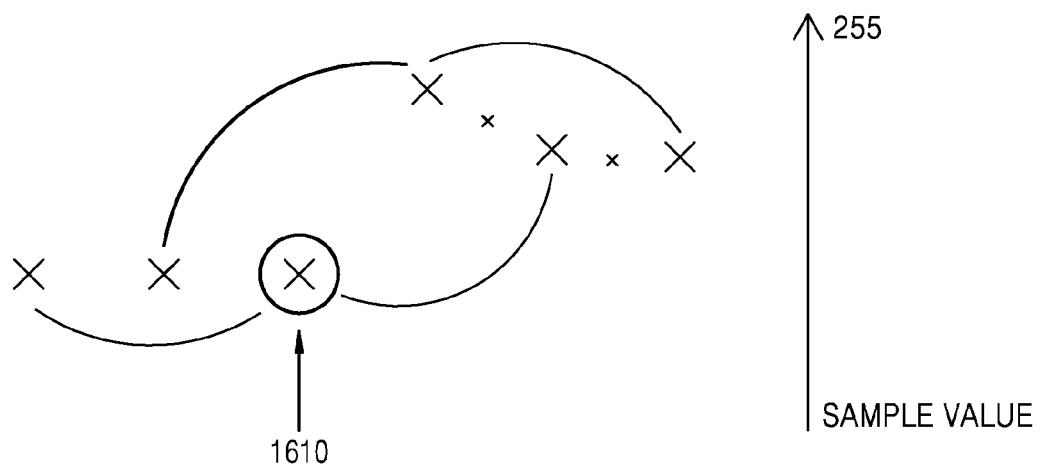
Figure 16B:
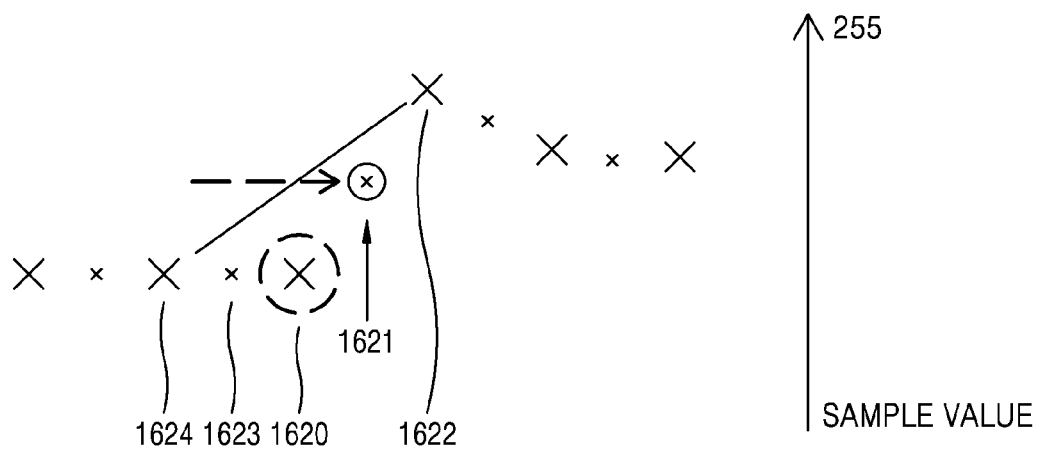

FIGS. 15 through 16B illustrate a method of determining coordinates of a contour according to precision of a sample, according to various embodiments.

The coordinates of the contour according to various embodiments may be determined according to prediction of a sample according to various embodiments.

For example, the coordinates of the contour according to various embodiments may be indicated by using integer pixel prediction, half (½) pixel prediction, or quarter (¼) pixel prediction. Referring to FIG. 15, a block 1501 indicated in integer pixel prediction, a block 1502 indicated in half pixel prediction, and a block 1503 indicated in a quarter pixel prediction may be blocks having a 4×4 size.

Referring to the block 1501, when the integer pixel precision is used, a center point of an upper left sample of the block 1501 may be used as an origin point (0, 0) to express a location of an integer sample. An x-coordinate and y-coordinate of the location of the integer sample of the block 1501 may each be determined to be a number from 0 to 3. Here, the coordinates of the contour according to an embodiment may be determined to be the location of the integer sample in the block 1501 or to be a location of a virtual integer sample outside the block 1501.

Also, when the integer pixel precision is used, an upper left corner of the block 1501 may be used as an origin point (0, 0) and a side of each sample may be at an integer location to express the location of the integer sample.

Referring to the block 1502 or the block 1503, when the half pixel precision or the quarter pixel precision is used, an upper left corner of the block 1502 or block 1503 may be used as an origin point (0, 0) to express a location of a half sample or quarter sample. An x-coordinate or y-coordinate of the location of the half sample of the block 1502 may each be determined to be a number from 0 to 7, and an x-coordinate or y-coordinate of the location of the quarter sample of the block 1503 may each be determined to be a number from 0 to 15.

Here, the coordinates of the contour according to an embodiment may be determined to be the location of the half sample or quarter sample in the block 1502 or block 1503, or to be a location of a virtual half sample or virtual quarter sample outside the block 1502 or block 1503.

When the precision of the coordinates of the contour is transformed, a coordinate transformation function may be used. For example, when precision is subdivided, for example, from integer pixel precision to half or quarter pixel precision, an injective non-surjective function may be used. Also, when precision is reduced, for example, from half pixel precision to integer pixel prediction or from quarter pixel precision to integer pixel prediction, a surjective non-injective function may be used.

When the integer pixel precision is used, the coordinates of the contour according to an embodiment may be determined by using sample values of integer samples. The coordinates of the contour according to an embodiment may be determined to be a location of an integer sample having the maximum gradient of a sample value with neighboring integer samples. For example, the coordinates of the contour according to an embodiment may be determined to be a location of a sample having the maximum absolute value by applying a 1D sobel operator having a filter value, such as $[-1, 0, 1]$ to integer samples.

For example, referring to FIG. 16A, six integer samples may be arranged in one horizontal line. In FIG. 16a, locations of the integer samples may each be indicated by X, and the height of X may indicate a size of a sample value of each sample. For example, sample values of the samples may each be a number from 0 to 255.

In FIG. 16A, a location of the integer sample having the maximum gradient of a sample value between the integer samples may be a location of an integer sample 1610. In other words, an absolute value of a difference between sample values of a left sample and a right sample of the integer sample 1610 may be the maximum. The coordinates of the contour according to an embodiment may be determined to be the location of the integer sample 1610.

Also, referring to FIG. 16B, the coordinates of the contour according to an embodiment may be determined by using half pixel precision. In FIG. 16B, integer samples may each be indicated by large X and half samples may each be indicated by small X. Heights of samples may indicate sizes of sample values of the samples.

In FIG. 16B, the coordinates of the contour may be determined to be a location of a half sample 1621. In detail, a sample value of a sub-sample, such as a half sample, may be generated via interpolation using sample values of integer samples. For example, a sample value of the half sample 1621 may be obtained by using sample values of a left integer sample 1620 and a right integer sample 1622. The coordinates of the contour according to an embodiment may be determined by using the generated sample value of the half sample and the sample value of the integer sample. For example, the coordinates of the contour may be determined to be a location of the sample 1621 having the maximum absolute value by applying a 1D Sobel operator to samples in half pixel precision.

Also, when samples arranged in one vertical line are used, the coordinates of the contour may be determined by using a sample value of an upper sample and a sample value of a lower sample in half pixel precision.

Also, in order to reduce complexity of operation, the coordinates of the contour may be determined without having to generate all sample values of sub-samples. For example, the integer coordinates 1621 of the contour may be determined based on integer samples, and a sample value of a left half sample 1623 and a sample value of the right half sample 1621 of the integer coordinates 1620 may be generated. The coordinates of the contour according to an embodiment may be determined to be a location of the right half sample 1621 having a sample value close to an average value of a sample value of a left sample 1624 and a sample value of the right sample 1622 of the integer sample 1620, from among the sample value of the left half sample 1623 and the sample value of the right half sample 1621.

Alternatively, when samples arranged in one vertical line are used, integer coordinates are determined based on a sample value of an upper integer sample and a sample value of a lower integer sample of an integer sample, and coordinates of a contour may be determined to be a location of one of an upper half sample and a lower half sample of the determined integer coordinates.

Hereinafter, a method of generating a mask of a current block indicating regions and a boundary of segments forming the current block is described with reference to FIGS. 17 through 20.

Figure 17:
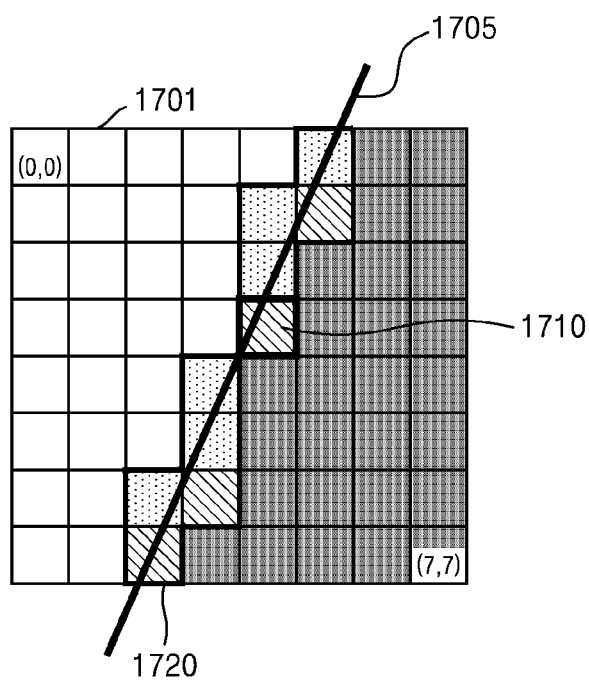
FIG. 17 illustrates an example of a mask indicating segments forming a current block, according to an embodiment.

FIG. 17 illustrates an example of a mask indicating segments forming a current block 1701, according to an embodiment.

FIG. 17 shows a mask with respect to the current block 1701 having a 8×8 size according to an embodiment. The mask with respect to the current block 1701 is data for determining regions of segments split from the current block 1701 and a boundary between the segments, and may include an arrangement of mask values respectively corresponding to samples of the current block 1701.

The current block 1701 according to an embodiment may be split into a plurality of segment regions according to a contour of the current block. Also, a region of the current block 1701 may be divided into the plurality of segment regions and a boundary region 1720 between the segment regions. For example, the boundary region 1720 of the current block according to an embodiment may be a region including samples where the contour of the current block passes, or a region having a predetermined thickness around the contour of the current block.

In detail, referring to FIG. 17, the current block 1701 may be split into two segments along a linear contour 1705. The current block 1701 may be split into a left segment including an origin point (0, 0) and a right segment not including the origin point (0, 0). For example, the origin point (0, 0) may be a location of an upper left sample in the current block 1701.

Mask values with respect to samples included in the left segment region of the current block 1701 according to an embodiment may be all determined to be 0, and mask values corresponding to samples included in the right segment region may be all determined to be 1. Here, since samples in the current block 1701 may be samples in rectangular or square units, a location of a sample of the current block 1701 may be included in the left segment region or the right segment region, and a location of a sample in the boundary region 1720 near the contour 1705 may lie in the left segment region and the right segment region.

Accordingly, mask values with respect to samples included in the boundary region 1720 between the left segment and right segment of the current block 1701 according to an embodiment may be determined to be 0 or 1 according to a method described below with reference to FIG. 18.

The samples included in the boundary region 1720 according to an embodiment are samples where the contour 1705 of the current block 1701 passes, and in FIG. 17, ten samples may be included in the boundary region 1720. For example, the contour 1705 of the current block 1701 may pass a sample 1710 located at (3, 5), and a sample 1701 including some of the contour 1705 may be included in the boundary region 1720.

Also, the mask values with respect to the samples included in the left segment region of the current block 1701 according to an embodiment may all be determined to be 0, and the mask values corresponding to the samples included in the right segment region may all be determined to be 255 (or 256). The mask values corresponding to the samples included in the boundary region 1720 between the left segment and the right segment of the current block 1701 according to an embodiment may be determined to be a value from 0 to 255 (or 256) according to a method described with reference to FIG. 18.

The mask values of the samples in the left segment region and right segment region are not limited to above examples, and may have different values according to a bit depth of the mask values.

The mask of the current block 1701 including the mask values may be generated by determining each of the mask values of all samples included in the current block 1701 according to an embodiment.

The mask of the current block 1701 according to an embodiment may be generated with respect to each of a luma block of the current block 1701 and a chroma block of the current block 1701. Alternatively, the mask with respect to the chroma block may be generated based on the mask with respect to the luma block of the current block 1701. For example, the mask with respect to the chroma block may be generated by applying decimation considering phase shift or down-sampling the mask with respect to the luma block of the current block 1710. When decimation is applied, at least one of a 3-tap Gaussian filter in a horizontal direction and a 3-tap Gaussian filter in a vertical direction may be used.

Alternatively, the mask with respect to the chroma block may be generated based on information about a contour of the luma block of the current block 1701. In other words, coordinates of the contour of the luma block of the current block 1701 may be transformed to obtain coordinates of a contour of the chroma block, and the mask with respect to the chroma block may be generated by using the obtained coordinates of the contour with respect to the chroma block.

Alternatively, the mask with respect to the chroma block of the current block 1701 may be generated first, and then the mask with respect to the luma block may be derived by using the mask with respect to the chroma block.

Figure 18:
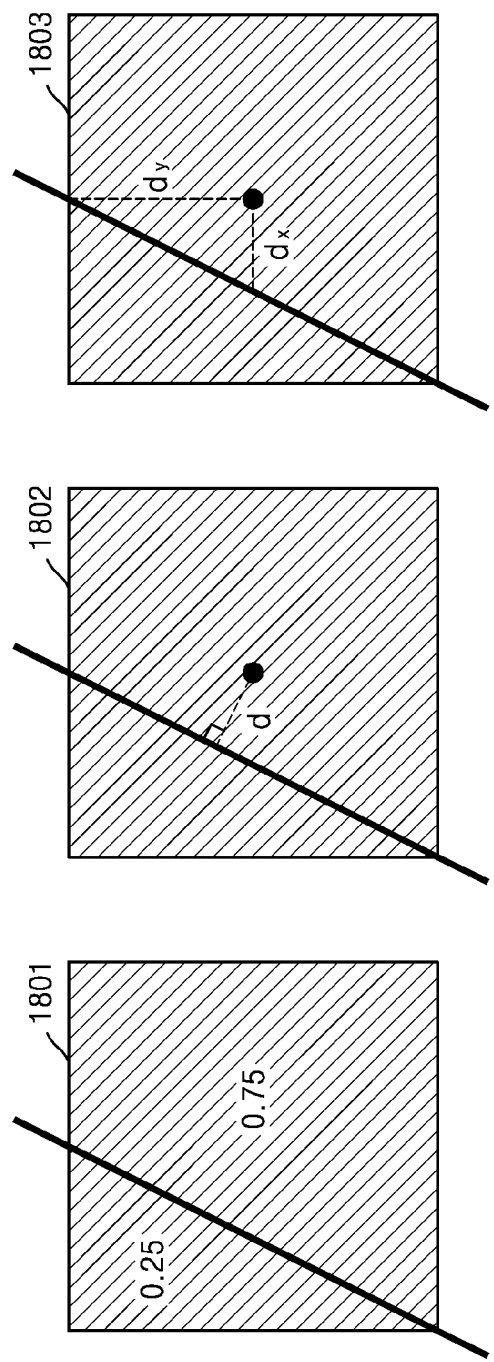
FIG. 18 illustrates examples of various methods of determining a mask value of a sample included in a boundary region of the current block of FIG. 17.

FIG. 18 illustrates examples of various methods of determining a mask value of the sample 1710 included in a boundary region of the current block 1701 of FIG. 17.

Referring to FIG. 18, a sample 1801, a sample 1802, and a sample 1803 which are samples included in the boundary region are shown. The mask value corresponding to the sample 1710 included in the boundary region of the current block 1701 of FIG. 17 may be determined in the same manner as the sample 1801, 1802, or 1803 of FIG. 18.

In detail, referring to the sample 1801, a mask value corresponding to the sample 1801 according to an embodiment may be determined based on areas of two regions in the sample 1801 generated by a contour passing the sample 1801. For example, the two regions in the sample 1801 generated by the contour in FIG. 18 may be a left region (or an upper left region) of the sample 1801 and a right region (or a lower right region) of the sample 1801. The left region of the sample 1801 may be a region including an origin point of the sample 1801, i.e., the upper left corner of the sample 1801.

In FIG. 17, when mask values of samples included in a left segment of the current block 1701 are 0 and mask values of samples included in a right segment are 1, the mask value corresponding to the sample 1801 according to an embodiment may be determined according to sizes of the areas of the two regions in the sample 1801 generated by the contour. The mask value corresponding to the sample 1801 may be determined to be 1, i.e., the same value as the mask value of the right segment of the current block 1701 when a right area (0.75) is larger than a left area (0.25) by comparing the areas of the two regions in the sample 1801.

Also, when the mask values of the samples included in the left segment are 0 and the mask values of the samples included in the right segment are 255 in FIG. 17, the mask value corresponding to the sample 1801 according to an embodiment may be determined in proportion to the sizes of the areas of the two regions in the sample 1810 generated by the contour. For example, the mask value corresponding to the sample 1801 according to an embodiment may be determined to be "((area of left region of 1801*mask value of left segment)+(area of right region of sample 1801*mask value of right segment))/area of sample 1801".

For example, when the area of the left region is 0.25, the area of the right region is 0.75, the mask value of the left segment of the current block 1701 is 0, the mask value of the right segment of the current block 1701 is 255, and the area of the sample 1801 is 1, the mask value corresponding to the sample 1801 may be determined to be 191.25. Alternatively, the mask value corresponding to the sample 1801 may be determined to be 191 by rounding off 191.25. Alternatively, when the mask value of the right segment is 256, the mask value corresponding to the sample 1801 may be determined to be 192.

Here, the mask value of the left segment may be a mask value corresponding to a sample adjacent to a left side of the sample 1801, and the mask value of the right segment may be a mask value corresponding to a sample adjacent to a right side of the sample 1801. Alternatively, the mask value of the left segment may be a mask value corresponding to a sample adjacent to a top side of the sample 1801, and the mask value of the right segment may be a mask value corresponding to a sample adjacent to a bottom side of the sample 1801.

Also, referring to the sample 1802, a mask value corresponding to the sample 1802 according to an embodiment may be determined based on a vertical distance d between the center of the sample 1802 and a contour passing the sample 1802. For example, in FIG. 18, two regions in the sample 1802 generated by the contour may be a left region (or an upper left region) of the sample 1802 and a right region (or a lower right region) of the sample 1802. The left region of the sample 1802 may be a region including an upper left corner of the sample 1802, i.e., an origin point of the sample 1802.

In FIG. 17, when the mask values of the samples included in the left segment are 0 and the mask values of the samples included in the right segment are 255, a mask value corresponding to the sample 1802 according to an embodiment may be determined to be a value between 0 and 255 based on the distance d between the center of the sample 1802 and the contour passing the sample 1801. For example, the mask value corresponding to the sample 1802 according to an embodiment may be determined according to "128−clip3(0, 1, d/threshold)*128" when a region including the center of the sample 1802 is the left region including the origin point of the sample 1802. Also, the mask value corresponding to the sample 1802 according to an embodiment may be determined according to "128+clip3(0, 1, d/threshold)*128" when the region including the center of the sample 1802 is the right region not including the original point of the sample 1802.

Here, threshold is a pre-set threshold value and may adjust a thickness of the boundary region, and a clip3 function may be defined as follows.

$$\text{clip3}(a,b,c) = a(\text{when } c<a), b(\text{when } c>b), \text{ or } c(\text{when } a \le c \le b)$$

In the above equations, a value 128 is an exemplary value, and may vary according to a bit depth of a mask value.

Also, referring to the sample 1803, a mask value corresponding to the sample 1803 according to an embodiment may be determined by using a horizontal distance $d_x$ and a vertical distance $d_y$ from the center of the sample 1803 to a contour passing the sample 1803.

Also, the mask value corresponding to the sample 1710 according to an embodiment may be determined by calculating a cost c with respect to the sample 1710 and comparing the cost with respect to the sample 1710 with 0.

The cost c with respect to the sample 1710 may be a value indicating a distance between the sample 1710 and the contour passing the current block 1701. For example, the cost with respect to the sample 1710 according to an embodiment may be calculated as follows.

$$c = f(x,y,x0,y0,x1,y1) = (y-y0)*(x1-x0)*(y1-y0)$$

Here, (x0, y0) may be first coordinates of the contour 1705 passing the sample 1710, (x1, y1) may be second coordinates of the contour 1705 passing the sample 1710, and, and (x, y) may be coordinates of the current sample 1710.

Figure 19:
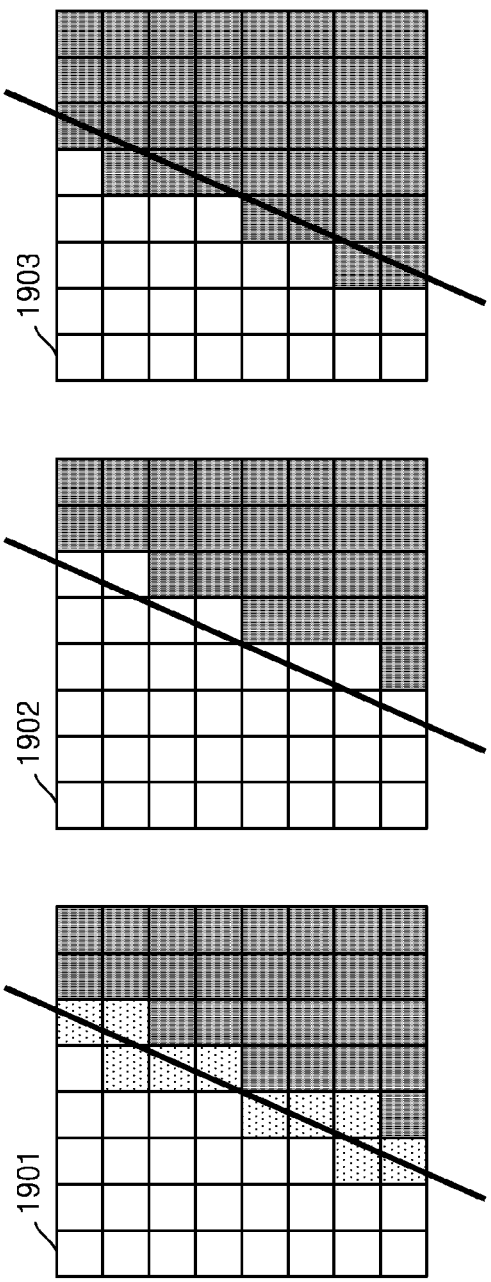
FIGS. 19 and 20 illustrate examples of a method of generating a mask of a current block, according to various embodiments.
Figure 20:
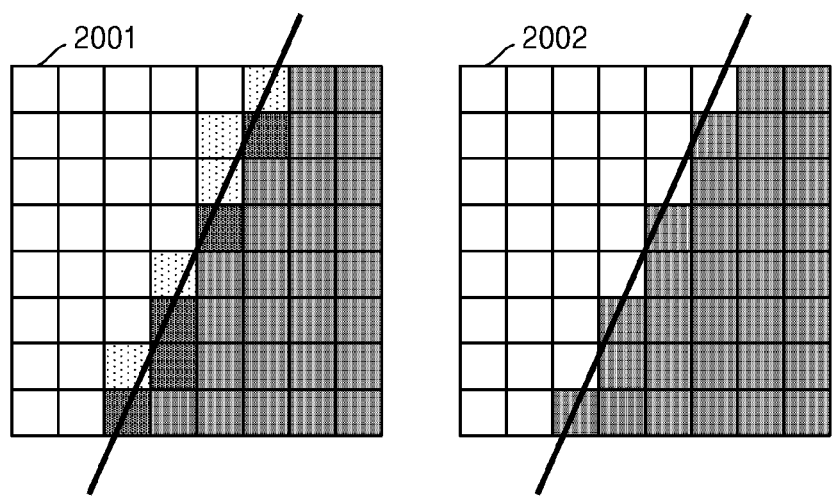

FIGS. 19 and 20 illustrate examples of a method of generating a mask of a current block 1901, according to various embodiments.

Referring to FIG. 19, the current block 1901 split into two segments by using a single linear contour is illustrated. The current block 1901 according to an embodiment may be a block of an 8×8 size, but this is only an example, and may be a block having a size of 64×64, 32×32, or 16×16.

The current block 1901 according to an embodiment may be split into two segments according to a contour for determining at least one segment from the current block 1901. For example, the current block 1901 may be split into a first segment and a second segment by the contour. Here, referring to FIG. 19, the first segment may be a left (or upper left) segment of the current block 1901 and the second segment may be a right (or lower right) segment of the current block 1901.

Referring to the current block 1901, a region where samples completely included in the first segment of the current block 1901 are located may be a first region (white), and a region where samples completely included in the second segment are located may be a second region (shaded). Also, a region where samples of the current block 1901 having a part included in the left segment and the other part included in the right segment are located may be a boundary region (dotted).

According to the method of generating the mask of the current block 1901 according to various embodiments of FIGS. 19 and 20, a mask value corresponding to each of the samples of the current block 1901, which form the mask of the current block 1901, may be determined to be a binary value having a bit depth of 1.

In detail, according to the method of generating the mask of the current block 1901 according to an embodiment, a mask value corresponding to the first region may be determined to be 0 and a mask value corresponding to the second region may be determined to be 1.

Here, referring to a block 1902, a mask value corresponding to the boundary region of the current block 1901 may be determined to be 0 like the mask value corresponding to the first region. Alternatively, referring to a block 1903, the mask value corresponding to the boundary region of the current block 1901 may be determined to be 1 like the mask value corresponding to the second region.

Also, in FIG. 20, according to another embodiment for generating the mask of the current block 1901, mask values corresponding to some of the samples included in the boundary region of the current block 1901 may each be determined to be 0 and mask values corresponding to the remaining samples may each be determined to be 1.

In detail, referring to a block 2001 of FIG. 20, the mask of the current block 1901 may be generated by determining a grayscale value having a bit depth of at least 2 with respect to each sample of the current block 1901, and determining a binary value having a bit depth of 1 with respect to each sample of the current block 1901 based on the determined grayscale value.

The grayscale value corresponding to the sample of the current block 1901 may be determined according to various methods of determining a mask value of a sample included in a boundary region described with reference to FIG. 18.

For example, when a bit depth is 8, a grayscale value corresponding to the sample of the current block 1901 may be a value from 0 to 255.

For example, referring to the block 2001, the mask value corresponding to the first region of the current block 1901 may be determined to be 0 and the mask value corresponding to the second region may be determined to be 255. Also, the mask values corresponding to the samples included in the boundary region of the current block 1901 may each be determined to be a value between 0 to 255 according to various methods described with reference to FIG. 18.

By transforming the grayscale mask values determined to be a value from 0 to 255 as such to binary values, the mask of the current block 1901 according to an embodiment may be generated.

For example, referring to a block 2002, a binary mask value may be generated based on a grayscale mask value with respect to each of the samples determined like the block 2001. When a grayscale mask value corresponding to a first region of the block 2001 is 0, a binary mask value may be determined to be 0. Also, when a grayscale mask value corresponding to a second region of the block 2001 is 255, a binary mask value may be determined to be 1.

Also, when a grayscale mask value corresponding to a sample from among the samples included in the boundary region of the block 2001 is smaller than 128, a binary mask value of the sample may be determined to be 0, and when the grayscale mask value corresponding to the sample is equal to or greater than 128, the binary mask value of the sample may be determined to be 1. Alternatively, when the grayscale mask value corresponding to the sample from among the samples included in the boundary region of the block 2001 is smaller than or equal to 128, the binary mask value of the sample may be determined to be 0, and when the grayscale mask value corresponding to the sample is greater than 128, the binary mask value of the sample may be determined to be 1.

The video decoding apparatus 20 and the video encoding apparatus 10 may more accurately represent the boundary of the current block 1901 by using a grayscale mask value, and reduce complexity and increase efficiency of operations using a mask by transforming and using the grayscale mask value to a binary mask value.

While performing the method of FIGS. 19 and 20 described above, various methods for determining the first region of the current block 1901 may be used.

For example, from among the segments of the current block 1901, the region corresponding to the segment including the upper left sample having the origin point (0, 0) of the current block 1901 may be determined to be the first region, and the region corresponding to the remaining segment may be determined to be the second region.

Also, as another method, costs c with respect to the samples included in the current block 1901 may be calculated as follows such that locations of samples having the calculated costs smaller than 0 are determined to be the first region.

$$c = f(x, y, x0, y0, x1, y1) = (y-y0)*(x1-x0) - (x-x0)*(y1-y0)$$

Here, (x0, y0) may be first coordinates of the contour passing the current block 1901, (x1, y1) may be second coordinates of the contour, and (x, y) may be coordinates of the sample of the current block 1901.

Figure 21:
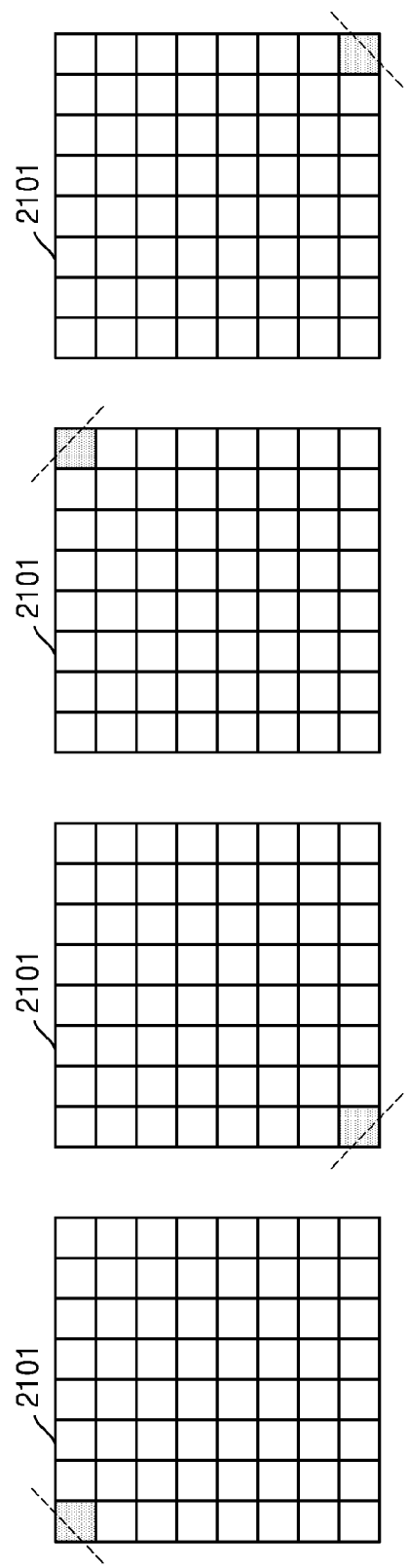
FIG. 21 illustrates an example of a method of generating a mask of a current block, according to an embodiment.

FIG. 21 illustrates an example of a method of generating a mask of a current block 2101, according to an embodiment.

Referring to FIG. 21, the current block 2101 split into at least one segment by using a single linear contour is illustrated. The current block 2101 according to an embodiment may be a block of a 8×8 size, but this is only an example, and may be a block having a size of 64×64, 32×32, or 16×16.

Here, since a contour passing the current block 2101 does not split the current block 2101 into two segments, the current block 2101 may not be divided into a first region, a second region, and a boundary region like in FIG. 17. For example, referring to FIG. 21, when the contour passes only one sample at the corner of the current block 2101, the current block 2101 may be split into one segment, and the current block 2101 may be divided into a boundary region where the contour passes and a segment region that is not the boundary region.

In detail, in FIG. 21, the contour may pass only one of an upper left sample, a lower left sample, an upper right sample, and a lower right sample from among samples in the current block 2101.

In FIG. 21, a mask of the current block 2101 may have a first mask value and a second mask value. For example, a mask value corresponding to the sample included in the boundary region of the current block 2101 may be determined to be the first mask value, and a mask value corresponding to a sample included in a region other than the boundary region of the current block 2101 may be determined to be the second mask value. The first mask value and the second mask value are pre-set values, and may be set differently according to a bit depth of a mask value. For example, the first mask value may be 0 and the second mask value may be 127 (or 128). Alternatively, the first mask value may be 255 (or 256) and the second mask value may be 0.

The first mask value and the second mask value of the current block 2101 according to an embodiment may be set differently according to a location of the boundary region in the current block 2101. For example, when the boundary region of the current block 2101 is located at the upper left in the current block 2101, the first mask value and the second mask value may be respectively determined to be 0 and 127, and when the boundary region of the current block 2101 is located at the upper right in the current block 2101, the first mask value and the second mask value may be respectively determined to be 255 and 127.

Figure 22:
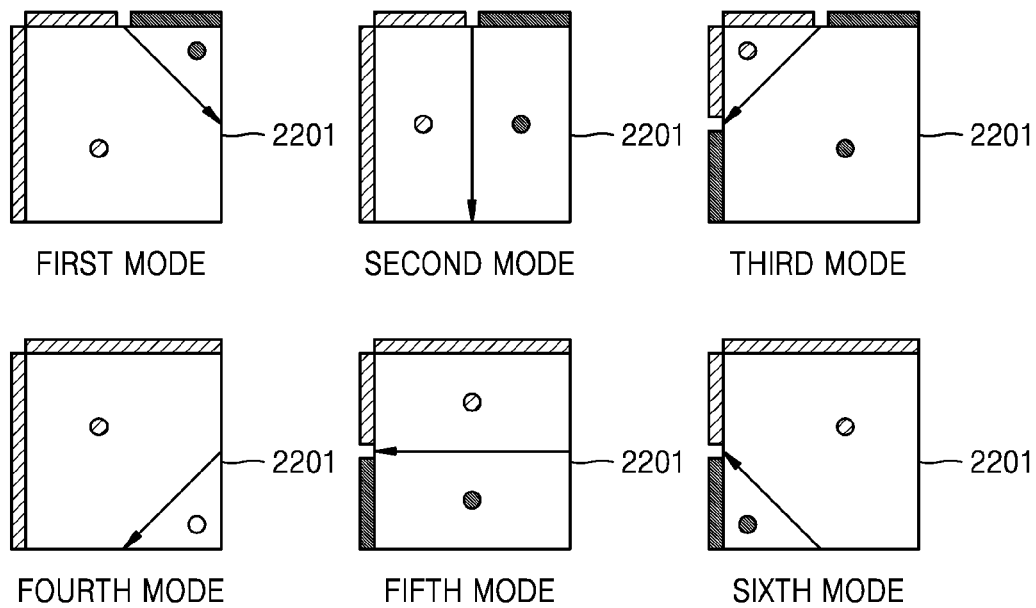
FIG. 22 illustrates a method of performing prediction with respect to a segment of a current block, according to an embodiment.

FIG. 22 illustrates a method of performing prediction with respect to a segment of a current block 2291, according to an embodiment.

At least one segment determined from the current block 2201 may be predicted by using an intra prediction method.

In detail, referring to FIG. 22, the segment of the current block 2201 may be predicted by using an intra DC mode. The intra DC mode may be a method of generating a prediction value of the segment of the current block 2201 by using reference samples neighboring the current block 2201 in a picture included in the current block 2201. For example, a prediction value of the segment of the current block 2201 in the DC mode is a DC value, and may be an average value of the neighboring reference samples being referred to.

Meanwhile, when there is a boundary between segments as a contour is included in the current block 2201, prediction on the segments of the current block 2201 according to an embodiment may be performed in consideration of the boundary between the segments. In detail, a sample value of a segment, i.e., a DC value, may be generated first based on the reference samples neighboring the current block 2201, and the prediction value of the segment may be generated by applying a mask indicating regions of the segments and the boundary of the segments to the generated sample value of the segment. Here, the sample value of the segment may denote a sample value with respect to each of the samples included in the region corresponding to the segment. Also, the prediction value of the segment may denote a prediction value with respect to each of the samples included in the region corresponding to the segment.

FIG. 22 is a diagram for describing a method of generating the sample value of the segment of the current block 2201 by using the reference samples neighboring the current block 2201, according to an embodiment.

The sample value of the segment of the current block 2201 according to an embodiment may be generated based on reference samples adjacent to the outside of the current block 2201. The neighboring samples adjacent to the current block 2201 according to an embodiment may include an upper reference sample adjacent to an upper outside of the current block 2201 and a left reference sample adjacent to a left outside.

Referring to FIG. 22, the current block 2201 may be split into two segments according to a mode of the contour for determining at least one segment from the current block 2201. Here, sample values of samples included in the two segments of the current block 2201 may be generated based on reference samples adjacent to the outside of the corresponding segments from among reference samples of the current block 2201.

In detail, when the mode of the contour is a first mode, the current block 2201 may be split into a left segment and a right segment. A sample value of the left segment of the current block 2201 may be generated based on an upper reference sample and a left reference sample adjacent respectively to the upper outside and the left outside of the left segment. For example, sample values of samples included in the left segment may be determined to be an average value of sample values of the upper reference samples and the left reference samples of the left segment. Here, the upper reference sample adjacent to the left segment may include samples located more to the left than first coordinates of the contour of the current block 2201 from among upper neighboring samples adjacent to the current block 2201. Also, a sample value of the right segment of the current block 2201 may be generated based on an upper reference sample adjacent to the right segment. Here, the upper reference sample adjacent to the right segment may include samples located more to the right than the first coordinates of the contour of the current block 2201 from among the upper neighboring samples adjacent to the current block 2201.

Also, when the mode of the contour is a second mode, the current block 2201 may be split into the left segment and the right segment. The sample value of the left segment of the current block 2201 may be generated based on the upper reference sample and the left reference sample adjacent to the left segment, and the sample value of the right segment of the current block 2201 may be generated based on the upper reference sample adjacent to the right segment. Here, the upper reference sample adjacent to the left segment may include samples located more to the left than the first coordinates of the contour of the current block 2201 from among the upper neighboring samples adjacent to the current block 2201, and the upper reference sample adjacent to the right segment may include samples located more to the right than the first coordinates of the contour of the current block 2201 from among the upper neighboring samples adjacent to the current block 2201.

Also, when the mode of the contour is a third mode, the current block 2201 may be split into the left segment and the right segment. The sample value of the left segment of the current block 2201 may be generated based on the upper reference sample and the left reference sample adjacent to the left segment. Here, the upper reference sample adjacent to the left segment may include samples located more to the left than the first coordinates of the contour of the current block 2201 from among the upper neighboring samples adjacent to the current block 2201, and the left neighboring sample adjacent to the left segment may include samples located more to the top than second coordinates of the contour of the current block 2201 from among the left neighboring samples adjacent to the current block 2201. Also, the sample value of the right segment of the current block 2201 may be generated based on the upper reference sample and the left reference sample adjacent to the left segment. Here, the upper reference sample adjacent to the right segment may include samples located more to the right than the first coordinates of the contour of the current block 2201 from among the upper neighboring samples adjacent to the current block 2201, and the left reference sample adjacent to the right segment may include samples located more to the bottom than the second coordinates of the contour of the current block 2201 from among the left neighboring samples adjacent to the current block 2201.

Also, when the mode of the contour is a fourth mode, the current block 2201 may be split into the left segment and the right segment. The sample value of the left segment of the current block 2201 may be generated based on the upper reference sample and the left reference sample adjacent to the left segment. Here, the sample value of the right segment of the current block 2201 may not be generated by using a neighboring sample of the current block 2201, but may be directly transmitted. For example, when the mode of the contour is the fourth mode, the video decoding apparatus 20 may generate the sample value by receiving information about the sample value of the right segment from the video encoding apparatus 10. Alternatively, the sample value of the right segment of the current block 2201 may be generated by suing neighboring samples not adjacent to the current block 2201. Descriptions thereof will be described with reference to FIG. 23.

Also, when the mode of the contour is a fifth mode, the current block 2201 may be split into an upper segment and a lower segment. A sample value of the upper segment of the current block 2201 may be generated based on the upper reference sample and the left reference sample adjacent to the upper segment. Here, the left reference sample adjacent to the upper segment may include samples located more to the top than the second coordinates of the contour of the current block 2201 from among the left neighboring samples adjacent to the current block 2201. Also, a sample value of the lower segment of the current block 2201 may be generated based on the left reference sample adjacent to the lower segment. Here, the left reference sample adjacent to the lower segment may include samples located more to the bottom than the second coordinates of the contour of the current block 2201 from among the left neighboring samples adjacent to the current block 2201.

Also, when the mode of the contour is a sixth mode, the current block 2201 may be split into the left segment and the right segment. The sample value of the right segment of the current block 2201 may be generated based on the upper reference sample and the left reference sample adjacent to the right segment. Here, the left reference sample adjacent to the right segment may include samples located more to the top than the second coordinates of the contour of the current block 2201 from among the left neighboring samples adjacent to the current block 2201. Also, the sample value of the left segment of the current block 2201 may be generated based on the left reference sample adjacent to the left segment. Here, the left reference sample adjacent to the left segment may include samples located more to the bottom than the second coordinates of the contour of the current block 2201 from among the left neighboring samples adjacent to the current block 2201.

However, sample values of segments may be determined to be a sample value of one of reference samples or an intermediate value of sample values of the reference samples, aside from an average value of the sample values of the reference samples.

A sample value of a segment of the current block 2201 according to an embodiment may be generated with respect to each of a luma component and a chroma component, and a prediction value of the segment may also be generated with respect to a luma component and a chroma component. When the mode of the contour of the current block 2201 is the fourth mode, sample value of a luma component of the right segment of the current block 2201 may be determined by being directly exchanged between the video encoding apparatus 10 and the video decoding apparatus 20, and a sample value of a chroma component may be determined by being derived from the sample value of the luma component.

Meanwhile, when the mode of the contour of the current block 2201 is the fourth mode, the sample value of the right segment of the current block 2201 according to an embodiment may be exchanged between the video encoding apparatus 10 and the video decoding apparatus 20.

However, the video encoding apparatus 10 according to another embodiment may determine and transmit sample values of all segments of a current block for accurate prediction even when neighboring reference samples adjacent to the current block are available, regardless of a mode of a contour.

Also, the video encoding apparatus 10 according to an embodiment may calculate and transmit, to the video decoding apparatus 20, a difference value between an actual sample value of a segment obtained by using samples included in a segment of a current block and a sample value of the segment derived by using neighboring reference samples. The video decoding apparatus 20 may reconstruct a sample value of the segment of the current block based on the difference value received from the video encoding apparatus 10 and a sample value of the segment derived by using the neighboring reference samples of the current block.

When the sample value of the segment of the current block 2201 is generated according to the above methods, a prediction value of the segment of the current block 2201 may be generated by applying a mask including regions and a boundary of the segments to the generated sample value of the segment.

In detail, when the mask of the current block 2201 according to an embodiment is a binary mask, the prediction values of the segments of the current block 2201 may be determined based on the sample values of the segments. For example, when a mask value of a first region where samples included in a first segment are located is 0 and a mask value of a second region where samples included in a second segment are located is 1, a prediction value of the first segment of the current block 2201 may be determined to be a sample value of the first segment, and a prediction value of the second segment of the current block 2201 may be determined to be a sample value of the second segment.

Here, prediction values of samples included in a boundary region of the current block 2201 may be determined according to a mask value of the boundary region. For example, a prediction value of a sample having a mask value of 0 from among the samples included in the boundary region of the current block 2201 may be determined to be the sample value of the first segment having the same mask value, and a prediction value of a sample having a mask value of 1 may be determined to be the sample value of the second segment having the same mask value.

Also, when the mask of the current block 2201 according to an embodiment is a grayscale mask, for example, when a bit depth of a mask value is 8-bit, the prediction values of the segments of the current block 2201 may be calculated as follows based on the sample values of the segments.

$$P=((255-M)*DC0+(M)*DC1+128)>>8$$

Here, P denotes a prediction value of each sample included in the current block 2201, and M denotes a mask value of each sample included in the current block 2201. Also, DC0 may denote a sample value of the first segment of the current block 2201, and DC1 may denote a sample value of the second segment of the current block 2201. In the above equation, 255 and 128 respectively denote a maximum value and an intermediate value according to a bit depth of the mask value of the current block 2201, and may be changed according to the bit depth of the mask value of the current block 2201.

According to the above equation, the prediction value of the first segment of the current block 2201 having the mask value of 0 may be determined to be the sample value of the first segment, and the prediction value of the second segment of the current block 2201 having the mask value of 255 may be determined to be the sample value of the second segment. Here, the prediction values of the samples included in the boundary region of the current block 2201 may be determined by using the mask value of the boundary region, the sample value of the first segment, and the sample value of the second segment.

As described above, according to the method of predicting the current block 2201 in consideration of the segments determined from the current block 2201 according to an embodiment, a boundary of an object included in the current block 2201 may be more accurately represented.

Meanwhile, a prediction block of the current block 2201 may be generated by combining a method of predicting the current block 2201 in consideration of the segments determined according to the contour of the current block 2201 according to an embodiment with intra prediction and inter prediction methods using an existing quadrangular prediction block.

For example, the prediction block of the current block 2201 according to an embodiment may be generated as follows.

$$P(x,y)=(P0(x,y)+P1(x,y)+1)>>1$$

Here, P0(x, y) indicates the prediction block of the current block 2201 according to the method of predicting the current block 2201 in consideration of the segments determined according to the contour of the current block 2201 according to an embodiment. P1(x, y) may indicate the prediction block of the current block 2201 according to the intra prediction or inter prediction method using an existing quadrangular prediction block. P(x, y) may denote a final prediction block of the current block 2201.

For example, P1(x, y) may be a prediction block of the current block 2201 generated by using a planar mode. Alternatively, P1(x, y) may be a prediction block of the current block 2201 generated by using a first mode selected according to a most probable mode (MPM) rule of HEVC.

Also, the final prediction block of the current block 2201 according to an embodiment may be generated as follows by assigning a weight to each prediction block.

$$P(x,y)=(3*P0(x,y)+P1(x,y)+2)>>2$$

By generating the prediction block of the current block 2201 according to a combination of various methods described above, encoding efficiency with respect to representation of a gradient or texture of the sample values in the current block 2201. the various methods of generating the prediction blocks of the current block 2201 described above may be selectively applied to block units.

Figure 23:
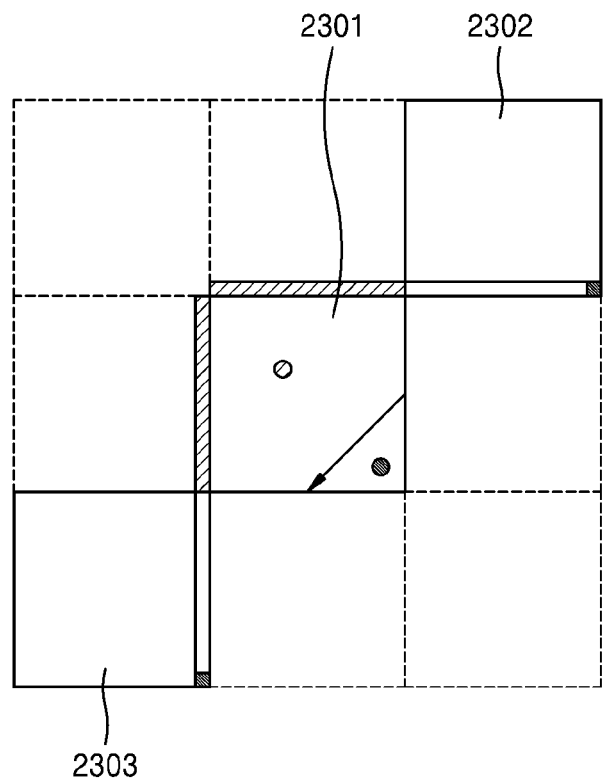
FIG. 23 illustrates a method of performing prediction with respect to a segment of a current block, according to an embodiment.

FIG. 23 illustrates a method of performing prediction with respect to a segment of a current block 2301, according to an embodiment.

Referring to FIG. 23, the current block 2301 whose a mode of a contour according to an embodiment is a fourth mode is illustrated.

When the mode of the contour is the fourth mode, the current block 2301 according to an embodiment may be split into a left (or upper left) segment or a right (or lower right) segment. Here, since the right segment of the current block 2301 is not adjacent to any of an upper reference sample and a left reference sample of the current block 2301, a sample value of the right segment of the current block 2301 is unable to use the upper reference sample and the left reference sample adjacent to the current block 2301.

Meanwhile, referring to FIG. 23, the sample value of the right segment of the current block 2301 may be generated by referring to a neighboring sample of the current block 2301. Here, the neighboring sample of the current block 2301 being referred to may not be a sample adjacent to the current block 2301.

In detail, the sample value of the right segment of the current block 2301 according to an embodiment may be generated by referring to samples at locations obtained by extending an upper sample and a left sample adjacent to the outside of the current block 2301. For example, the reference sample may be a sample at a location obtained by extending the upper sample of the current block 2301 to the right and a sample at a location obtained by extending the left sample of the current block 2301 to the bottom. For example, the reference sample may include a sample located at the right bottom of an upper right block 2302 and a sample located at the right bottom of a lower left block 2302.

For example, the sample value of the right segment of the current block 2301 according to an embodiment may be determined to be an average value of a sample value of the sample located at the right bottom of the upper right block 2302 and a sample value of the sample located at the bottom right of the lower left block 2302.

Also, the sample value of the right segment of the current block 2301 according to another embodiment may not refer to the neighboring reference samples adjacent or not adjacent to the current block 2301, but may be directly exchanged between the video encoding apparatus 10 and the video decoding apparatus 20.

In detail, the video encoding apparatus 10 according to an embodiment may determine the sample value of the right segment by using sample values of samples included in a region corresponding to the right segment of the current block 2301. For example, the sample value of the right segment may be determined to be an average of the sample values of the samples included in the region corresponding to the right segment. The video encoding apparatus 10 according to an embodiment may transmit the determined sample value of the right segment to the video decoding apparatus 20.

Here, the sample value of the right segment according to an embodiment may be transmitted in data of the same bit depth as the samples of the current block 2301. Alternatively, the sample value of the right segment may be transmitted in data of a bit depth smaller than the bit depths of the samples of the current block 2301 via quantization for transmission efficiency.

Figure 24:
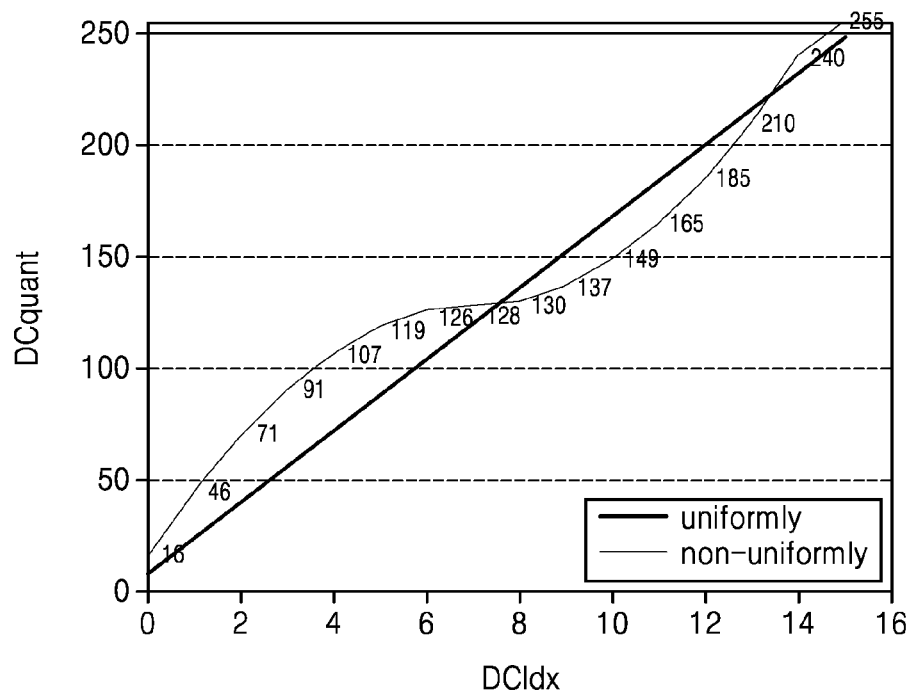
FIG. 24 is a diagram for describing a method of transmitting sample values of segments of a current block, according to various embodiments.

FIG. 24 is a diagram for describing a method of transmitting sample values of segments of the current block 2301, according to various embodiments.

When the sample value of the segment of the current block 2301 according to an embodiment is transmitted between the video encoding apparatus 10 and the video decoding apparatus 20, the sample value of the segment may be quantized and inverse quantized for transmission efficiency.

In detail, when the determined sample value of the segment is a DC value of 8-bit, the video encoding apparatus 10 according to an embodiment may uniformly quantize the determined sample value of the segment to values of 4-bit as follows.

$$DCquant = DCorig >> 4$$

Here, DCquant may denote a quantized sample value and DCorig may denote a sample value before quantization. Alternatively, the video encoding apparatus 10 according to an embodiment may round off the determined sample value of the segment to uniformly quantize the sample value to values of 4-bits as follows.

$$DCquant = (DCorig + 8) >> 4$$

Also, the video decoding apparatus 20 according to an embodiment may inverse quantize the sample value of the segment received from the video encoding apparatus 10 as follows.

$$DC = DCquant >> 4$$

Alternatively, the video decoding apparatus 20 according to an embodiment may inverse quantize the sample value of the segment received from the video encoding apparatus 10 as follows.

$$DC = (DCquant >> 4) + 8$$

Also, the video encoding apparatus 10 and the video decoding apparatus 20 according to another embodiment may each non-uniformly quantize and inverse quantize the sample value of the segment.

In detail, referring to FIG. 24, a quantization coefficient for non-uniform quantization is illustrated when bit depths of the samples of the current block 2301 are 8-bit. Referring to a table of FIG. 24, a number in a graph may be a sample value before quantization, and a y-coordinate may be a quantized sample value. An x-coordinate may be a result value of scaling a quantized sample value.

Here, the sample value of the segment may be more minutely quantized near 128, i.e., an intermediate value, and the quantized sample value may be scaled to data of 4-bit. When such non-uniform quantization is performed, encoding efficiency may be increased since there is high possibility that a sample value may exist near an intermediate value.

In detail, the video encoding apparatus 10 according to an embodiment may non-uniformly quantize the sample value of the segment as follows.

$$DC = 128 + (DCldx < 7 - 1, 1) * (((DCldx - 7) * (DCldx - 7) * 585 + 128) >> 8)$$

Meanwhile, when the mode of the contour of the current block 2301 is the fourth mode, the sample value or prediction value of the right segment of the current block 2301 according to an embodiment may be exchanged between the video encoding apparatus 10 and the video decoding apparatus 20.

However, the video encoding apparatus 10 according to another embodiment may transmit sample values of all segments of a current block for accurate prediction even when neighboring reference samples adjacent to the current block are available, regardless of a mode of a contour.

Figure 25:
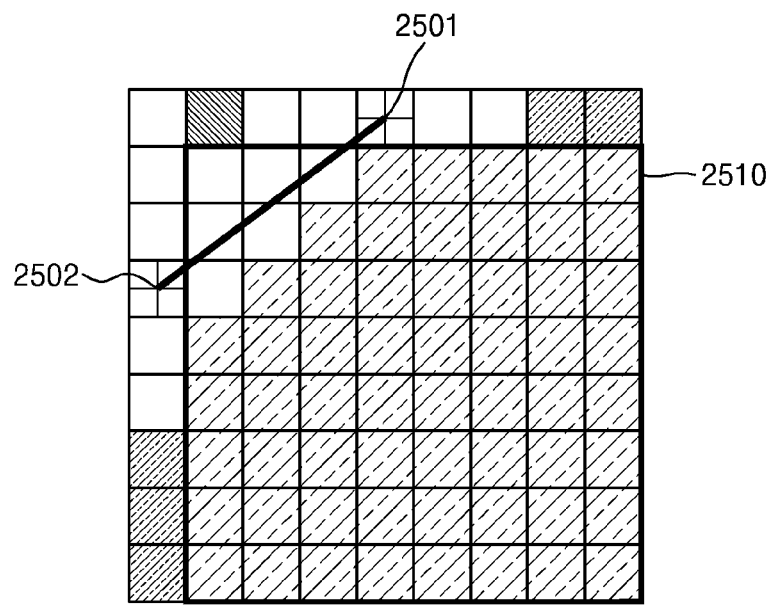
FIGS. 25 and 26 illustrate a method of generating sample values of segments of current blocks by using neighboring samples of the current blocks, according to various embodiments.
Figure 26:
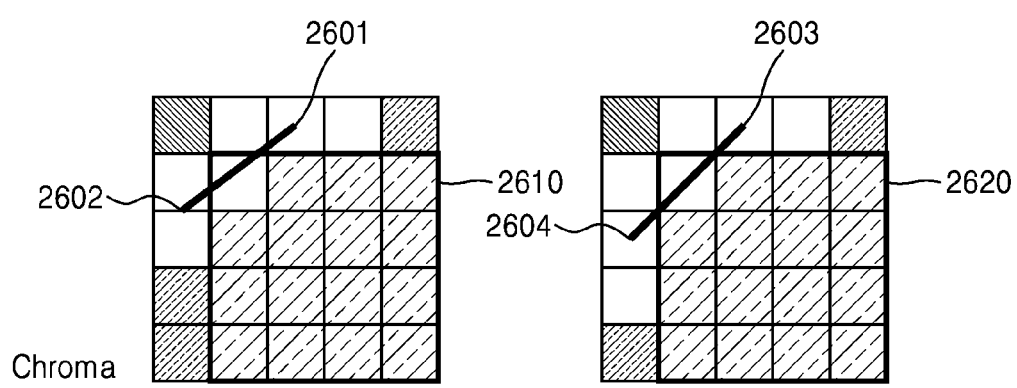

FIGS. 25 and 26 illustrate a method of generating sample values of segments of current blocks 2510, 2610, and 2620 by using neighboring samples of the current blocks, according to various embodiments.

Referring to FIG. 25, the current block 2510 having a 8×8 size and neighboring samples adjacent to the current block 2510 are illustrated. The neighboring samples of the current block 2510 according to an embodiment may include an upper neighboring sample, a left neighboring sample, and an upper left neighboring sample of the current block 2510. Here, the samples shown in FIG. 25 may be samples of a luma component.

A sample value of the current block 2510 according to an embodiment may be generated by referring to some of the neighboring samples. For example, neighboring samples whose distance from a contour is equal to or greater than a predetermined distance from among the neighboring samples of the current block 2510 may be determined as reference samples.

In detail, referring to FIG. 25, the reference sample of the current block 2510 may be determined by using first coordinates 2501 and second coordinates 2502 of a contour of the current block 2510. For example, the first coordinates 2501 and the second coordinates 2502 of the contour of the current block 2510 may be determined to be locations of samples adjacent to the current block according to the method described with reference to FIGS. 11 through 14.

The reference sample of the current block 2510 according to an embodiment may be determined to be a neighboring sample whose distance from the first coordinates 2501 and the second coordinates 2502 of the contour is equal to or greater than the predetermined distance from among the neighboring samples of the current block 2510. For example, a mode of the contour of the current block 2510 may be a third mode, and thus the current block 2510 may be split into a first segment at the upper left of the current block 2510 and a second segment at the lower right of the current block 2510.

A sample value of the first segment of the current block 2510 according to an embodiment may be determined by using a reference sample spaced apart from the first coordinates 2501 of the contour of the current block 2510 to the left by at least the predetermined distance from among upper neighboring samples adjacent to the first segment, and a reference sample spaced apart from the second coordinates 2502 of the contour of the current block 2510 upward by at least the predetermined distance from among left neighboring samples adjacent to the first segment.

Also, a sample value of the second segment of the current block 2510 according to an embodiment may be determined by using a reference sample spaced apart from the first coordinates 2501 of the contour of the current block 2510 to the right by at least the predetermined distance from among upper neighboring samples adjacent to the second segment, and a reference sample spaced apart from the second coordinates 2502 of the contour of the current block 2510 to the bottom by at least the predetermined distance from among left neighboring samples adjacent to the second segment.

Here, the predetermined distance is a distance pre-set in consideration of a size of the current block 2510, efficiency of operations, and quality of an image, and may be, for example, 2 pixels in FIG. 25.

Referring to FIG. 26, the current blocks 2610 and 2620 having a 4×4 size, and neighboring samples adjacent to the current blocks 2610 and 2620 are illustrated. The neighboring samples of the current blocks 2610 and 2620 according to various embodiments may include upper neighboring samples, left neighboring samples, and upper left neighboring samples of the current blocks 2610 and 2620. Here, the samples shown in FIG. 26 may be samples of chroma components.

A sample value of the current block 2610 according to an embodiment may be generated by using some of the neighboring samples. For example, neighboring samples spaced apart from a contour by at least a predetermined distance from among the neighboring samples of the current block 2610 may be determined as reference samples.

In detail, referring to FIG. 26, the reference sample of the current block 2610 may be determined by using first coordinates 2601 and second coordinates 2602 of a contour of the current block 2610. Here, the current block 2610 of a chroma component according to an embodiment may be a block of half pixel prediction. For example, in FIG. 26, the first coordinates 2601 of the contour of the current block 2610 may be determined to be an upper integer sample location of the current block 2610 and the second coordinates 2602 may be determined to be a left half sample location of the current block 2610.

The reference sample of the current block 2610 according to an embodiment may be determined to be a neighboring sample spaced apart from the first and second coordinates 2601 and 2602 of the contour by at least a predetermined distance from among the neighboring samples of the current block 2610. For example, a mode of the contour of the current block 2610 may be a third mode, and thus the current block 2610 may be split into a first segment at the upper left of the current block 2610 and a second segment at the lower right of the current block 2610.

A sample value of the first segment of the current block 2610 according to an embodiment may be determined by using a reference sample spaced apart from the first coordinates 2601 of the contour of the current block 2610 to the left by at least the predetermined distance from among upper neighboring samples adjacent to the first segment, and a reference sample spaced apart from the second coordinates 2602 of the contour of the current block 2610 to the top by at least the predetermined distance from among left neighboring samples adjacent to the first segment.

Also, a sample value of the second segment of the current block 2610 according to an embodiment may be determined by using a reference sample spaced apart from the first coordinates 2601 of the contour of the current block 2610 to the right by at least the predetermined distance from among upper neighboring samples adjacent to the second segment, and a reference sample spaced apart from the second coordinates 2602 of the contour of the current block 2610 to the bottom by at least the predetermined distance from among left neighboring samples adjacent to the second segment.

Here, the predetermined distance is a distance pre-set in consideration of a size of a block, efficiency of operations, and quality of an image, and may be, for example, 1 pixel in FIG. 26, which is half of the current block 2510 of FIG. 25 that is a luma block.

Alternatively, a reference sample of the current block 2620 of a chroma component according to another embodiment may be determined based on first coordinates 2603 and second coordinates 2604 of integer pixel units. The first and second coordinates 2603 and 2604 of the contour of the current block 2620 of the chroma component according to an embodiment may be determined to be locations of neighboring samples in integer units of the current block 2620, and the reference sample of the current block 2620 may be determined to be a neighboring sample spaced apart from the determined first and second coordinates 2603 and 2605 by at least a predetermined distance.

Figure 27:
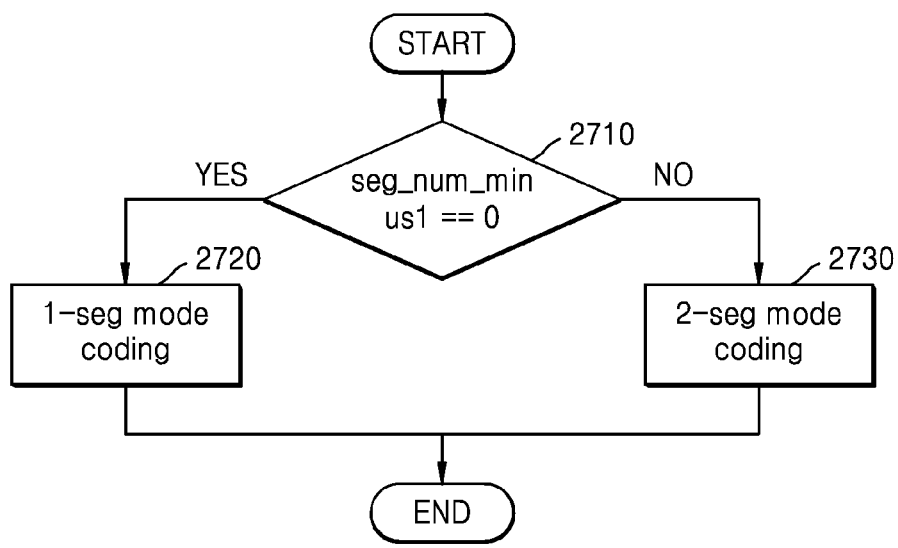
FIG. 27 is a flowchart of a prediction method of a current block according to the number of segments obtained by splitting the current block, according to an embodiment.

FIG. 27 is a flowchart of a prediction method of a current block according to the number of segments obtained by splitting the current block, by the video decoding apparatus 20 according to an embodiment.

The current block according to an embodiment may be predicted by using different prediction methods according to the number of segments split from the current block.

In detail, in operation 2710, the number of segments split from the current block according to an embodiment may be determined. For example, the number of segments split from the current block may be determined based on information (seg_num_minus1) about the number of segments.

In operation 2720, when the number of segments split from the current block is 1, the current block may not include a boundary of an object in the current block. At this time, the current block may be determined to be one segment.

Also, a prediction mode may be determined with respect to the one segment determined from the current block. For example, the prediction mode with respect to the one segment determined from the current block may be a DC mode, a planar mode, a vertical mode, a horizontal mode, or a combination thereof, in which a prediction value of the current block is generated by using neighboring samples of the current block.

In operation 2730, when the number of segments split from the current block is two, the current block is split into two segments based on a contour according to a boundary of an object, and prediction may be performed on each segment.

Also, operation 2730 may be performed not only when the number of segments is two, but also three or more.

Figure 28:
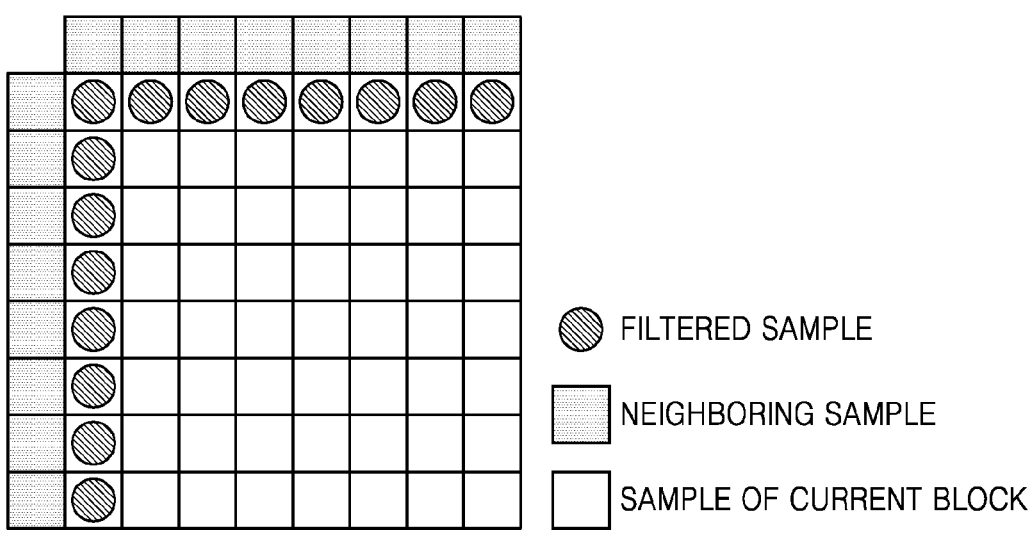
FIG. 28 is a diagram for describing encoding and decoding processes of residual data of a current block according to a transformation unit of the current block, according to an embodiment.

FIG. 28 is a diagram for describing encoding and decoding processes of residual data of a current block according to a transformation unit of the current block, according to an embodiment.

The current block according to an embodiment may be split into transformation units that are data units being the basis of transformation of frequency. Here, the transformation unit may be distinguished into a transformation unit including a contour of the current block and a transformation unit not including the contour of the current block.

In detail, when the transformation does not include the contour of the current block, residual data according to a difference between an original block and a prediction block generated with respect to the current block is generated, and transformation, quantization, and entropy decoding are performed to process the residual data. Alternatively, residual data according to a difference between the original block and a prediction block with respect to the transformation unit may be generated and processed by performing prediction on the transformation unit of the current block.

Also, when the transformation unit includes the contour of the current block, residual data according to a difference between an original block and a prediction block generated with respect to the current block may be generated. Alternatively, a prediction block may be generated and used in consideration of a region of each segment of the current block, in the transformation unit of the current block. For example, when the prediction block is generated, a generated mask of the current block may be used, or a mask with respect to the transformation unit may be newly generated and used.

Also, filtering for reducing an error of a boundary between the transformation units may be performed with respect to the transformation unit of the current block according to an embodiment. For example, referring to FIG. 28, a transformation unit having a 8×8 size is illustrated.

Samples located at an edge of a transformation unit according to an embodiment may be filtered based on adjacent neighboring samples. For example, the adjacent neighboring samples are available samples and may include an upper sample and a left sample of the transformation unit, and samples located at an edge of a transformation unit adjacent to the available neighboring samples may be filtered.

In detail, a sample of a transformation unit to be filtered may be filtered as follows.

$$C=(A+B+1)>>1$$

Here, C may denote a filtered sample value of a sample of a transformation unit, B may denote a sample value of a sample of a transformation unit before being filtered, and A may denote a sample value of a neighboring sample used to filter a sample of a transformation unit.

Also, when a sample of the transformation unit to be filtered is adjacent to both the upper sample and the left sample (for example, an upper left sample in the transformation unit), the sample of the transformation unit to be filtered may be filtered by using both a sample value A0 of the upper sample and a sample value A1 of the left sample as follows.

$$C=(A0+A+2*B+2)>>2$$

Also, the sample of the transformation unit to be filtered may be filtered by assigning different weights to sample values as follows.

$$C=(A+3*B+2)>>2$$

$$C=(A0+A1+6*B+4)>>3$$

The filtering with respect to the transformation unit according to an embodiment may be applied to each of the transformation block of a luma component and the transformation block of a chroma component, or may be applied only to the luma component to reduce complexity of operations.

Figure 29:
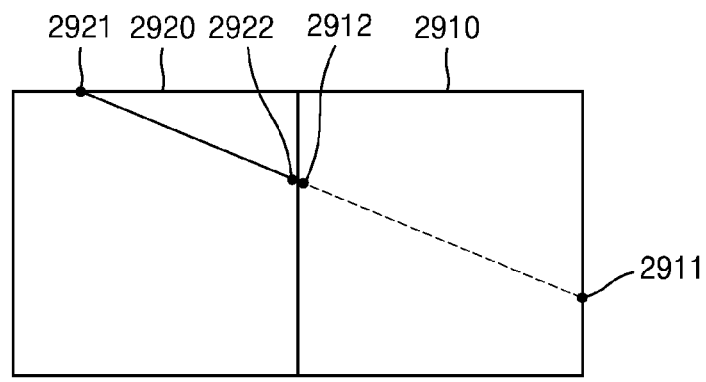
Figure 30:
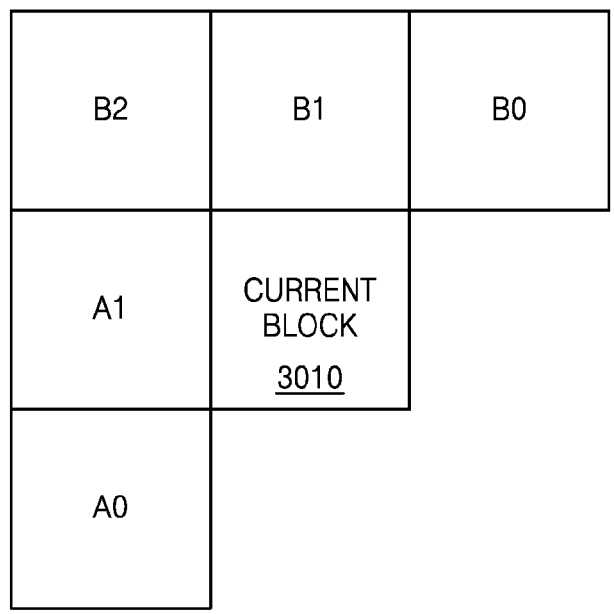

FIGS. 29 through 31 illustrate a method of obtaining a contour of a current block from a neighboring block of the current block, according to various embodiments.

FIG. 29 illustrates a method of obtaining a contour of a current block 2910 according to an embodiment from a neighboring block 2920 of the current block 2910. For example, the neighboring block 2920 of the current block 2910 according to an embodiment may be a block adjacent to the left side of the current block 2910.

In detail, when reconstruction of the neighboring block 2920 of the current block 2910 is completed during a video decoding process, information about split of a block of the current block 2910 may be obtained by using information about split of a block of the neighboring block 2920. For example, the information about split of a block of the neighboring block 2920 may be information about coordinates of a contour.

For example, mode information and the coordinates of a contour of the current block 2910 may be determined by using coordinate information of a contour of the neighboring block 2920 of the current block.

Referring to FIG. 29, the contour of the neighboring block 2920 is a single linear contour passing first coordinates 2921 and second coordinates 2922, and a mode of the contour may be a first mode. Since the contour of the neighboring block 2920 follows a boundary of an object in a picture, the contour of the neighboring block 2920 is highly likely to be connected to the contour of the current block 2910, and thus it is highly likely that the contour of the current bloc 2910 may be on the extending line of the contour of the neighboring block 2920. Accordingly, the contour of the current block 2910 may be derived by extending the contour of the neighboring block 2920 according to an embodiment towards the current block 2910.

For example, the contour of the neighboring block 2920 may extend towards the current block 2910 based on the first and second coordinates 2921 and 2922 of the contour of the neighboring block 2920. Also, the contour of the neighboring block 2920 may extend in a direction of the current block 2910 based on a gradient of the contour of the neighboring block 2920.

Referring to FIG. 29, the contour of the current block 2910 obtained by extending the contour of the neighboring block 2920 may be determined to be a linear contour passing first coordinates 2911 and second coordinates 2912 and in a fifth mode.

In detail, a method of determining the contour of the current block 2910 by using the neighboring block 2920 according to an embodiment may be performed according to following processes.

First, the information about the contour of the neighboring block 2920 of the current block 2910 may be determined whether it is usable. For example, when the neighboring block 2920 is decoded before the current block 2910 and the contour exist in the neighboring block 2920, it may be determined that the information about the contour of the neighboring block 2920 is usable. Here, the information about the contour may include mode information and coordinate information of the contour, and whether the contour exists in the neighboring block 2920 may be determined based on information about the number of segments of the neighboring block 2920.

When it is determined that the information about the contour of the neighboring block 2920 is usable, it may be determined whether the contour of the neighboring block 2920 extending in the direction of the current block 2910 passes the current block 2910.

When the extended contour of the neighboring block 2920 passes the current block 2910, a mode and coordinates of the contour of the current block 2910 may be determined based on the extended contour of the neighboring block 2920. For example, a location of a sample where the extended contour of the neighboring block 2920 passes from among samples located at an edge of the current block 2910 may be the coordinates of the contour of the current block 2910, and the mode of the contour of the current block 2910 may be determined according to the coordinates of the contour of the current block 2910.

Here, when sample prediction regarding the information about the contour of the neighboring block 2920 is different from sample precision of the current block 2910, the information about the contour of the current block 2910 derived from the neighboring block 2920 may be transformed by a difference of the sample precision, and the transformed information of the contour according to sample precision may be used. For example, information about the contour of the current block 2910 of quarter pixel precision derived by using information about the contour of the neighboring block 2920 of quarter pixel precision may be transformed to information of integer pixel precision.

Also, referring to FIG. 30, information about a contour of a current block 3010 may be obtained by using, in addition to a left block A1 of the current block 3010, other neighboring blocks. For example, the left block A1, a lower left block A0, an upper block B1, an upper right block B0, and an upper left block B2 of the current block 3010 may be used, and in addition, a block decoded before the current block 3010 from among blocks located near the current block 3010 may be used.

Also, when one of a plurality of neighboring blocks is used, a list of candidates of the neighboring blocks may be generated. For example, the candidate list of neighboring blocks may include, in the stated order, the left block A1, the upper block B1, the upper right block B0, the lower left block A0, and the upper left block B2. Also, the candidate list of the neighboring blocks may include, in the stated order, the left block A1, the upper block B1, the upper left block B2, the upper right block B0, and the lower left block A0, but is not limited thereto, and the candidate list of neighboring blocks including the neighboring blocks in various orders may be generated identically by the video encoding apparatus 10 and the video decoding apparatus 20.

Here, when contours of the current block 3010 derived with respect to the plurality of neighboring blocks are the same, the candidate list of neighboring blocks may be generated such that only one of the plurality of neighboring blocks is included as a candidate. For example, a pruning process of excluding candidates deriving the same contour of the current block 3010 is performed such that only one of the plurality of neighboring blocks is included as a candidate.

Also, index information indicating one candidate in the candidate list of neighboring blocks may be exchanged between the video encoding apparatus 10 and the video decoding apparatus 20. Alternatively, when the candidate list of neighboring blocks includes only one candidate, index information may not be exchanged.

Also, the contour of the current block 3010 may be derived by using a plurality of candidate blocks from among candidates included in the candidate list of neighboring blocks.

Also, the contour of the current block 3010 may be determined by refining coordinates of the contour of the current block 3010 derived from the neighboring block. For example, the coordinates of the contour of the current block 3010 derived from the neighboring block may move in an x-axis or y-axis according to a predetermined value to be refined. The predetermined value may be +1, −1, +2, −2, or the like.

Also, the coordinates of the contour of the neighboring block may be refined and information about the refined contour of the neighboring block may be included in the candidate list of neighboring blocks used to obtain the contour of the current block 3010.

Also, the information about the contour of the current block 3010 derived from the neighboring block may be used as prediction data. For example, the video decoding apparatus 20 may encode a differential value between information about a contour of the current block 3010 determined by using samples in the current block 3010 and information about a contour of the current block 3010 derived from the neighboring block, and transmit the differential value to the video decoding apparatus 20. The video decoding apparatus 20 may determine the coordinates of the contour of the current block 3010 based on the received differential value and the information about the contour of the current block 3010 derived from the neighboring block of the current block, thereby more accurately decoding the current block 3010.

Also, when the video encoding apparatus 10 and the video decoding apparatus 20 generate the candidate list of neighboring blocks, the candidate list may further include a default block. In detail, when neighboring block candidates included in the candidate list is smaller than a predetermined number, the candidate list may further include a default block. For example, the predetermined number with respect to the candidate list may be five. Referring to FIG. 31, examples of a default block are illustrated. For example, when the number of neighboring block candidates included in the list is smaller than the predetermined number, the default blocks of FIG. 31 may be sequentially included in the candidate list.

Also, when there is no information about a contour of a neighboring block since the neighboring block of the current block 3010 is not encoded according to the contour, information about the contour of the neighboring block may be generated based on a reconstructed neighboring block. Information about the contour of the neighboring block generated based on the reconstructed neighboring block may be stored in a buffer, and used to determine the contour of the current block 3010 during encoding of the current block 3010. At this time, the video decoding apparatus 20 may decode the current block 3010 by using the reconstructed neighboring block in the same manner.

Also, when the current block 3010 encoded based on a contour according to a boundary of an object according to an embodiment is decoded in block units, one mode may be selected from among prediction methods (for example, intra prediction of HEVC) of general block units.

In detail, a prediction mode of the current block 3010 may be determined to be a first mode from an MPM list of the current block 3010. For example, the MPM list of the current block 3010 may include a mode of a left block or upper block adjacent to the current block 3010. Also, the MPM list of the current block 3010 may further include a planar mode, a DC mode, and a vertical mode. Alternatively, the prediction mode of the current block 3010 may be determined to be a DC mode, or the prediction mode of the current block 3010 may be determined to be an angular mode of an angle most similar to a gradient of the contour of the current block 3010.

Also, the information about the contour of the current block 3010 according to an embodiment may be obtained by referring to an edge map including information indicating an edge direction with respect to samples included in the current block. The edge map of the current block 3010 may be generated in picture units or block units, and may be transmitted by being included in a slice header or a header of the current block 3010.

Figure 32:
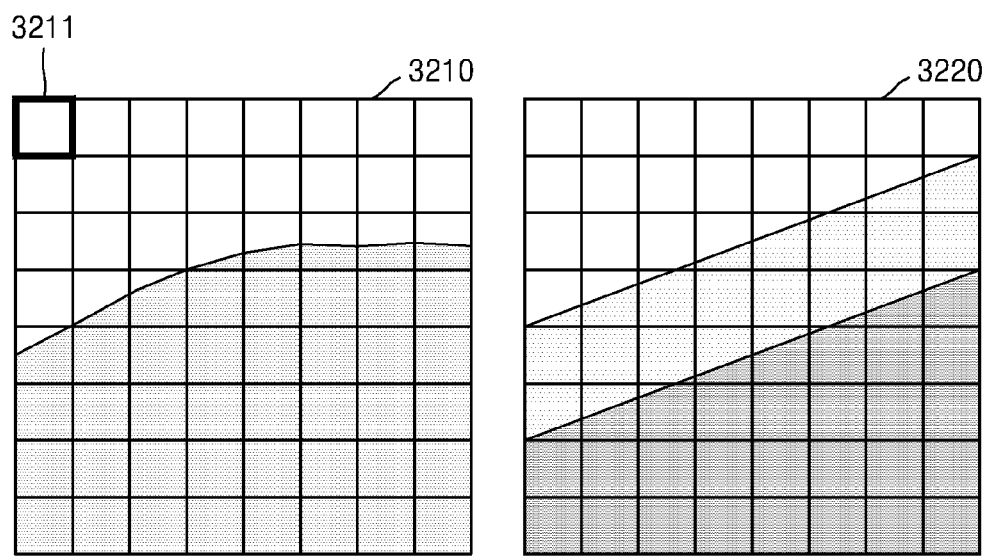
FIGS. 32 and 33 illustrate a method of performing prediction by using sub-blocks of current blocks, according to various embodiments.
Figure 33:
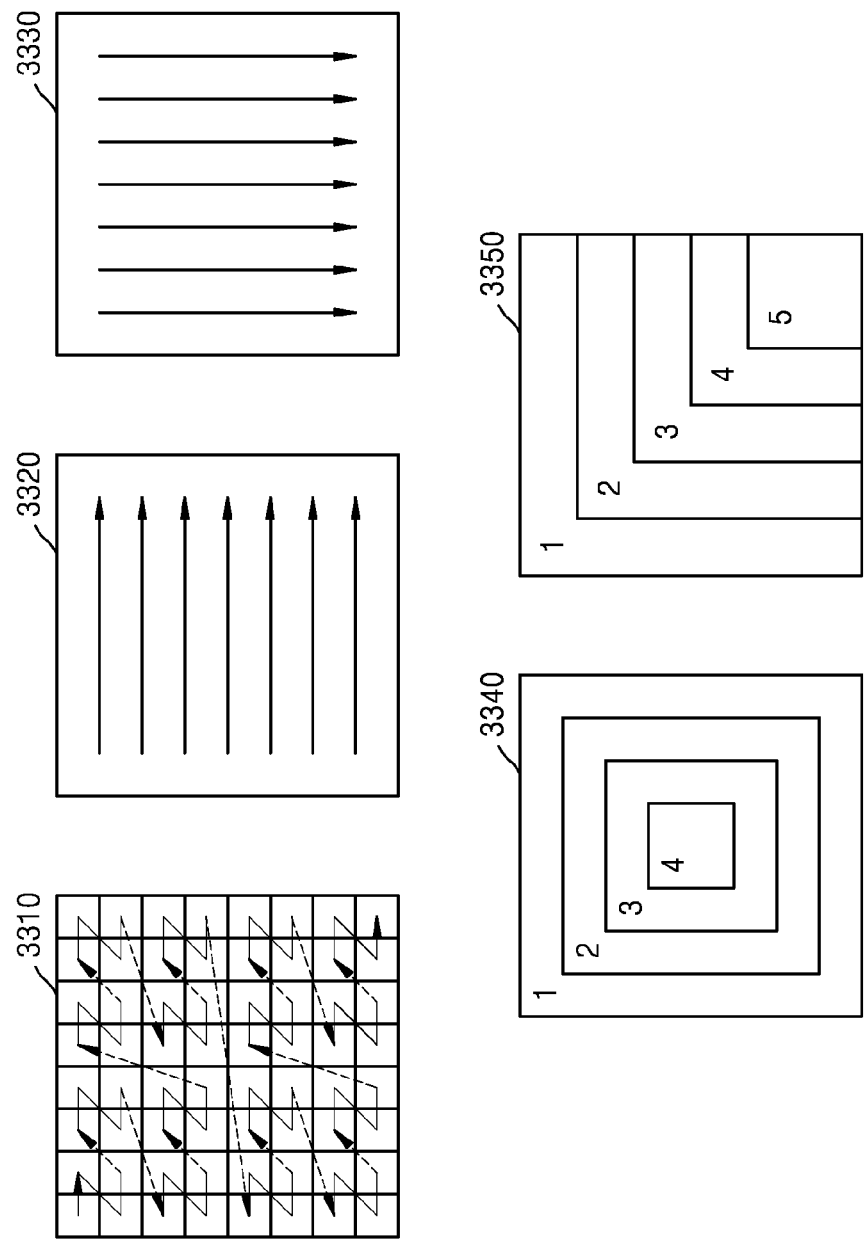

FIGS. 32 and 33 illustrate a method of performing prediction by using sub-blocks of blocks 3210 and 3220, according to various embodiments.

Referring to FIG. 32, the blocks 3210 and 3220 according to an embodiment are illustrated. When the blocks 3210 and 3220 according to an embodiment are split by using a linear contour, the blocks 3210 and 3220 may use a sub-block. For example, the blocks 3210 and 3220 may each be a block of a 64×64 size, and sub-blocks of the blocks 3210 and 3220 may each be a block of 8×8 size.

In detail, referring to the block 3210, since a boundary of an object included in the block 3210 is a curve, when the block 3210 is split based on the linear contour, encoding efficiency may deteriorate. Accordingly, the block 3210 according to an embodiment may be split into a plurality of sub-blocks including a sub-block 3211, and the plurality of sub-blocks may each be split based on the linear contour, and thus encoding efficiency may increase.

The sub-blocks of the block 3210 according to an embodiment may be split into at least one segment based on the linear contour according to the boundary of the object, and prediction may be performed one each segment. Here, a sub-block not including the boundary of the object may be predicted according to a general intra prediction method.

Alternatively, referring to the block 3220, the block 3220 includes boundaries of a plurality of objects. In detail, since the block 3220 includes boundaries of two objects, a method of using two linear contours according to the boundaries of the two objects may be more complicated than a method of using a single linear contour. Accordingly, the block 3220 according to an embodiment may be split into a plurality of sub-blocks, and the plurality of sub-blocks may each be split based on a single linear contour, thereby reducing complexity of operations.

The sub-blocks of the block 3220 according to an embodiment may be split into at least one segment based on a single linear contour according to the boundary of the object, and prediction may be performed with respect to each segment. Here, a sub-block not including a boundary of an object may be predicted according to a general intra prediction method.

Referring to FIG. 33, encoding and decoding orders of sub-blocks included in blocks 3310 through 3350 according to various embodiments are illustrated. For example, when the block 3310 according to various embodiments is split by using sub-blocks, the sub-blocks of the block 3310 may be encoded or decoded in a z-scan order.

Also, when the block 3320 is split into sub-blocks, the sub-blocks of the block 3320 may be sequentially encoded or decoded in a direction from left to right.

Also, when the block 3330 is split into sub-blocks, the sub-blocks of the block 3330 may be sequentially encoded or decoded in a direction from top to right.

Also, when the block 3340 is split into sub-blocks, the block 3340 may be first divided into a plurality of regions, and the sub-blocks of the block 3340 may be encoded or decoded according to priority of the plurality of regions. For example, the block 3340 may be divided into first through fourth regions, and encoding or decoding may be performed sequentially from sub-blocks included in the first region. Also, an encoding or decoding order of sub-blocks may be determined according to a z-scan order between the sub-blocks in the first region of the block 3340.

Also, when the block 3350 is split into sub-blocks, the block 3350 may be first divided into a plurality of regions and the sub-blocks of the block 3350 may be encoded or decoded according to priority of the plurality of regions. For example, the block 3350 may be divided into first through fifth regions, and encoding or decoding may be performed sequentially from sub-blocks included in the first region. Also, an encoding or decoding order of sub-blocks may be determined according to a z-scan order between the sub-blocks in the first region of the block 3340.

Figure 34:
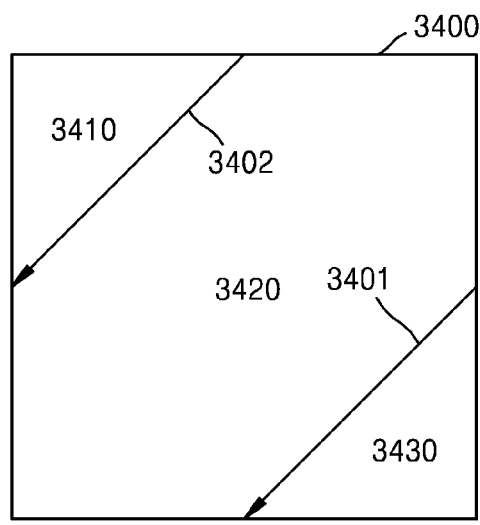
FIG. 34 illustrates a method of determining three segments from a current block, according to an embodiment.

FIG. 34 illustrates a method of determining three segments from a current block 3400, according to an embodiment.

The current block 3400 according to an embodiment may be encoded based on a first contour 3401 of the current block 3400, and encoding information about the current block 3400 may be transmitted to the video decoding apparatus 20. For example, the transmitted encoding information may include information about the first contour 3401 of the current block 3400.

Referring to FIG. 34, a mode of the first contour 3401 of the current block 3400 may be a fourth mode.

Upon receiving the encoding information about the current block 3400 according to an embodiment, the video decoding apparatus 20 may obtain information about the first contour 3401 of the current block 3400 from the received encoding information. When the mode of the first contour 3401 is the fourth mode based on the information about the first contour 3401, the video decoding apparatus 20 may determine a second contour 3402 passing a top side and a left side of the current block 3400. Here, the second contour 3402 of the current block 3400 may be obtained by using an upper neighboring sample and a left neighboring sample adjacent to the current block 3400.

The current block 3400 according to an embodiment may be decoded by being split into three segments by using the first contour 3401 according to the encoding information obtained from a bitstream and the second contour 3401 derived from the neighboring samples of the current block. For example, the current block 3400 may be split into first through third segments 3410 through 3430 according to the first and second contours 3401 and 3402.

Here, a mask of the current block 3400 according to an embodiment may be generated based on the first through third segments 3410 through 3430. For example, a mask value of a region corresponding to the first segment 3410 may be determined to be 0, a mask value of a region corresponding to the second segment 3420 may be determined to be 255 (or 256), and a mask value of a region corresponding to the third segment 3430 may be determined to be 511 (or 512). Also, a mask value of a boundary region between the first and second segments 3410 and 3420 may be determined to be a value from 0 to 255, and a mask value of a boundary region between the second and third segments 3420 and 3430 may be determined to be a value from 256 to 511.

The current block 3400 according to an embodiment uses a second contour additionally derived, and thus an image is more accurately reconstructed.

Figure 35:
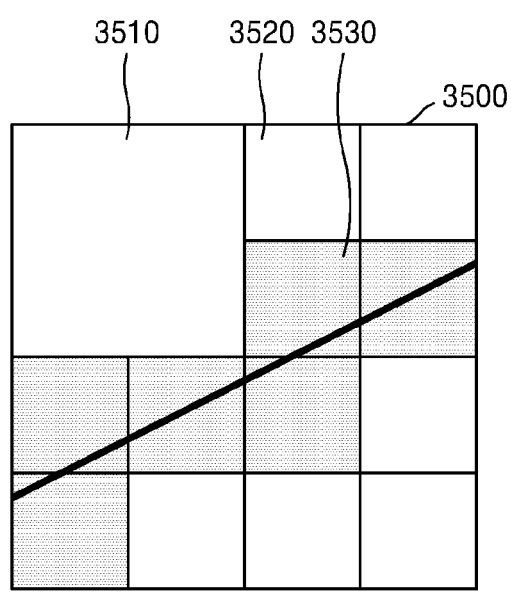
FIG. 35 illustrates a method of determining segments by using a sub-block of a current block based on a contour of the current block, according to an embodiment.

FIG. 35 illustrates a method of determining segments by using a sub-block of a current block 3500 based on a contour of the current block 3500, according to an embodiment.

The current block 3500 according to an embodiment may be split into a plurality of sub-blocks based on a contour corresponding to a boundary of an object included in the current block 3500. Here, the current block 3500 according to an embodiment may determine the contour corresponding to the boundary of the current block 3500, and split into the plurality of sub-blocks by using the determined contour.

For example, the current block 3500 may be split into four first sub-blocks having the same size as a first sub-block 3510. A length and width of the first sub-block 3510 may be halves of a length and width of the current block 3500.

Also, the current block 3500 may be hierarchically continuously split into smaller sub-blocks based on inclusion of the contour of the current block 3500. For example, a first sub-block that includes the contour of the current block 3500 from among the four first sub-blocks may be again split into four second sub-blocks having a length and width that are haves of the length and width of the first sub-block. The first sub-block 3510 that does not include the contour of the current block 3500 from among the four first sub-blocks may be no longer split.

The current block 3500 according to an embodiment may determine a segment by using the first sub-block and the second sub-block. For example, a contour of a second sub-block 3520 based on the contour of the current block 3500 may be determined with respect to the second sub-block 3520 including the contour of the current block 3500 from among the second sub-blocks. Also, the second sub-block 3520 may be split into at least one segment according to the determined contour of the second sub-block 3520. For example, the second sub-block 3520 may be split into two segments according to the linear contour.

With respect to the current block 3500 according to an embodiment, prediction may be performed by using the first and second sub-blocks 3510 and 3520 that do not include the contour of the current block 3500, and the segments split from the second sub-block 3520 including the contour of the current block 3500.

For example, an intra prediction may be performed with respect to the first and second sub-blocks 3510 and 3520 by using an intra mode, such as a DC mode, a planar mode, or an angular mode. Intra prediction using a segment split according to the boundary of the object in the block described with reference to FIGS. 1 through 4 may be performed with respect to the second blocks including the contour of the current block 3500, such as the second block 3520.

Here, a split depth of splitting the current block 3500 may be determined based on encoding efficiency, and the determined split depth may be transmitted from the video encoding apparatus 10 to the video decoding apparatus 20.

Figures 36, 37:
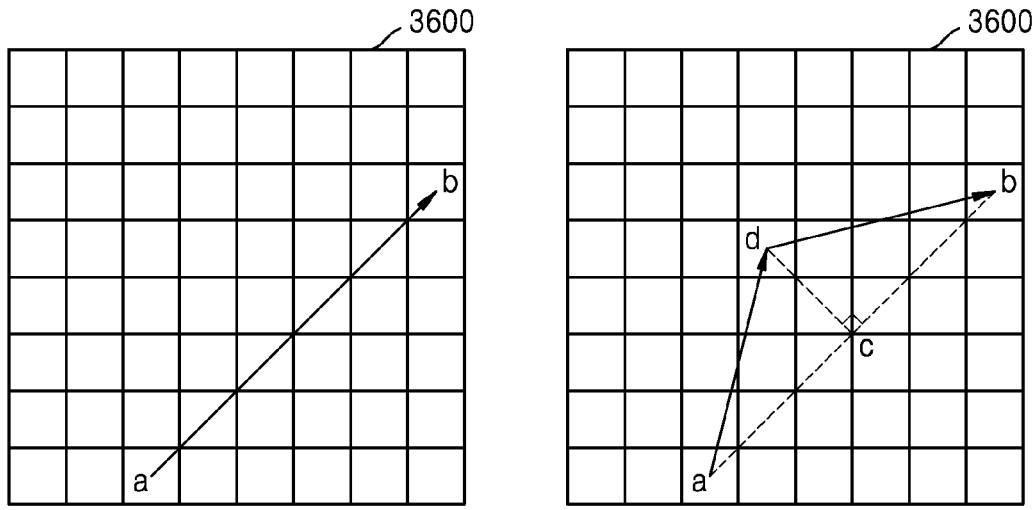
FIG. 36 illustrates a method of determining a contour of a current block, according to an embodiment.
FIG. 37 is an example in which a method of obtaining a prediction value of a current block is shown in a pseudo code, according to an embodiment.

FIG. 36 illustrates a method of determining a contour of a current block 3600, according to an embodiment.

When a boundary of an object included in the current block 3600 according to an embodiment does not correspond to a single straight line, the contour of the current block 3600 may be determined by using a piece-wise linear contour.

In detail, first coordinates a indicating a starting point of the contour corresponding to the boundary of the object in the current block 3600 according to an embodiment, and second coordinates b indicating an ending point of the contour may be determined. Here, the contour of the current block 3600 may not be determined as a single straight line connecting the first coordinates a and the second coordinates b, but may be determined as two straight lines by using third coordinates d.

For example, the third coordinates d may be coordinates moved perpendicularly from the center of a straight line connecting the first coordinates a and the second coordinates b, by a predetermined displacement. Here, information used to determine the contour of the current block 3600 may be the first coordinates a, the second coordinates b, and the predetermined displacement indicating a perpendicular distance from the center of the straight line connecting the first coordinates a and the second coordinates b to the third coordinates d.

The third coordinates of the current block 3600 according to an embodiment may be determined in precision of integer pixel units so as to reduce complexity of operations during encoding and decoding. For example, a method of determining to a location of an integer sample closest to an actual location may be used. Also, the predetermined displacement for indicating the third coordinates d may also be determined in integer units. The predetermined displacement may be indexed from among a plurality of pre-set displacements. In other words, the predetermined displacement may be determined by using index information indicating one of the plurality of pre-set displacements, and the index information may be exchanged between the video encoding apparatus 10 and the video decoding apparatus 20.

FIG. 37 is an example in which a method of obtaining a prediction value of a current block is shown in a pseudo code, according to an embodiment.

The prediction value of the current block according to an embodiment may be generated by first generating a sample value of a segment split from the current block and applying a mask indicating a region of the segment and a boundary to the generated sample value of the segment.

Then, filtering is performed on the prediction value of the current block according to an embodiment to reduce an error generated while performing prediction. In detail, the filtering may be performed with respect to a boundary region where a contour of the current block is located.

For example, referring to the pseudo code of FIG. 37, filtering may be performed with respect to a prediction value of a sample located at a boundary of segments of a current block from among samples of the current block. Here, whether the sample of the current block is located at the boundary of the segments may be determined based on a mask of the current block. In FIG. 37, Mask[x][y] indicates a mask value of sample at a (x, y) location of the current block, P[x][y] indicates a prediction value of the sample at the (x, y) location of the current block, and $P_{fltr}[x][y]$ indicates a filtered prediction value of the sample at the (x, y) location of the current block. W and H respectively indicate a width and a height of the current block.

Whether the sample of the current block according to an embodiment is located at the boundary of the segments may be determined by comparing mask values of the current sample and neighboring samples. For example, when a mask value of a left sample and a mask value of a right sample are different, the current sample of the current block may be determined to be located at the boundary of the segments. When the mask value of the left sample and the mask value of the right sample are the same, the current sample of the current block may be determined to be not located at the boundary of the segments. Alternatively, when a mask value of an upper sample and a mask value of a lower sample are different, the current sample of the current block may be determined to be located at the boundary of the segments. When the mask value of the upper sample and the mask value of the lower sample are the same, the current sample of the current block may be determined to be not located at the boundary of the segments.

However, when the current sample of the current block is located adjacent to the inside of a side of the current block, a sample value of the current sample and a sample value of a neighboring sample may be compared so as to use only samples in the current block.

A sample value of a sample determined to be located at the boundary of the segments from among samples of the current block according to an embodiment may be filtered based on sample values of neighboring samples. For example, when the mask value of the left sample and the mask value of the right sample are different, the sample value of the current sample may be filtered by using an average of the sample value of the current sample, the sample value of the left sample, and the sample value of the right sample. Here, a weight may be applied to each of the used sample values. For example, a 1D Gaussian filter in a horizontal direction having a filter value, such as [1, 2, 1] may be used.

Also, when the mask value of the upper sample and the mask value of the lower sample are different, the sample value of the current sample may be filtered by using an average of the sample value of the current sample, the sample value of the upper sample, and the sample value of the lower sample. For example, a 1D Gaussian filter in a vertical direction having a filter value of [1, 2, 1] may be used.

Filtering in a horizontal direction and filtering in a vertical direction may be both performed regardless of an order with respect to the current block according to an embodiment.

Alternatively, according to another embodiment, only one of the filtering in the horizontal direction and the filtering in the vertical direction may be performed with respect to the current block. For example, one of the filtering in the horizontal direction and the filtering in the vertical direction may be determined based on a gradient of a contour of the current block. When a horizontal (x-axis) gradient of the contour of the current block is greater than a vertical (y-axis) gradient, the filtering in the vertical direction may be performed, and when the horizontal (x-axis) gradient is smaller than the vertical (y-axis) gradient, the filtering in the horizontal direction may be performed.

Alternatively, according to another embodiment, at least one of the filtering in the horizontal direction and the filtering in the vertical direction may be performed according to a mode of the contour of the current block. For example, when the mode of the contour of the current block is a second mode indicating a vertical contour, only the filtering in the horizontal direction may be performed, and when the mode of the contour of the current block is a fifth mode indicating a horizontal contour, only the filtering in the vertical direction may be performed. Also, when the mode of the contour of the current block is any mode excluding the second and fifth modes, both the filtering in the horizontal direction and the filtering in the vertical direction may be performed.

Here, filtering may be performed in different methods with respect to a luma block and a chroma block. For example, filtering according to the mode of the contour of the current block may be performed with respect to a luma component of the current block, and filtering according to a gradient of the contour of the current block may be performed with respect to a chroma component of the current block.

Also, a filtering method may be determined according to a combination thereof, and a 2D filter, a median filter, an average filter, or the like may be used aside from a 1D filter.

Hereinafter, a method of performing prediction with respect to a current block by using a contour of the current block according to various embodiments will be described with reference to FIGS. 38 through 44. Here, FIGS. 38 through 44 illustrate a method of performing prediction on a current block by directly using a contour of the current block without having to generate a mask of the current block.

Figure 38:
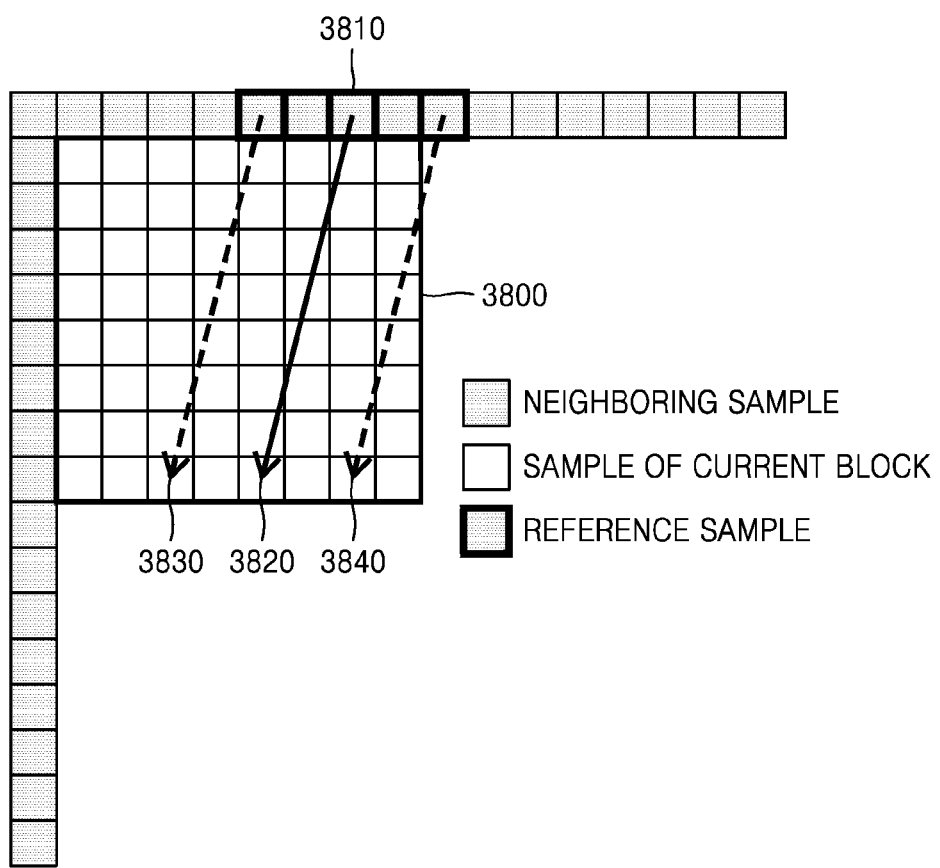
FIG. 38 illustrates a method of performing prediction with respect to a current block, according to an embodiment.

FIG. 38 illustrates a method of performing prediction with respect to a current block 3800, according to an embodiment.

A contour 3920 corresponding to a boundary of an object included in the current block 3800 may be determined with respect to the current block 3800 according to an embodiment. For example, the contour 3820 of the current block 3800 may be specified by information about coordinates of the contour 3820 and mode information of the contour 3820.

The current block 3800 according to an embodiment may be split into at least one segment based on the contour 3820 of the current block 3800, and when the current block 3800 is split into a plurality of segments, a boundary region including a boundary of the segments may be shown along the contour 3820.

Here, whether to perform prediction in a direction of the boundary may be determined with respect to the current block 3800 according to an embodiment. In other words, it may be determined whether to determine prediction values with respect to samples included in the boundary region of the current block 3800 in the direction of the boundary. For example, the video encoding apparatus 10 according to an embodiment may select a prediction method having the optimum RD cost from among a prediction method according to the direction of the boundary and a prediction method using a mask, and the video decoding apparatus 20 according to an embodiment may determine whether to preform prediction on the current block 3800 in the direction of the boundary by receiving information thereof from the video encoding apparatus 10.

When it is determined to perform prediction in the direction of the boundary, prediction may be performed on the boundary region of the current block 3800 according to an embodiment by using a neighboring sample of the current block 3800 in the direction of the boundary.

The boundary region of the current block 3800 according to an embodiment is a predetermined region including the boundary between the segments corresponding to the contour 3820 of the current block 3800, and may be a region specified by a predetermined thickness around the contour of the current block. For example, referring to FIG. 38, the boundary region of the current block 3800 may be a region including a region up to a left straight line 3830 and a region up to a right straight line 3840 based on the contour 3820 of the current block 3800.

The predetermined thickness of the boundary region according to an embodiment may indicate the predetermined number of samples in a horizontal direction or the number of samples in a vertical direction based on samples located at a boundary of segments forming the current block 3800, and for example, in FIG. 38, the predetermined thickness may be 2 pixels to left or right. Also, the predetermined thickness may denote not only a distance in the horizontal direction or a distance in the vertical direction, but also a distance in a direction perpendicular to the boundary based on the boundary of the segments forming the current block 3800.

The predetermined thickness of the boundary region according to an embodiment may be determined identically with respect to a facing direction based on the samples located at the boundary of the current block 3800, or may be non-identically asymmetrically determined.

The predetermined thickness of the boundary region of the video encoding apparatus 10 according to an embodiment may be determined to be a number having the optimum RD cost, and the video decoding apparatus 20 according to an embodiment may receive information indicating the predetermined thickness of the boundary region from the video encoding apparatus 10.

Alternatively, the predetermined thickness of the boundary region according to an embodiment may be derived from a neighboring block of the current block 3800. For example, the predetermined thickness of the boundary region may be determined based on a gradient of sample values between upper neighboring blocks or left neighboring blocks of the current block 3800.

Prediction values of samples included in the boundary region of the current block 3800 according to an embodiment may be obtained by referring to a neighboring sample of the current block 3800 according to the direction of the boundary of the current block 3800.

In detail, the neighboring samples of the current block 3800 according to an embodiment may include an upper neighboring sample, an upper right neighboring sample, a left neighboring sample, and a lower left neighboring sample of the current block 3800. A reference sample to be referred to during prediction of the boundary region from among the neighboring samples of the current block 3800 according to an embodiment may be determined by using the contour 3820 of the current block 3800. For example, when the contour 3820 of the current block 3800 passes a sample 3810 from among neighboring samples adjacent to an upper outside of the current block 3800, the sample 3810 and samples located within the predetermined thickness in the horizontal direction around the sample 3810 may be reference samples. In FIG. 38, when the thickness of the boundary region of the current block 3800 according to an embodiment is 2 pixels in the horizontal direction, the reference samples may be five samples based on the sample 3810.

When the reference sample is determined, prediction values of the samples included in the boundary region of the current block 3800 according to an embodiment may be generated based on the determined reference sample.

Also, when prediction with respect to the boundary region is performed, prediction may be performed with respect to a region of the current block 3800 according to an embodiment excluding the boundary region, i.e., a region corresponding to the segment. For example, intra prediction according to a DC mode may be performed with respect to the segment region.

Figure 39:
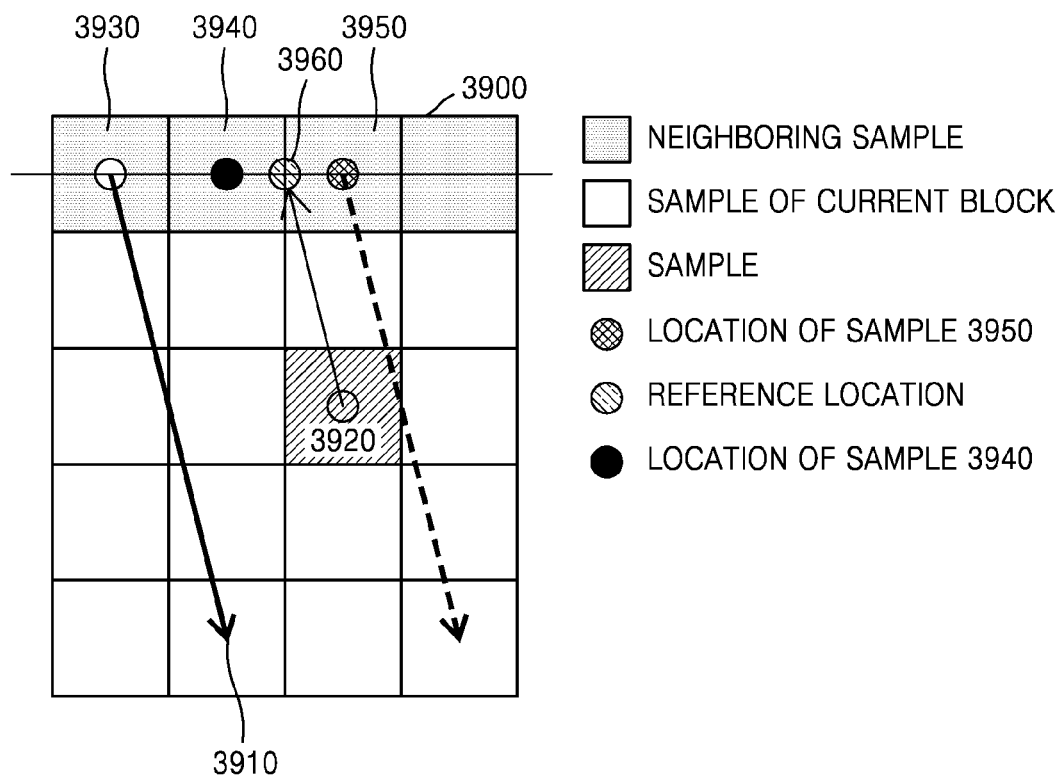
FIG. 39 illustrates detailed processes of performing prediction by using a reference sample with respect to a current block, according to an embodiment.

FIG. 39 illustrates detailed processes of performing prediction by using a reference sample with respect to a current block 3900, according to an embodiment.

In FIG. 39, some of the current block 3900 including a boundary region according to a contour 3910 of the current block 3900 and an upper neighboring block adjacent to the outside at the top side of the current block 3900 are illustrated. In FIG. 39, a mode of the contour 3910 of the current block 3900 may be a first mode or a second mode, and a thickness of the boundary region of the current block 3900 may be 2 pixels. A method of generating a prediction value of a sample 3920 from among samples included in the boundary region of the current block 3900 according to an embodiment will be described with reference to FIG. 39.

For prediction with respect to the boundary region of the current block 3900 according to an embodiment, a sample 3930, a sample 3940, and a sample 3950 from among the upper neighboring samples may be included in reference samples. Here, in order to generate a prediction value of the sample 3920 included in the boundary region of the current block 3900 according to an embodiment, a reference location 3960 of the sample 3920 may be determined. For example, the reference location 3960 of the sample 3920 may be determined based on a direction of a boundary between segments forming the current block 3900, i.e., based on a direction of the contour 3910.

When a reference location of a sample included in the boundary region of the current block 3900 according to an embodiment is located at the center of one reference sample from among upper samples of the current block 3900, a prediction value of the sample included in the boundary region of the current block 3900 may be generated by using a sample value of the sample of the reference location. For example, the prediction value of the sample included in the boundary region of the current block 3900 may be the sample value of the sample of the reference location or may be a refined value of the sample value of the sample of the reference location.

However, when the reference location 3960 of the sample 3920 included in the boundary region of the current block 3900 does not indicate a location of one reference sample as in FIG. 39, a prediction value of the sample 3920 may be generated by using a plurality of reference samples. For example, when the reference location 3960 of the sample 3920 is located at a boundary of the reference sample 3940 and the reference sample 3950, the prediction value of the sample 3920 may be generated based on the sample value of the reference sample 3940 and the sample value of the reference sample 3950.

In detail, bi-linear interpolation may be performed on the reference location 3960 of the sample 3920 by using reference samples adjacent to the reference location so as to generate a sample value of the reference location 3960 of the sample 3920. For example, the sample value of the reference location 3960 of the sample 3920 may be an average value of the sample values of the reference sample 3940 and reference sample 3950. Here, the prediction value of the sample 3920 included in the boundary region of the current block 3900 may be the generated sample value of the sample of the reference location 3960 or a refined value of the generated sample value of the sample of the reference location 3960.

Also, a method of performing interpolation with respect to the reference location of the sample included in the boundary region of the current block 3900 according to an embodiment is not limited thereto, and may be replaced by another interpolation method.

Also, the reference location 3960 of the sample 3920 included in the boundary region of the current block 3900 according to an embodiment may be determined by prediction of 1/n pixel units (n is an integer), and the sample value of the reference location 3960 may be generated by prediction of 1/n pixel units according to the determined reference location 3960 of the sample 3920. For example, the sample value of the reference location 3960 may be generated by assigning a weight according to a distance from the reference location 3960 to the sample values of the reference samples adjacent to the reference location 3960 by prediction of 1/n pixel units.

Figure 40A:
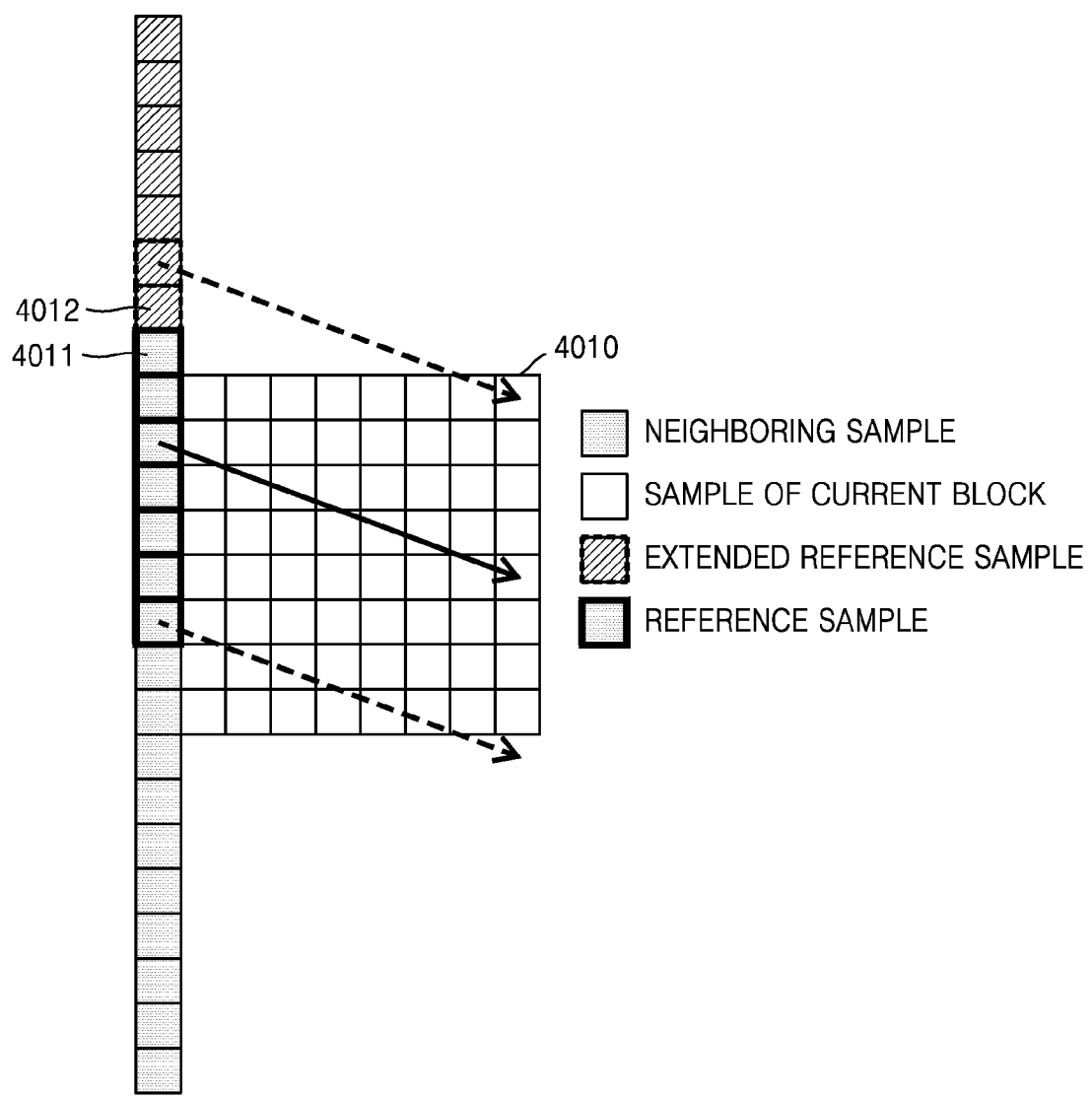
FIGS. 40A through 40C illustrate a method of performing prediction with respect to a boundary region of a current block, according to various embodiments.
Figure 40B:
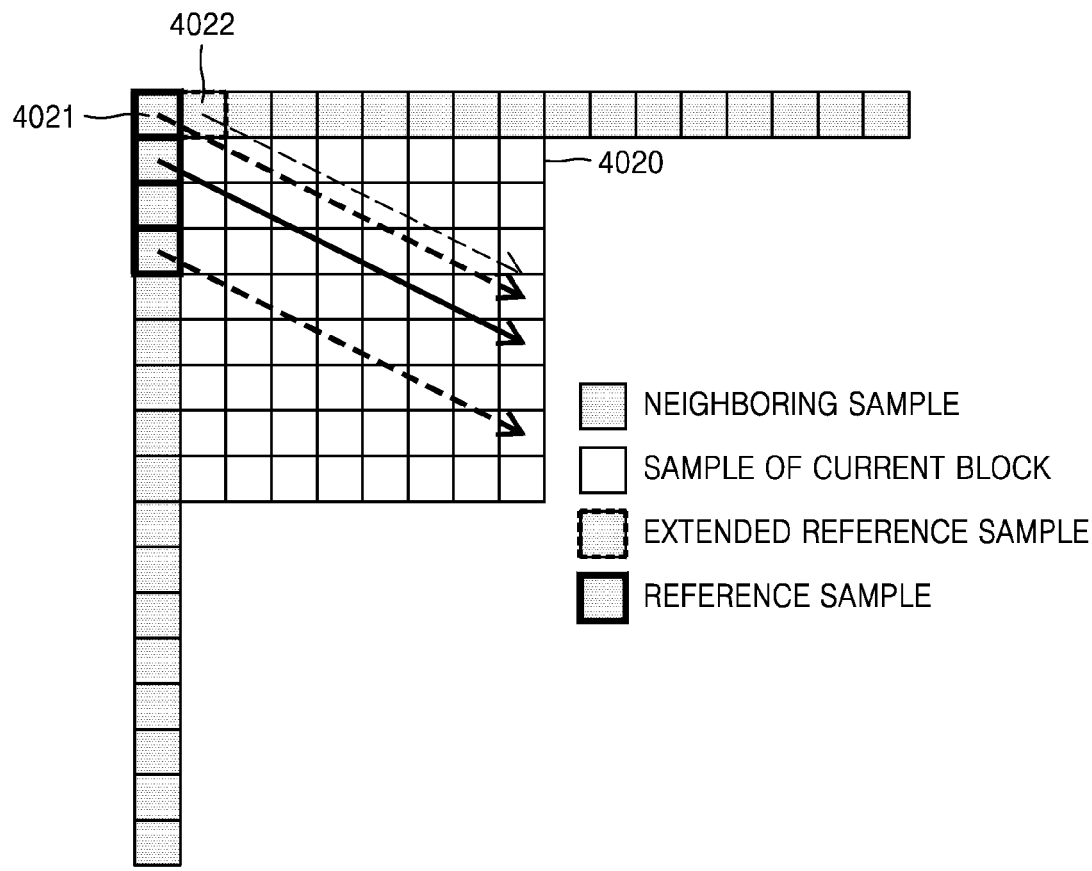
Figure 40C:
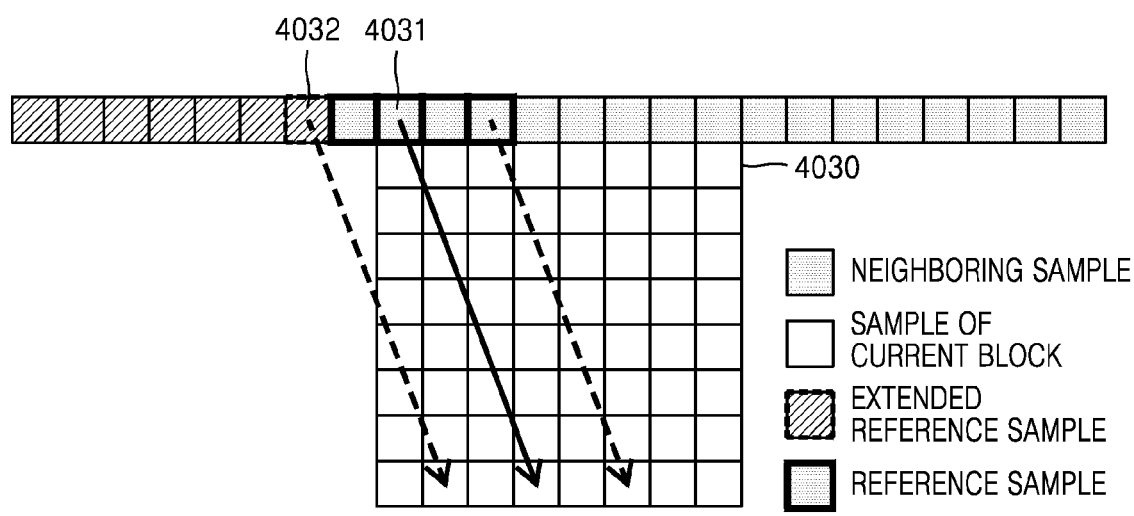

FIGS. 40A through 40C illustrate a method of performing prediction with respect to a boundary region of a current block, according to various embodiments.

Referring to FIG. 40A, a process of performing prediction on a boundary region of a current block 4010 according to an embodiment is illustrated. The current block 4010 according to an embodiment may include a boundary region including a boundary according to a single linear contour.

A prediction value of a sample included in the boundary region of the current block 4010 according to an embodiment may be generated by using a reference sample of the current block 4010 in a direction of the boundary. A reference sample of the current block 4010 according to an embodiment may be a sample adjacent to the outside of the current block 4010. For example, the reference samples of the current block 4010 may include a left sample and an upper left sample 4011 of the current block 4010.

However, in FIG. 40A, the reference location of the sample included in the boundary region of the current block 4010 may deviate from the upper left sample 4011 and indicate above the upper left sample 4011. In this case, the reference sample of the current block 4010 may further extend and further include an upper sample 4012 of the upper left sample 4011 of the current block 4010. A sample value of the upper sample 4012 of the upper left sample 4011 may be obtained from a neighboring block encoded or decoded before the current block 4010, or may be generated by padding the sample value of the upper left sample 4011.

A prediction value of the sample included in the boundary region of the current block 4010 according to an embodiment may be generated by using sample values of the left sample and the upper left sample 4011 of the current block 4010, and the upper sample 4012 of the upper left sample 4011.

Also, referring to FIG. 40B, while performing prediction on a boundary region of a current block 4020 according to an embodiment, when a reference location of a sample included in the boundary region deviates from an upper left sample 4021 and indicates above the upper left sample 4021, a reference sample of the current block 4020 may extend and further include an upper sample 4022 of the current block 4020.

Accordingly, a prediction value of the sample included in the boundary region of the current block 4020 according to an embodiment may be generated by using sample values of a left sample, the upper left sample 4021, and the upper sample 4022 of the current block 4020.

Also, referring to FIG. 40C, a process of performing prediction on a boundary region of a current block 4030 according to an embodiment is illustrated. The current block 4030 according to an embodiment may include a boundary region including a boundary according to a single linear contour.

Accordingly, a prediction value of a sample included in the boundary region of the current block 4030 according to an embodiment may be generated by using a reference sample of the current block 4030 in a direction of the boundary. For example, reference samples of the current block 4030 may include an upper sample and an upper left sample 4031 of the current block 4030.

Here, in FIG. 40C, a reference location of the sample included in the boundary region of the current block 4030 may deviate from the sample 4031 and indicate left of the upper left sample 4031.

The reference samples of the current block 4030 according to an embodiment may further extend and further include a left sample 4032 of the upper left sample 4031 of the current block 4030. A sample value of the left sample 4032 of the upper left sample 4031 may be obtained from a neighboring block decoded before the current block 4030 or may be generated by padding a sample value of the upper left sample 4031.

Accordingly, the prediction value of the sample included in the boundary region of the current block 4030 according to an embodiment may be generated by using sample values of the upper sample and the upper left sample 4031 of the current block 4030, and the left sample 4032 of the upper left sample 4031.

Also, in addition to the embodiments described with reference to FIGS. 40A through 40C, when a reference location of a sample included in a boundary region of a current block deviates an upper neighboring sample, an upper right neighboring sample, a sample value of the reference location may be generated via various methods, for example, a left neighboring sample, and a lower left neighboring sample of the current block, a sample at a location near the upper neighboring sample, the upper right neighboring sample, the left neighboring sample, or the lower left neighboring sample may be extended, or interpolation may be performed according to gradient of a boundary of the current block.

Figure 41:
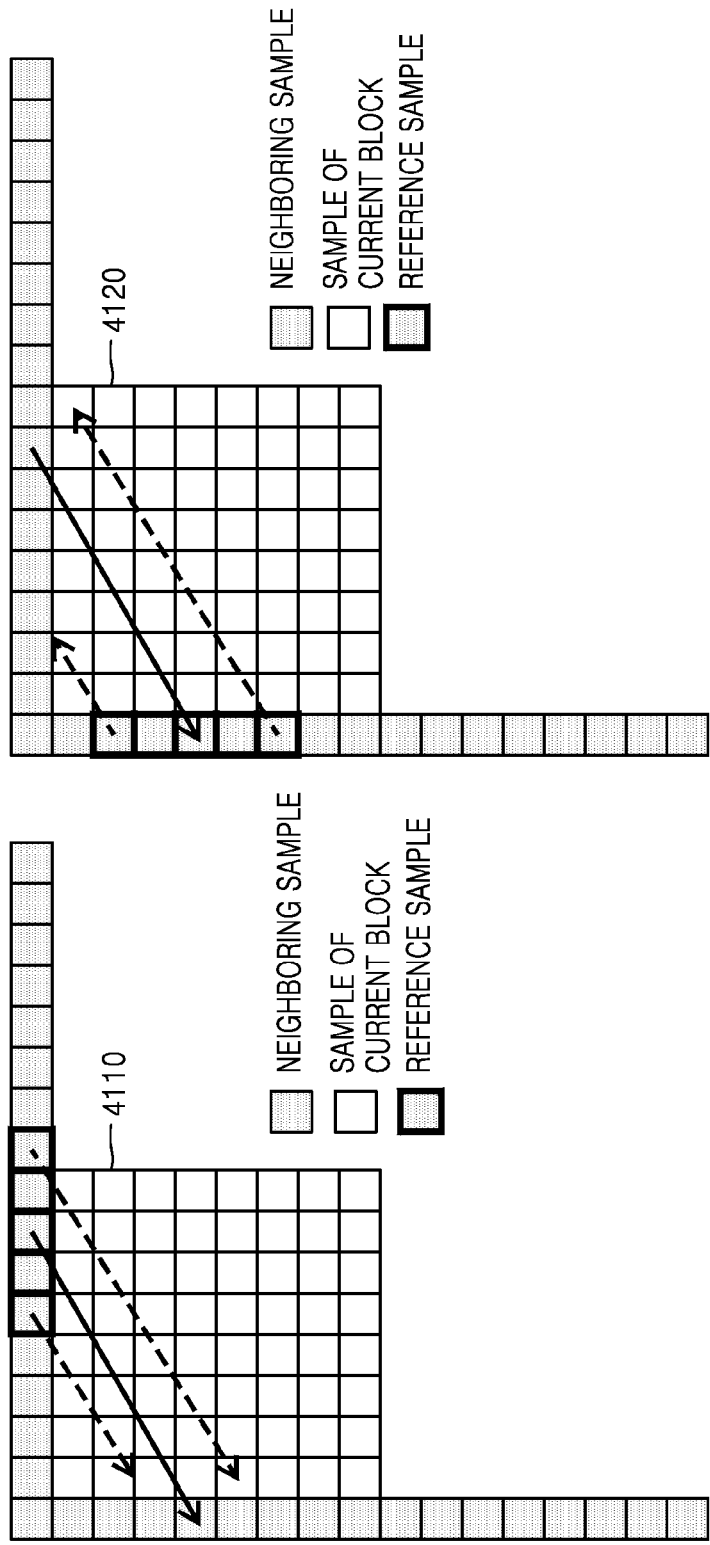
FIG. 41 illustrates a method of performing prediction with respect to a boundary region of a current block, according to various embodiments.

FIG. 41 illustrates a method of performing prediction with respect to a boundary region of a current block, according to various embodiments.

Neighboring samples of the current block in a direction of a boundary may exist both at a top side and a left side of the current block. In this case, a prediction value of a sample included in the boundary region of the current block according to an embodiment may be generated by referring to at least one of an upper sample adjacent to the upper outside of the current block and a left sample adjacent to the left outside of the current block. In other words, a reference sample of the sample included in the boundary region of the current block may include at least one of the upper sample of the current block and the left sample of the current block.

For example, referring to FIG. 41, a prediction value of a sample included in a boundary region of a current block 4110 may be generated by using a sample value of an upper sample of the current block. Also, a prediction value of a sample included in a boundary region of a current block 4120 may be generated by using a sample value of a left sample of the current block.

When a reference sample of a current block according to an embodiment in a direction of a boundary exists both at a top side and a left side of the current block, an available sample from among an upper sample and a left sample may be used as a reference sample.

Alternatively, when the upper sample and the left sample of the current block are both available, both the upper sample and the left sample may be used, or only one of them may be used.

For example, when the upper sample and the left sample of the current block are both available, the prediction value of the sample included in the boundary region of the current block may be an average value of prediction values according to the upper sample and according to the left sample. Alternatively, a weight may be assigned to the prediction values according to the upper sample and the left sample in consideration of a distance from the sample included in the boundary region of the current block to the upper sample and a distance from the sample included in the boundary region of the current block to the left sample.

Also, when the upper sample and the left sample of the current block are both available, the prediction value of the sample included in the boundary region of the current block may be generated by using only one of the upper sample and the left sample. For example, one sample to be referred may be determined from among the upper sample and the left sample based on a gradient of the contour of the current block according to an embodiment. When the gradient of the contour of the current block is close to a horizontal direction, the left sample may be determined as a reference sample, and when the gradient of the contour of the current block is close to a vertical direction, the upper sample may be determined as a reference sample.

Alternatively, one of the upper sample and the left sample may be determined as a reference sample based on a thickness of the boundary region of the current block according to an embodiment. Alternatively, the fewer number of samples corresponding to the boundary region of the current block from among the upper samples and the left samples of the current block according to an embodiment may be determined as reference samples. Alternatively, reference samples may be determined from among the upper samples and the left samples based on encoding/decoding efficiency and encoding/decoding performance of prediction of the boundary region of the current block according to an embodiment. Alternatively, samples having a larger variance of sample values may be determined as reference samples from among the upper samples and left samples of the current block according to an embodiment.

Figure 42:
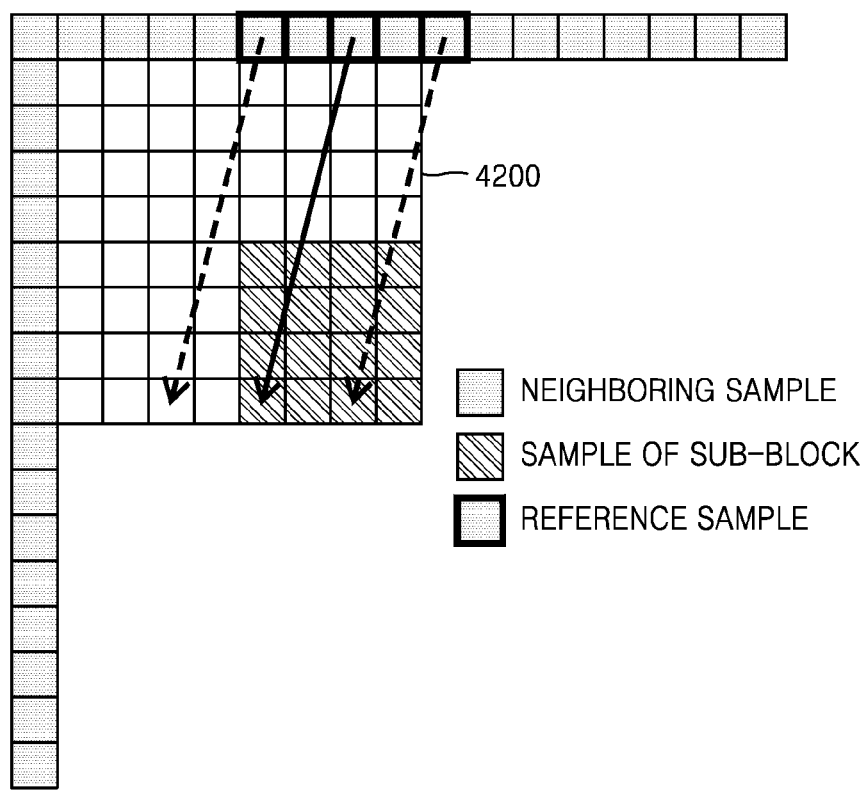
FIG. 42 illustrates a method of performing prediction with respect to a boundary region of a current block, according to an embodiment.

FIG. 42 illustrates a method of performing prediction with respect to a boundary region of a current block 4200, according to an embodiment.

The current block 4200 according to an embodiment may be split into four same sub-blocks, and prediction may be performed on each sub-block. For example, the current block 4200 may be a coding unit of an 8×8 size, and each sub-block may be a transformation unit of a 4×4 size. Alternatively, the current block 4200 may be a coding unit of a maximum size, and each sub-block may be a coding unit split from the coding unit of the maximum size.

When prediction is performed with respect to sub-block units of the current block 4200 according to an embodiment, reference samples for generating a prediction value of the sub-block may be determined to be neighboring samples adjacent to the current block 4200.

For example, referring to FIG. 42, when prediction is performed on a sub-block located at the bottom left of the current block 420 from among the sub-blocks included in the current block 4200 according to an embodiment, a prediction value of the sub-block located at the bottom left may be generated by referring to a neighboring sample adjacent to the top side of the current block 4200 instead of a neighboring sample adjacent to the sub-block located at the bottom left.

In detail, a reference location of a sample included in the sub-block located at the bottom left of the current block 4200 may be determined to be a location of a neighboring sample adjacent to the current block 4200 in a direction of the boundary of the current block 4200.

Figure 43:
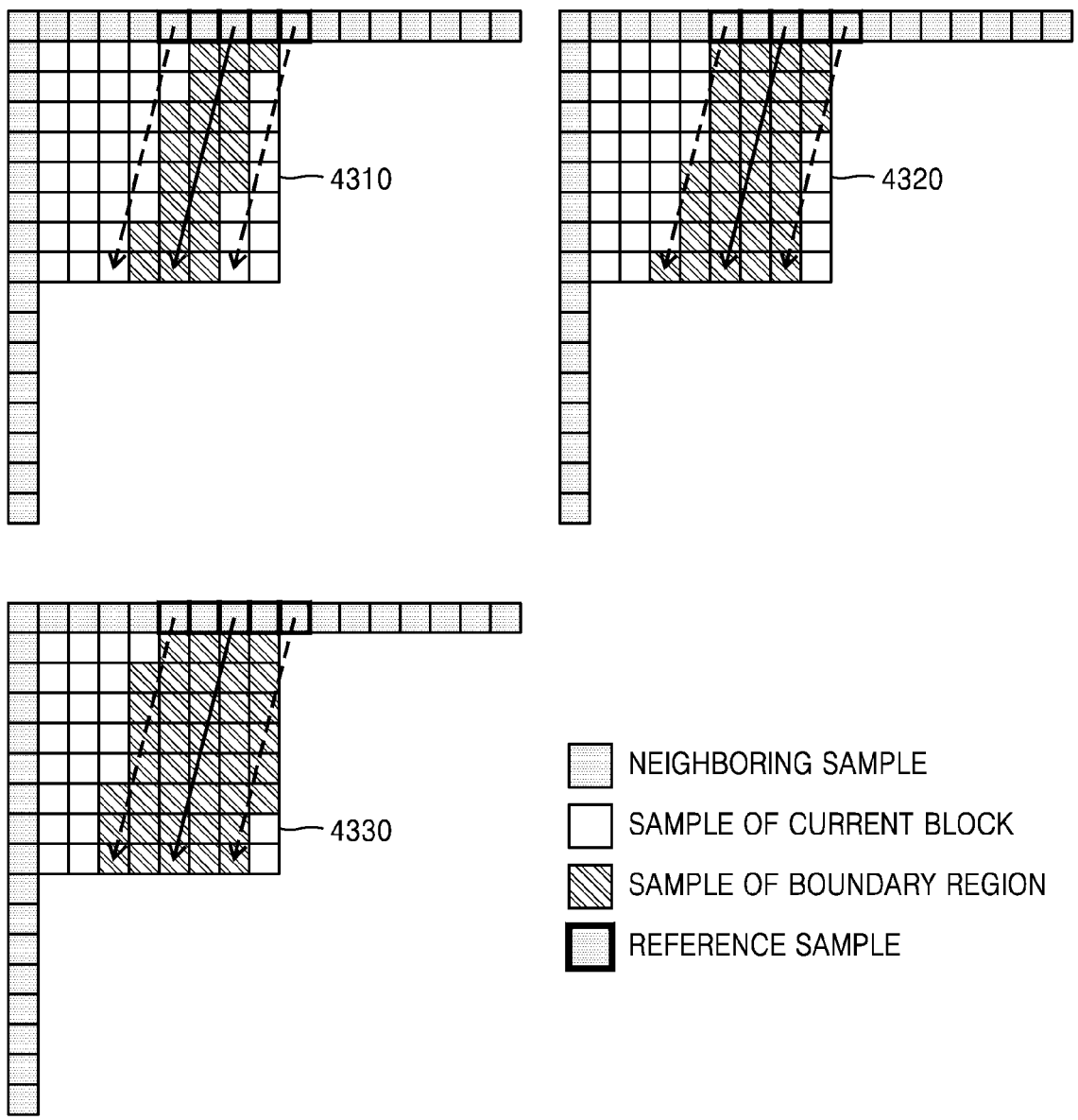
FIGS. 43 and 44 illustrate a method of performing prediction with respect to a boundary region of a current block, according to various embodiments.
Figure 44:
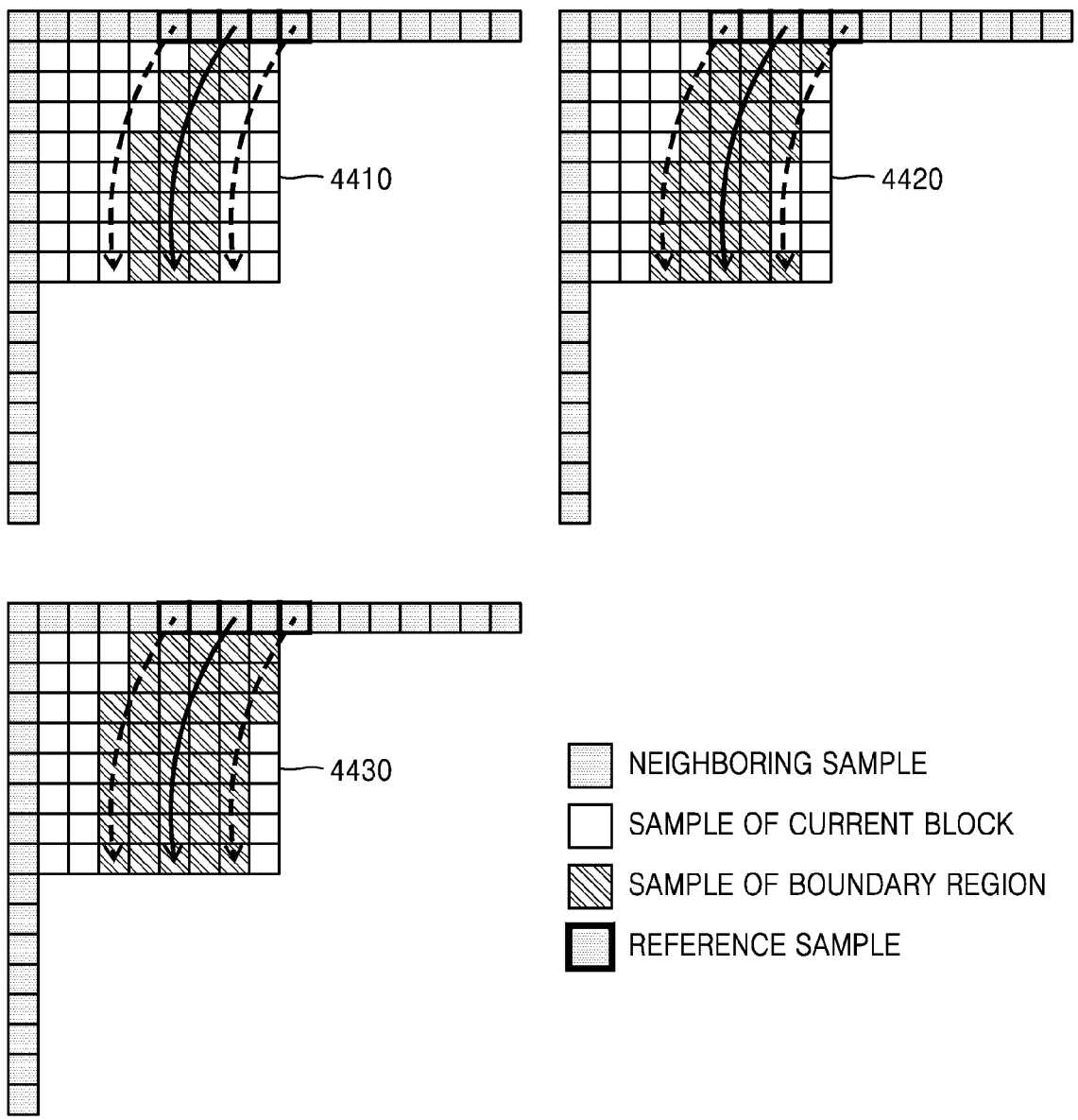

FIGS. 43 and 44 illustrate a method of performing prediction with respect to a boundary region of a current block, according to various embodiments.

When prediction is performed with respect to the boundary region of the current block in a direction of a boundary, a thickness of the boundary region of the current block may be first determined. The thickness of the boundary region of the current block may indicate the number of samples in a horizontal direction or the number of samples in a vertical direction based on samples located at the boundary of segments forming the current block.

For example, in the current block according to an embodiment, the thickness of the boundary region of the current block may be specified to the number N of left samples and the number M of right samples, or specified to the number P of upper samples and the number Q of lower samples based on the samples located at the boundary of the current block.

Referring to FIG. 40A, the boundary region of the current block 4010 may have a thickness of P=Q=4. Also, referring to FIG. 40B, the boundary region of the current block 4020 may have a thickness of P=Q=2. Also, referring to FIG. 40C, the boundary region of the current block 4030 may have a thickness of N=M=2.

In the thickness of the boundary region according to various embodiments, N and M or P and Q may be determined to be the same or different. Also, N and M or P and Q may be fixed, or may be differently adaptively adjusted according to blocks.

For example, when the thickness of the boundary region of the current block is fixed in a direction perpendicular to the boundary, the thickness of the boundary region of the current block in a vertical direction or in a horizontal direction may be differently determined according to a gradient of the boundary of the current block. Also, in this case, the number of reference samples for prediction of the boundary region of the current block may vary according to the thickness of the boundary region in the vertical direction or in the horizontal direction.

Alternatively, the thickness of the boundary region of the current block may be determined to be a predetermined size T according to N=M=P=Q=T. Here, the predetermined size T may be an integer pixel unit or a sub-pixel unit. The predetermined size T, i.e., information about the thickness of the boundary region of the current block may be encoded and transmitted to the video decoding apparatus 20.

Also, index information indicating one of a plurality of candidates of the predetermined size T may be used as information about the thickness of the boundary region of the current block. For example, with respect to the predetermined size T, "0", "4", and "twice of width of current block" may be respectively indexed to 0, 10, and 11 and signaled. Here, units of the predetermined size T may be integer pixel units. When the predetermined size T is twice of the width of the current block, all samples of the current block may be included in the boundary region, and prediction values of all samples of the current block may be generated by performing prediction on the boundary region.

Alternatively, the thickness of the boundary region of the current block may be derived from a neighboring block of the current block. For example, information, such as a variance, an average, a standard deviation, and an outlier, about samples included in the neighboring block of the current block may be used.

Referring to FIG. 43, processes of performing prediction with respect to boundary regions of current blocks 4310, 4320, and 4330 according to various embodiments are illustrated. Here, the boundary regions of the current blocks 4310 through 4330 may have a thickness of N=M=2, and a reference sample of the current blocks 4310 through 4330 may be an upper neighboring sample of the current blocks 4310 through 4330.

Here, samples included in the boundary regions of the current blocks 4310 through 4330 according to various embodiments may be determined according to various standards. For example, referring to the current block 4310, a sample included in the boundary region of the current block 4310 may be a sample whose location is completely included in the boundary region of the current block 4310 from among samples of the current block 4310.

Alternatively, referring to the current block 4320, a sample included in the boundary region of the current block 4320 may be a sample whose center of location is included in the boundary region of the current block 4310 from among samples of the current block 4320.

Alternatively, referring to the current block 4330, a sample included in the boundary region of the current block 4330 may be a sample whose location entirely or partially overlaps the boundary region of the current block 4330 from among samples of the current block 4330.

Also, FIG. 44 illustrates examples when contours of current blocks 4410, 4420, and 4430 are curved contours. Samples included in boundary regions of the current blocks 4410 through 4430 may be determined according to various standards like the current blocks 4310 through 4330 of FIG. 43.

When prediction is performed with respect to the boundary regions of the current blocks 4310, 4320, 4330, 4410, 4420, and 4430 according to various embodiments, prediction may be performed with respect to regions excluding the boundary regions. In other words, regions excluding the boundary regions in the current blocks 4310 through 4430 of FIGS. 43 and 44 are regions corresponding to segments, and may be regions indicated by white samples in FIGS. 43 and 44. For example, intra prediction according to a DC mode may be performed with respect to the segment regions.

Also, when prediction with respect to the boundary regions and prediction with respect to the segment regions of the current blocks 4310 through 4430 of FIGS. 43 and 44 are all performed, filtering may be performed between the boundary region and the segment region. Quality deterioration may occur due to an error because prediction is performed on the boundary region and the segment region by using different methods. Accordingly, in order to reduce an error and prevent visible quality deterioration, filtering may be performed between the boundary region and the segment region.

For example, filtering may be performed with respect to a sample of samples of the boundary regions of the current blocks 4310 through 4430 of FIGS. 43 and 44, to which a sample of the segment region is adjacent at a left or right side thereof. Also, filtering may be performed with respect to a sample of samples of the segment regions of the current blocks 4310 through 4430 of FIGS. 43 and 44, to which a sample of the boundary region is adjacent at a left or right side thereof.

Alternatively, filtering may be performed with respect to a sample of the samples of the boundary regions of the current blocks 4310 through 4430 of FIGS. 43 and 44, to which a sample of the segment region is adjacent at a top or bottom side thereof. Also, filtering may be performed with respect to a sample of the samples of the segment regions of the current blocks 4310 through 4430 of FIGS. 43 and 44, to which a sample of the boundary region is adjacent at a top or bottom side thereof.

In detail, a sampling method according to an embodiment may be performed according to an algorithm that is the same as the pseudo code of FIG. 27. Here, mask values of the current blocks 4310 through 4430 of FIG. 43 may be determined to be 1 or 0 based on whether the mask values are included in the boundary regions while determining the samples included in the boundary regions of the current blocks 4310 through 4430, and the determined mask values may be used for filtering.

Filtering performed between the boundary regions and the segment regions of the current blocks 4310 through 4430 of FIGS. 43 and 44 according to various embodiments may be applied to both a horizontal direction and a vertical direction, or may be applied in one of the horizontal direction and the vertical direction.

Also, when prediction is performed with respect to the boundary regions of the current blocks 4310 through 4430 according to various embodiments, filtering may be performed on the boundary regions so as to reduce an error with respect to prediction values of the boundary regions.

For example, prediction values of the samples included in the boundary regions of the current blocks 4310 through 4430 are generated, and the generated prediction values may be filtered. For example, a 1D Gaussian filter having a filter value, such as [1, 2, 1], may be used. Also, filtering may be performed first with respect to neighboring samples being referred to so as to predict the boundary regions of the current blocks 4310 through 4430, and the prediction values of the samples of the boundary regions of the current blocks 4310 through 4430 may be generated based on the filtered neighboring samples.

FIG. 45 illustrates syntax elements for performing intra prediction, according to an embodiment.

Information indicating a prediction mode with respect to a current block according to an embodiment may be parsed from a bitstream. For example, the information indicating the prediction mode with respect to the current block may include information (intra_mode_flag) indicating whether to use an intra mode based on coding units of a hierarchical structure using square or rectangular prediction units, or use a contour-based intra prediction mode using a segment, i.e., a prediction unit, split by using a contour according to a boundary of an object included in the current block.

When the information indicating the prediction mode indicates that the current block is in a general intra mode, the current block may be predicted according to an intra mode, such as a DC mode, a planar mode, or an angular mode.

Also, when the information indicating the prediction mode does not indicate that the current block is in a general intra mode, information (seg_num_minus1) about the number of segments split from the current block may be parsed. For example, when the information about the number of segments of the current block indicates that the current block is split into one segment, the current block may not be split, and information (1seg_mode) indicating a prediction mode of a first segment that is the same as the current block may be parsed. For example, the information (1seg_mode) indicating the prediction mode of the first segment may indicate one of intra modes, such as a DC mode, a planar mode, and an angular mode.

When the information about the number of segments of the current block indicates that the current block is split into two or more segments, the current block may be split into segments for prediction of the current block. In other words, information about a contour for determining at least one segment from the current block may be parsed. The information about the contour of the current block according to an embodiment may include mode information of the contour and information about coordinates of the contour.

In detail, when the current block is split into at least two segments, mode information (line_orient) of the contour of the current block may be parsed. For example, the mode information of the contour may be information indicating a direction of the contour.

The mode information (line_orient) of the contour of the current block according to an embodiment may be information indicating at least two sides contacting the contour of the current block from among four sides of the current block. For example, the mode information (line_orient) of the contour of the current block according to an embodiment is information indicating two sides from among top, left, bottom, and right sides of the current block, and may indicate one of a first mode (line_orient==0), a second mode (line_orient==1), a third mode (line_orient==2), a fourth mode (line_orient==3), a fifth mode (line_orient==4), and a sixth mode (line_orient==5). The mode of the contour of the current block may be determined according to the mode information (line_orient) of the contour of the current block.

When the mode of the contour of the current block according to an embodiment is determined, it may be determined whether to parse information about the coordinates of the contour of the current block. The information about the coordinates of the contour of the current block may include first coordinate information (line_pos) and second coordinate information (line_pos2) of the contour. In detail, it may be determined whether the coordinates of the contour of the current block are derivable from neighboring block or need to be parsed, according to the mode of the contour of the current block.

For example, when it is determined that first coordinates and second coordinates of the contour of the current block are derivable from the neighboring block of the current block based on the mode of the contour of the current block, the first coordinate information (line_pos1) and the second coordinate information (line_pos2) of the contour of the current block may not be parsed. Also, when it is determined that the first coordinates and the second coordinates of the contour of the current block are not derivable from the neighboring block of the current block based on the mode of the contour of the block, the first coordinate information (line_pos1) and the second coordinate information (line_pos2) of the contour of the current block may be parsed from a bitstream. Whether to parse the information about the coordinates of the contour of the current block may be determined with respect to each of the first coordinates and the second coordinates.

For example, when the first coordinates of the contour of the current block are derivable and the second coordinates are not derivable (for example, line_orient==0), only the second coordinate information (line_pos2) of the contour of the current lbock may be parsed.

Also, when both the first and second coordinates of the contour of the current block are not derivable from the neighboring block of the current block, both the first coordinate information (line_pos1) and the second coordinate information (line_pos2) of the contour of the current block may be parsed. Here, a sample value or prediction value (seg1_dc) of a second segment located at the bottom right in the current block may be parsed instead of being generated by using a neighboring sample of the current block.

Also, information (boundary_filling_flag) indicating whether to perform prediction in a direction of a boundary with respect to the current block according to an embodiment may be parsed. When the information (boundary_filling_flag) indicates that the prediction is performed in the direction of the boundary, prediction values of samples included in a boundary region of the current block may be generated in the direction of the boundary. For example, the prediction values of the samples included in the boundary region of the current block may be generated by using the method described with reference to FIGS. 38 through 44.

Here, the information about the boundary region of the current block according to an embodiment may be parsed. For example, the information about the boundary region of the current block may include information (boundary_filling_thickness) about a thickness of the boundary region. The information indicating the thickness of the boundary region may directly indicate the thickness of the boundary region or may be index information indicating one of a plurality of candidates of predetermined thicknesses.

Alternatively, when the information (boundary_filling_flag) indicating whether to perform prediction in the direction of the boundary does not indicate prediction in the direction of the boundary, the prediction values of the samples included in the boundary region of the current block may be generated by using samples and mask value of a segment region of the current block.

Also, information (boundary_filtering_disable_flag) indicating whether to perform filtering on a prediction value of the current block according to an embodiment may be parsed. An example of a filtering method performed on a prediction value of the boundary region with respect to the current block according of an embodiment may be the same as the method of FIG. 37.

Hereinafter, relationships between deeper coding units, prediction units, and transformation units when a video encoding method based on coding units of a hierarchical structure using rectangular or square prediction units is used instead of the contour-based intra prediction video encoding method suggested above will be described with reference to FIGS. 46 through 49.

Figure 46:
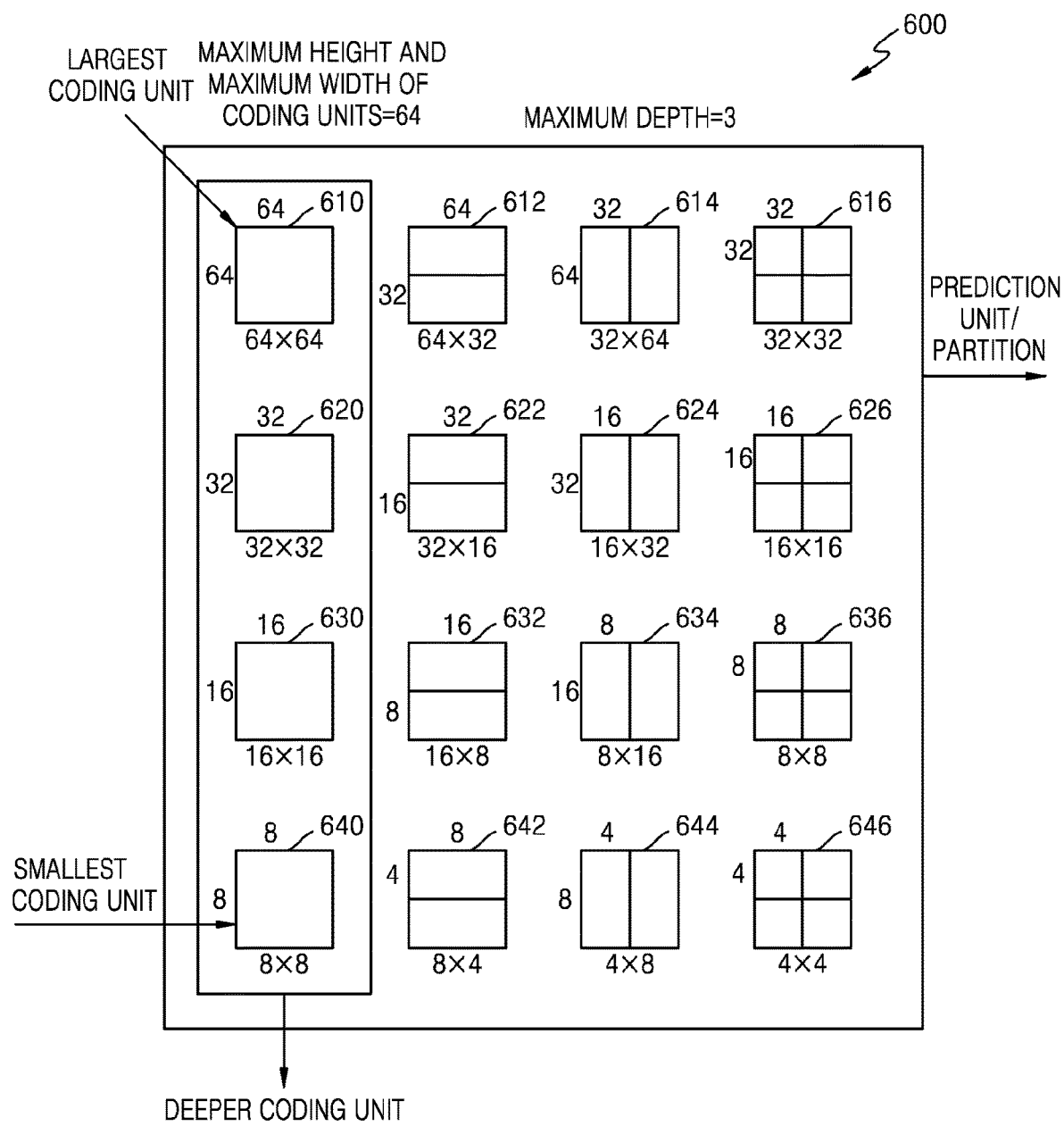
FIG. 46 illustrates deeper coding units according to depths, and prediction units, according to various embodiments.

FIG. 46 illustrates deeper coding units according to depths, and prediction units, according to various embodiments.

The video encoding apparatus 10 according to an embodiment and the video decoding apparatus 20 according to an embodiment may use hierarchical coding units so as to consider characteristics of an image. A maximum height, a maximum width, and a maximum depth of coding units may be adaptively determined according to the characteristics of the image, or may be variously set according to user requirements. Sizes of deeper coding units according to depths may be determined according to the predetermined maximum size of the coding unit.

In a hierarchical structure of coding units 600 according to an embodiment, the maximum height and the maximum width of the coding units are each 64, and the maximum depth is 3. In this case, the maximum depth indicates a total number of times the coding unit is split from the largest coding unit to the smallest coding unit. Since a depth deepens along a vertical axis of the hierarchical structure of coding units 600, a height and a width of the deeper coding unit are each split. Also, a prediction unit and partitions, which are bases for prediction encoding of each deeper coding unit, are shown along a horizontal axis of the hierarchical structure of coding units 600. Here, the prediction units and partitions of the deeper coding units of FIG. 46 may indicate prediction units of a current block when a contour-based prediction encoding method is not used.

That is, a coding unit 610 is a largest coding unit in the hierarchical structure of coding units 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, and a coding unit 640 having a size of 8×8 and a depth of 3 are present. The coding unit 640 having the size of 8×8 and the depth of 3 is a smallest coding unit.

The prediction unit and the partitions of a coding unit are arranged along the horizontal axis according to each depth. That is, if the coding unit 610 having a size of 64×64 and a depth of 0 is a prediction unit, the prediction unit may be split into partitions include in the coding unit 610 having the size of 64×64, i.e. a partition 610 having a size of 64×64, partitions 612 having the size of 64×32, partitions 614 having the size of 32×64, or partitions 616 having the size of 32×32.

Equally, a prediction unit of the coding unit 620 having the size of 32×32 and the depth of 1 may be split into partitions included in the coding unit 620 having the size of 32×32, i.e. a partition 620 having a size of 32×32, partitions 622 having a size of 32×16, partitions 624 having a size of 16×32, and partitions 626 having a size of 16×16.

Equally, a prediction unit of the coding unit 630 having the size of 16×16 and the depth of 2 may be split into partitions included in the coding unit 630 having the size of 16×16, i.e. a partition 630 having a size of 16×16 included in the coding unit 630, partitions 632 having a size of 16×8, partitions 634 having a size of 8×16, and partitions 636 having a size of 8×8.

Equally, a prediction unit of the coding unit 640 having the size of 8×8 and the depth of 3 may be split into partitions included in the coding unit 640 having the size of 8×8, i.e. a partition 640 having a size of 8×8 included in the coding unit 640, partitions 642 having a size of 8×4, partitions 644 having a size of 4×8, and partitions 646 having a size of 4×4.

In order to determine a depth of the largest coding unit 610, the coding unit determiner 10 of the video encoding apparatus 10 and 100 according to an embodiment has to perform encoding on coding units respectively corresponding to depths included in the largest coding unit 610.

The number of deeper coding units according to depths including data in the same range and the same size increases as the depth deepens. For example, four coding units corresponding to a depth of 2 are required to cover data that is included in one coding unit corresponding to a depth of 1. Accordingly, in order to compare results of encoding the same data according to depths, the data has to be encoded by using each of the coding unit corresponding to the depth of 1 and four coding units corresponding to the depth of 2.

In order to perform encoding according to each of the depths, a least encoding error that is a representative encoding error of a corresponding depth may be selected by performing encoding on each of prediction units of the coding units according to depths, along the horizontal axis of the hierarchical structure of coding units 600. Alternatively, the minimum encoding error may be searched for by comparing representative encoding errors according to depths, by performing encoding for each depth as the depth deepens along the vertical axis of the hierarchical structure of coding units 600. A depth and a partition generating the minimum encoding error in the largest coding unit 610 may be selected as a depth and a partition mode of the largest coding unit 610.

FIG. 47 illustrates a relationship between a coding unit and transformation units, according to various embodiments.

The video encoding apparatus 10 according to an embodiment or the video decoding apparatus 20 according to an embodiment encodes or decodes an image according to coding units having sizes smaller than or equal to a largest coding unit for each largest coding unit. Sizes of transformation units for transformation during an encoding process may be selected based on data units that are not larger than a corresponding coding unit.

For example, in the video encoding apparatus 10 according to an embodiment or the video decoding apparatus 20 according to an embodiment, when a size of a current coding unit 710 is 64×64, transformation may be performed by using transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error with respect to an original image may be selected.

FIG. 48 illustrates a plurality of pieces of encoding information according to various embodiments.

The bitstream generator 16 of the video encoding apparatus 10 according to an embodiment may encode and transmit, as split information, partition mode information 800, prediction mode information 810, and transformation unit size information 820 for each coding unit corresponding to a depth.

Here, the partition mode information 800 of FIG. 48 may be used when contour-based prediction encoding is not used with respect to a current block of an image.

The partition mode information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the partition mode information 800 about a current coding unit is set to indicate one of the partition 802 having a size of 2N×2N, the partition 804 having a size of 2N×N, the partition 806 having a size of N×2N, and the partition 808 having a size of N×N.

The prediction mode information 810 indicates a prediction mode of each prediction unit. For example, it may be set, through the prediction mode information 810, whether prediction encoding is performed on a partition of the current block indicated by the partition mode information 800 or a segment determined based on a contour of the current block in which one of an intra mode 812, an inter mode 814, and a skip mode 816.

The transformation unit size information 820 indicates a transformation unit to be based on when transformation is performed on a current coding unit. For example, the transformation unit may be a first intra transformation unit 822, a second intra transformation unit 824, a first inter transformation unit 826, or a second inter transformation unit 828.

The video decoding apparatus 20 according to an embodiment may extract and use the partition mode information 800, the prediction mode information 810, and the transformation unit size information 820 for decoding, according to each deeper coding unit.

While the present disclosure has been particularly shown and described with reference to embodiments thereof, it will be understood by one of ordinary skill in the art that various changes in form and details may be made therein without departing from the spirit and scope of the following claims. The embodiments should be considered in a descriptive sense only and not for purposes of limitation. Therefore, the scope of the disclosure is defined not by the detailed description of the disclosure but by the appended claims, and all differences within the scope will be construed as being included in the present disclosure.

The invention claimed is:

1. A video decoding method performed by one or more processors, the method comprising:

obtaining, by the one or more processors, mode information of a contour for determining at least one segment from a current block and third coordinate information indicating a displacement between third coordinates inside the current block and a center of a straight line connecting first coordinates and second coordinates;

determining, by the one or more processors, whether the first coordinates and the second coordinates of the contour are derivable from a neighboring block of the current block, based on the mode information of the contour;

when the first coordinates and the second coordinates of the contour are derivable from the neighboring block of the current block, deriving the first coordinates and the second coordinates on a boundary of the current block from the neighboring block of the current block;

determining the third coordinates inside the current block based on the displacement between the third coordinates and of the center of the straight line connecting the first coordinates and the second coordinates indicated by the third coordinate information;

determining, by the one or more processors, the at least one segment within the current block based on the first coordinates, the second coordinates, and the third coordinates of the contour; and performing, by the one or more processors, prediction with respect to the determined at least one segment, wherein the contour is determined based on a line connecting the first coordinates and the third coordinates, and a line connecting the second coordinates and the third coordinates.

2. The video decoding method of claim 1, wherein, in the determining of the at least one segment, when at least one of the first coordinates and the second coordinates of the contour are not derivable from the neighboring block of the current block according to the mode information of the contour, obtaining, by the one or more processors, at least one of the first coordinates and the second coordinates of the contour from a bitstream.

3. The video decoding method of claim 2, further comprising:
obtaining, by the one or more processors, the first coordinates from the bitstream when the first coordinates of the contour are located at a right side of the current block according to the obtained mode information of the contour; and obtaining, by the one or more processors, the second coordinates from the bitstream when the second coordinates of the contour are located at a bottom of the current block according to the obtained mode information of the contour.

4. The video decoding method of claim 1, further comprising:
deriving, by the one or more processors, the first coordinates of the contour from an upper block of the current block when the first coordinates of the contour are located at a top of the current block according to the obtained mode information of the contour; and deriving, by the one or more processors, the second coordinates of the contour from a left block of the current block when the second coordinates of the contour are located at a left side of the current block according to the obtained mode information of the contour.

5. The video decoding method of claim 4, wherein, in the deriving of the first coordinates of the contour from the upper block of the current block, the first coordinates of the contour are derived by using sample values of lowermost samples of the upper block of the current block, and in the deriving of the second coordinates of the contour from the left block of the current block, the second coordinates of the contour are derived by using sample values of rightmost samples of the left block of the current block.

6. The video decoding method of claim 1, wherein the mode information of the contour for determining at least one segment from the current block comprises information indicating at least two sides from among top, left, bottom, and right sides of the current block.

7. The video decoding method of claim 1, further comprising:
obtaining, by the one or more processors, information about a number of at least one segment determined from the current block; and when the information about the number of the at least one segment indicates that the current block is determined to be one segment, obtaining, by the one or more processors, information indicating a prediction mode with respect to the one segment.

8. The video decoding method of claim 1, wherein the performing of the prediction with respect to the at least one segment comprises:
generating, by the one or more processors, a mask of the current block indicating a boundary of segments forming the current block;

determining, by the one or more processors, sample values of samples included in the at least one segment by using a neighboring sample of the current block; and determining, by the one or more processors, a prediction value of the at least one segment based on the generated mask and the determined sample values.

9. The video decoding method of claim 8, wherein, in the generating of the mask of the current block, the mask of the current block is generated by determining a mask value of a sample of the current block based on a location relationship between the sample of the current block and the contour for determining the at least one segment from the current block.

10. The video decoding method of claim 8, wherein the determining of the sample values of the samples included in the at least one segment comprises:
determining, by the one or more processors, a reference sample included in the neighboring block of the current block based on the obtained mode information of the contour; and determining, by the one or more processors, sample values of the samples included in the at least one segment by using the determined reference sample.

11. A video encoding method comprising:
determining, by one or more processors, a mode of a contour for determining at least one segment from a current block;

determining, by the one or more processors, whether first coordinates and second coordinates of the contour are derivable from a neighboring block of the current block, based on the mode of the contour;

when the first coordinates and the second coordinates of the contour are derivable from the neighboring block of the current block, deriving the first coordinates and the second coordinates on a boundary of the current block from the neighboring block of the current block;

determining third coordinates inside the current block;

determining, by the one or more processors, the at least one segment within the current block based on the first coordinates, the second coordinates and the third coordinates of the contour;

performing, by the one or more processors, prediction with respect to the current block by using the at least one segment; and encoding, by the one or more processors, mode information of the contour indicating the mode of the contour and third coordinate information indicating a displacement between the third coordinates inside the current block and a center of a straight line connecting first coordinates and the second coordinates, wherein the contour is determined based on a line connecting the first and third coordinates and a line connecting the second and third coordinates.

12. The video encoding method of claim 11, wherein, in the determining of the at least one segment, when at least one of the first coordinates and the second coordinates of the contour are not derivable from the neighboring block of the current block according to the mode information of the contour, determining, by the one or more processors, the at least one segment from the current block based on the first coordinates and the second coordinates of the contour determined by using samples located at an edge of the current block.

13. The video encoding method of claim 12, further comprising:
    determining, by the one or more processors, the first coordinates of the contour by using upper samples of the current block or right samples of the current block from among the samples located at the edge of the current block; and
    determining, by the one or more processors, the second coordinates of the contour by using lower samples of the current block or left samples of the current block from among the samples located at the edge of the current block.

14. The video encoding method of claim 12, further comprising:
    when the first coordinates of the contour are located at a right side of the current block according to the determined mode of the contour, determining, by the one or more processors, the first coordinates of the contour determined by using right samples in the current block; and
    when the second coordinates of the contour are located at a bottom of the current block according to the determined mode of the contour, determining, by the one or more processors, the second coordinates of the contour by using lower samples in the current block.

15. The video encoding method of claim 11, further comprising:
    when the first coordinates of the contour are located at a top of the current block according to the determined mode of the contour, deriving, by the one or more processors, the first coordinates of the contour from an upper block of the current block; and
    when the second coordinates of the contour are located at a left side of the current block according to the obtained mode information of the contour, deriving, by the one or more processors, the second coordinates of the contour from a left block of the current block.

16. The video encoding method of claim 15, wherein, in the deriving of the first coordinates of the contour from the upper block of the current block, the first coordinates of the contour are derived by using sample values of lowermost samples of the upper block of the current block, and
    in the deriving of the second coordinates of the contour from the left block of the current block, the second coordinates of the contour are derived by using sample values of rightmost samples of the left block of the current block.

17. The video encoding method of claim 11, further comprising:
    determining, by the one or more processors, a number of at least one segment from the current block; and
    when the number of the at least one segment is determined to be one segment, encoding, by the one or more processors, information about the number of the at least one segment and information indicating a prediction mode with respect to the one segment.

18. The video encoding method of claim 11, further comprising:
    generating, by the one or more processors, a mask of the current block indicating a boundary of segments forming the current block;
    determining, by the one or more processors, sample values of samples included in the at least one segment by using a neighboring sample of the current block; and
    determining, by the one or more processors, a prediction value of the at least one segment based on the generated mask and the determined sample values.

19. The video encoding method of claim 18, wherein, in the generating of the mask of the current block, the mask of the current block is generated by determining a mask value of a sample of the current block based on a location relationship between the sample of the current block and the contour for determining the at least one segment from the current block.

20. A video decoding apparatus comprising:
    one or more processors; and
    one or more memory device storing instructions performed by the one or more processors, the instructions comprising:
        obtaining mode information of a contour for determining at least one segment from a current block and third coordinate information indicating a displacement between third coordinates inside the current block and a center of a straight line connecting first coordinates and second coordinates,
        determining whether the first coordinates and the second coordinates of the contour are derivable from a neighboring block of the current block, based on the mode information of the contour,
        when the first coordinates and the second coordinates of the contour are derivable from the neighboring block of the current block, deriving the first coordinates and the second coordinates on a boundary of the current block from the neighboring block of the current block;
        determining the third coordinates inside the current block based on the displacement between the third coordinates and the center of the straight line connecting the first coordinates and the second coordinates indicated by the third coordinate information,
        determining the at least one segment within the current block based on the first coordinates, the second coordinates, and the third coordinates of the contour; and
        performing prediction with respect to the determined at least one segment,
    wherein the contour is determined based on a line connecting the first coordinates and the third coordinates, and a line connecting the second coordinates and the third coordinates.

* * * * *